(12) United States Patent
Chen et al.

(10) Patent No.: US 11,221,733 B2
(45) Date of Patent: Jan. 11, 2022

(54) APPLICATION CONTROL METHOD, GRAPHICAL USER INTERFACE, AND TERMINAL

(71) Applicant: Huawei Technologies Co., Ltd., Shenzhen (CN)

(72) Inventors: Changkuan Chen, Hangzhou (CN); Meng Wang, Beijing (CN); Guangyuan Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 23 days.

(21) Appl. No.: 16/635,274

(22) PCT Filed: Nov. 21, 2017

(86) PCT No.: PCT/CN2017/112037
§ 371 (c)(1),
(2) Date: Jan. 30, 2020

(87) PCT Pub. No.: WO2019/100191
PCT Pub. Date: May 31, 2019

(65) Prior Publication Data
US 2020/0371667 A1 Nov. 26, 2020

(51) Int. Cl.
*G06F 3/0481* (2013.01)
(52) U.S. Cl.
CPC .................. *G06F 3/04817* (2013.01)
(58) Field of Classification Search
CPC .... G06F 3/04817; G06F 3/017; G06F 3/0482; G06F 3/04842; G06F 3/0488
See application file for complete search history.

(56) References Cited

U.S. PATENT DOCUMENTS

| | | | |
|---|---|---|---|
| 9,063,563 B1 | 6/2015 | Gray et al. | |
| 10,261,672 B1* | 4/2019 | Dolbakian | G06F 3/04883 |
| 10,642,484 B1* | 5/2020 | Hanada | G06F 3/04883 |
| 2008/0222545 A1 | 9/2008 | Lemay et al. | |
| 2010/0269040 A1* | 10/2010 | Lee | G06F 3/04817 |
| | | | 715/702 |
| 2014/0075394 A1* | 3/2014 | Nawle | G06F 3/017 |
| | | | 715/863 |

(Continued)

FOREIGN PATENT DOCUMENTS

| | | |
|---|---|---|
| CN | 105324745 A | 2/2016 |
| CN | 106843723 A | 6/2017 |

(Continued)

*Primary Examiner* — Mong-Shune Chung
(74) *Attorney, Agent, or Firm* — Conley Rose, P.C.

(57) ABSTRACT

An application control method includes detecting, by a terminal, a user operation that is based on an application icon, where an application represented by the application icon has at least one associated function, and starting, by the terminal in response to the user operation, an associated function corresponding to the user operation, where the associated function corresponding to the user operation belongs to the at least one associated function. The at least one associated function of the application includes at least one of an associated application of the application, a function provided by the application, a system function associated with the application, or a twin application of the application.

20 Claims, 31 Drawing Sheets

(56) References Cited

U.S. PATENT DOCUMENTS

| | | | | |
|---|---|---|---|---|
| 2014/0380239 A1* | 12/2014 | Kang | ............... | G06F 3/04842 715/810 |
| 2015/0033184 A1* | 1/2015 | Kim | ............... | G06F 3/0482 715/808 |
| 2015/0052464 A1* | 2/2015 | Chen | ............... | G06F 3/04817 715/765 |
| 2016/0342308 A1* | 11/2016 | Aggarwal | ............... | G06F 3/04817 |
| 2017/0212667 A1* | 7/2017 | Miyazaki | ............... | G06F 3/04845 |

FOREIGN PATENT DOCUMENTS

| CN | 106874046 A | 6/2017 |
|---|---|---|
| CN | 107239191 A | 10/2017 |

\* cited by examiner

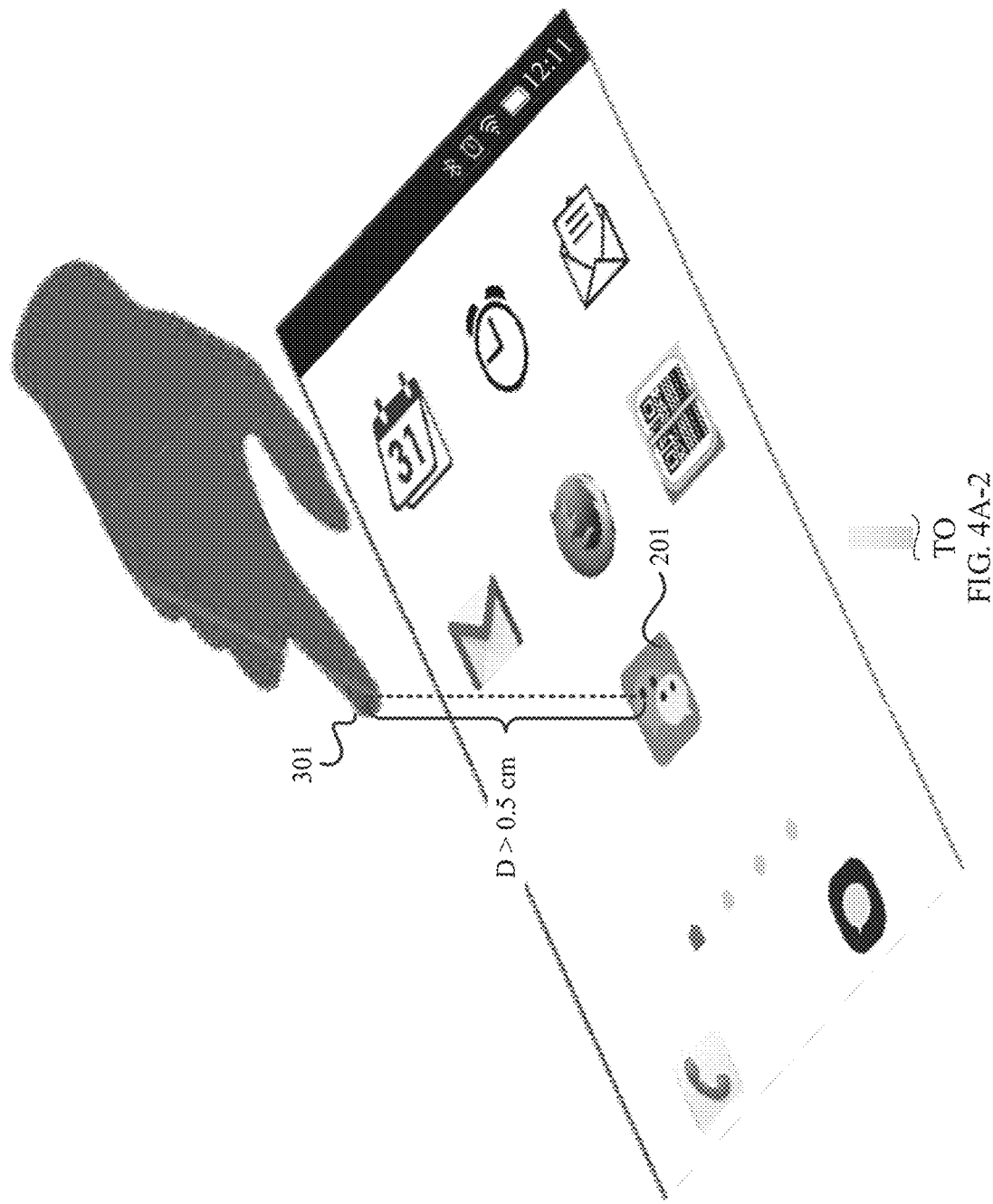

APPLICATION CONTROL METHOD, GRAPHICAL USER INTERFACE, AND TERMINAL

CROSS-REFERENCE TO RELATED APPLICATIONS

This application is a U.S. National Stage of International Patent Application No. PCT/CN2017/112037 filed on, Nov. 21, 2017 which is hereby incorporated by reference in its entirety.

TECHNICAL FIELD

This application relates to the field of man-machine interaction technologies, and in particular, to an application control method, a graphical user interface, and a terminal.

BACKGROUND

As a quantity of applications (application, APP) installed by a user on a mobile terminal grows, there are increasingly many application icons (icon) on the desktop (desktop), and some application icons are of relatively high similarity. Generally, the user needs to perform the following steps to start an application: find, by turning a page on the desktop, a page on which the application is located, then find an application icon of the application on the page, and finally tap the application icon of the application to start the application. Alternatively, the user may enter, on a search interface, a name of an application that the user wants to start, and after the search succeeds, tap a found application icon to start the application. All these methods for starting an application need cumbersome user operations, and user experience is poor.

As shown in FIG. 1, a plurality of applications are installed on a mobile terminal (such as a mobile phone), and application icons of the plurality of applications are arranged on four pages on a desktop. When the user wants to start an application (for example, Google Maps) on the fourth page, the user needs to slide the screen to turn to page 4, find an application icon of Google Maps on the page, and finally tap the application icon of Google Maps to start Google Maps. Therefore, the user needs to perform a plurality of operations to start the application, and the user needs to carefully browse and distinguish each application icon on each page to correctly find the application that the user wants to start, causing poor user experience.

SUMMARY

This application provides an application control method, a graphical user interface, and a terminal, to easily and quickly start an application program or a function associated with an application program.

According to a first aspect, this application provides an application control method, where the method may include: detecting, by a terminal, a user operation that is based on an application icon, and in response to the detected user operation, starting an associated function corresponding to the user operation. Herein, an application represented by the application icon has at least one associated function. The associated function corresponding to the user operation belongs to the at least one associated function, and the at least one associated function may include at least one of the following: an associated application of the application and a twin application of the application.

Optionally, the at least one associated function may further include at least one of the following: a function provided by the application (for example, application level settings) and a system function associated with the application (for example, system settings).

In this application, the user operation based on the application icon may be a sliding operation based on the application icon. A sliding direction, a sliding track, or the like may be used to define different sliding operations. Different sliding operations based on the application icon may be used to start different associated functions. In addition to the sliding operation, the user operation that is based on the application icon and that is used to quickly start the associated application may alternatively be a touch operation in another form, for example, a tap operation of a specific frequency based on the application icon or a press operation of a specific frequency based on the application icon. This is not limited herein. In addition to the touch operation, the user operation that is based on the application icon and that is used to quickly start the associated application may alternatively be a motion sensing operation for the application icon, requiring no direct touch on the touchscreen. Specifically, the motion sensing operation may be captured by using a floating detector.

The method described in the first aspect is implemented, so that the associated function can be quickly started by performing the user operation based on the application icon, avoiding that a user performs a plurality of operations (for example, page turning for search and tap for start). This is easier and more convenient.

With reference to the first aspect, in some optional implementations, an associated application of an application may be determined in the following several manners:

(1) The associated application may be set by the user.

For example, associated applications ("Gallery" and "Himalaya") of "WeChat" may be set by the user based on a preference of the user. The example is merely used to explain this application and shall not be construed as a limitation. A policy of setting an associated application by the user is not limited herein.

(2) The associated application may be set by the terminal according to a preset rule.

Optionally, for an application, the terminal may set another application whose application type is the same as an application type of the application as an associated application of the application.

For example, the terminal may set another instant messaging application of a social type (for example, an instant messaging application Twitter Twitter of a social type) as an associated application of "WeChat". The example is merely used to explain this application and shall not be construed as a limitation.

Optionally, for an application, the terminal may recommend, as an associated application of the application, another application whose application name has a same initial as that of the application. For example, the terminal may set another application whose application name has an initial "W" as an associated application of "WeChat" (an initial of "WeChat" is "W"). The example is merely used to explain this application and shall not be construed as a limitation.

It may be understood that determining an associated application of an application according to a preset rule makes it easy for a user to determine which applications are associated with the application. This is easy and effective. In addition to the foregoing two manners, there may be another different preset rule for the terminal to set an associated application. This is not limited herein.

(3) The associated application may be intelligently determined by the terminal based on a running status of the application.

Optionally, for an application, the terminal may determine, as an associated application of the application, another application that runs simultaneously with the application for a largest quantity of times or a longest time. For example, upon analysis of a running status of each application, the terminal finds that the user usually starts "Gallery" and "Himalaya" at the same time when the user starts "WeChat". Therefore, the terminal may determine that "Gallery" and "Himalaya" are associated applications of "WeChat". This implementation is more compliant with a use habit of the user, thereby further improving user experience. The example is merely used to explain this application and shall not be construed as a limitation.

Optionally, for an application, the terminal may set another application that shares data with the application as an associated application of the application. For example, "Taobao (Taobao)" and "Alipay (Alipay)" share data with each other, and the terminal may determine "Alipay" as an associated application of "Taobao". In this way, it is convenient for the user to quickly start "Alipay" when using "Taobao", further improving user experience. "Taobao" is an e-commerce application, and "Alipay" is an online payment application. The example is merely used to explain this application and shall not be construed as a limitation.

It may be understood that determining an associated application of an application intelligently based on a running status of the application may mine an association between applications in depth. This better meets a use habit of a user and further improves user experience. In addition to the foregoing two manners, there may be another different manner for the terminal to intelligently determine an associated application. This is not limited herein.

In this application, if the application icon is a desktop folder icon, a desktop folder represented by the desktop folder icon is an application represented by the desktop folder icon. An associated application of the desktop folder may include an application in the desktop folder, and the desktop folder may include a plurality of applications.

With reference to the first aspect, in some optional implementations, the associated application (that is, the application in the desktop folder) of the desktop folder may be determined in the following manners:

(1) The associated application may be set by the user.

For example, associated applications ("Safari", "Settings", "Contacts", and "Flashlight") of a desktop folder represented by a desktop folder icon may be set by the user based on a preference of the user. The example is merely used to explain this application and shall not be construed as a limitation. A policy of setting an associated application by the user is not limited herein.

(2) The associated application may be set by the terminal according to a preset rule.

Optionally, the terminal may add applications of a same application type to a same desktop folder.

For example, the terminal may add social applications (such as WeChat and Twitter Twitter) to a same desktop folder. The example is merely used to explain this application and shall not be construed as a limitation.

Optionally, the terminal may add applications whose application names have a same initial to a same desktop folder.

For example, the terminal may add other applications whose application names have an initial "G" (such as Google Maps (Google Maps) and Gmail (Gmail)) to a same desktop folder. The example is merely used to explain this application and shall not be construed as a limitation.

It may be understood that determining an associated application of an application according to a preset rule makes it easy for a user to quickly determine applications in a desktop folder. This is easy and effective. In addition to the foregoing two manners, there may be another different preset rule for the terminal to set an associated application. This is not limited herein.

(3) The associated application may be intelligently set by the terminal based on a running status of the application.

Optionally, the terminal may add a plurality of applications that run simultaneously for a relatively large quantity of times or a relatively long time to a same desktop folder.

For example, upon analysis of a running status of each application, the terminal finds that the user usually starts "Gallery" and "Himalaya" at the same time when the user starts "WeChat". Therefore, the terminal may determine that the three applications "Gallery", "Himalaya", and "WeChat" are relatively highly associated, and may add the three applications to a same desktop folder. The example is merely used to explain this application and shall not be construed as a limitation.

Optionally, the terminal may add a plurality of applications that need to share data with each other to a same desktop folder.

For example, "Taobao" and "Alipay" share data with each other, and the terminal may determine that "Alipay" and "Taobao" are relatively highly associated, and may add the two applications to a same desktop folder. The example is merely used to explain this application and shall not be construed as a limitation.

It may be understood that setting an application in a desktop folder intelligently based on a running status of the application may mine an association between applications in depth. This better meets a use habit of a user and further improves user experience. In addition to the foregoing two manners, there may be another different manner for the terminal to intelligently set an application in the desktop folder. This is not limited herein.

In addition to the foregoing implementations, applications in a same desktop folder may alternatively be determined in another manner. This is not limited in this application.

With reference to the first aspect, in some optional implementations, the user operation that is based on the application icon and that is used to quickly start the associated application may be set in the following several manners:

(1) The user operation that is based on the application icon and that is used to quickly start the associated application may be set by the user.

For example, a user operation that is based on a "WeChat" application icon and that is used to quickly start "Gallery" (that is, a rightward sliding operation based on the "WeChat" application icon) and a user operation that is based on the "WeChat" application icon and that is used to quickly start "Himalaya" (to be specific, a leftward sliding operation based on the "WeChat" application icon) may be set by the user based on a preference of the user.

For example, a user operation that is based on a desktop folder icon and that is used to quickly start "Settings" (that is, a leftward sliding operation based on the desktop folder icon) and a user operation that is based on a desktop folder icon and that is used to quickly start "Contacts" (that is, a rightward sliding operation based on the desktop folder icon) may be set by the user based on a preference of the user.

The example is merely used to explain this application and shall not be construed as a limitation. A policy of setting, by a user, a user operation used to quickly start each associated application is not limited herein.

(2) The user operation that is based on the application icon and that is used to quickly start the associated application may be intelligently set by the terminal based on a use habit of the user.

Optionally, for a relatively common (or relatively highly associated) associated application, a common user operation based on an application icon may be set as a user operation used to quickly start the associated application.

For example, it is assumed that a most common associated application of "WeChat" is "Gallery", and when the user holds the terminal with a single hand, an upward sliding operation based on an application icon is a common operation. In this case, the terminal may set the upward sliding operation that is based on the "WeChat" application icon as a user operation used to quickly start "Gallery".

For example, it is assumed that a most common application in a desktop folder is "Settings", and when the user holds the terminal with a single hand, an upward sliding operation based on a desktop folder icon is a common operation. In this case, the terminal may set the upward sliding operation that is based on the desktop folder icon as a user operation used to quickly start "Settings".

The example is merely used to explain this application and shall not be construed as a limitation. For a policy of intelligently setting a user operation used to quickly start each associated application, by the terminal based on a use habit of the user, no limitation is imposed herein.

Herein, the terminal may obtain, by analyzing a user operation that is based on an application icon of any application, a common user operation that is based on the application icon. For example, it is assumed that the user usually slides upward on a "Taobao" application icon to start an associated application of "Taobao". In this case, the terminal may determine the user operation of sliding upward based on the application icon as a common user operation that is based on the application icon, and the common user operation that is based on the application icon is applicable to another application icon. For example, for a "Gallery" application icon, the terminal may determine that an upward sliding operation that is based on the "Gallery" application icon is a common user operation that is based on the "Gallery" application icon. The example is merely used to explain this application. In actual application, the terminal may alternatively use another manner to determine a common user operation that is based on an application icon. This is not limited herein.

It may be understood that intelligently setting, based on a use habit of the user, a user operation that is based on an application icon and that is used to quickly start each associated application can better meet a use habit of the user, improving user experience.

In addition to the foregoing implementations, a user operation that is based on an application icon and that is used to quickly start each associated application may be determined in another manner. For example, a user operation that is based on an application icon and that is used to quickly start an associated application may be randomly set by the terminal. This is not limited in this application.

With reference to the first aspect, in some optional implementations, the method may further include: displaying, by the terminal, an operation prompt, where the operation prompt may be used to indicate the user operation that is based on the application icon and that is used to start the associated function of the application. In this way, it is convenient for the user to know how to quickly start the associated application of the application, reducing a memory burden of the user.

Optionally, the terminal may display the operation prompt when detecting that an object (for example, a user finger or a stylus) performing the user operation approaches the application icon.

In some optional implementations, the operation prompt may be implemented in, but not limited to, the following several manners:

In a first implementation, the operation prompt may be a ring prompt area that appears around the application icon, and identification information of at least one associated function is displayed in the ring prompt area.

In specific implementation, when a user finger (or a stylus or the like) approaches the application icon, the terminal may output the ring prompt area used to prompt the user how to input an operation that is based on the application icon to start an associated application that the user wants to start. Optionally, to further enhance the prompt performance, the terminal may further display, between identification information of the associated application and the application icon, a prompt symbol used to indicate a sliding direction, for example, a dynamic arrow.

In specific implementation, in response to the detected sliding operation of sliding from the application icon to the identification information in the ring prompt area, the terminal may start a user interface of an associated function that the sliding operation points to. Herein, the associated function that the sliding operation points to is an associated function represented by the identification information that the sliding operation points to.

In a second implementation, the operation prompt may be at least one prompt area that is of a preset shape that is displayed in a floating manner around the application icon, for example, a "bubble". Identification information (for example, an application icon) of an associated application may be displayed in the prompt area of the preset shape. The "bubble" may be a prompt area of a bubble shape, and the identification information (for example, an application icon) of the application is displayed in the prompt area.

In a possible implementation, in response to the detected sliding operation of sliding from the application icon to the identification information in the prompt area of the preset shape, the terminal may start an associated function that the sliding operation points to. Herein, the associated function that the sliding operation points to is an associated function represented by the identification information that the sliding operation points to.

In another possible implementation, in response to the detected user operation performed on the prompt area of the preset shape, the terminal may start an associated function on which the user operation acts. Herein, the associated function on which the user operation acts is an associated function represented by the identification information displayed in the prompt area that is of the preset shape (for example, a "bubble") and on which the user operation is performed.

In a third implementation, the operation prompt may be at least one prompt area that is of a preset shape and that is displayed in a floating manner on the application icon, for example, a "bubble". Identification information (for example, an application icon) of an associated application may be displayed in the prompt area of the preset shape.

In specific implementation, in response to the detected user operation performed on the prompt area of the preset shape, the terminal may start an associated function on which the user operation acts. Herein, the associated function on which the user operation acts is an associated function represented by the identification information displayed in the prompt area that is of the preset shape (for example, a "bubble") and on which the user operation is performed.

With reference to the first aspect, in some optional implementations, the user operation based on the application icon may correspond to a plurality of associated functions, that is, the user operation based on the application icon may be used to quickly start the plurality of associated functions.

Optionally, the user operation that is based on the application icon and that is used to quickly start the plurality of associated applications may be a sliding operation of an arc sliding track on the application icon. In specific implementation, the terminal may start the plurality of associated applications in response to the detected sliding operation of an arc sliding track on an application icon.

Optionally, if the user operation used to quickly start the plurality of associated applications is a sliding operation of an arc sliding track, the terminal may detect a ratio R of a sliding arc length to an entire circumference, determine, based on the ratio R, a quantity N of the associated applications to be started, and finally start the N associated applications. N is directly proportional to R. That is, closer proximity between the user sliding arc and the entire circumference indicates a larger quantity of associated applications that the user may start.

In addition to the sliding operation of the arc sliding track, the user operation used to quickly start the plurality of associated applications may alternatively be a sliding operation of another sliding track that is based on the application icon, for example, a sliding operation of an anti-clockwise sliding track, or a Z shaped sliding track, or may be another touch operation or a non-touch operation that is based on the application icon.

According to a second aspect, this application provides a graphical user interface on a terminal device, where the terminal device may include a display, an input apparatus, a memory, and one or more processors configured to execute one or more programs stored in the memory. The graphical user interface may include an application icon of at least one application program displayed on the display. In response to a user operation that is based on the application icon and that is detected by the input apparatus, a user interface of an associated function corresponding to the user operation is displayed.

Herein, the user interface may be an interface last displayed when the user last time exits the associated function corresponding to the user operation or may be a default start interface of the associated function corresponding to the user operation. Herein, an application represented by the application icon has at least one associated function. The associated function corresponding to the user operation belongs to the at least one associated function, and the at least one associated function may include at least one of the following: an associated application of the application and a tin application of the application. Optionally, the at least one associated function may further include at least one of the following: a function provided by the application (for example, application level settings) and a system function associated with the application (for example, system settings).

Optionally, the input apparatus may include at least one of the following: a touch panel or a gesture sensor.

With reference to the second aspect, in some optional implementations, the terminal device may further include a floating detector. The graphical user interface may further include an operation prompt displayed in response to the user operation, detected by the floating detector, that an object (such as a user finger or a stylus) performing the user operation approaches the application icon.

Herein, the operation prompt herein may be used to indicate the user operation that is based on the application icon and that is used to start the associated function.

In some optional implementations, the operation prompt may be displayed in the following several manners:

In a first implementation, a ring prompt area may be displayed around the application icon by using the application icon as a center, and identification information of the at least one associated function is displayed in the ring prompt area.

Specifically, the graphical user interface may specifically include a user interface of an associated function that a sliding operation points to, displayed in response to the sliding operation, detected by the input apparatus, of sliding from the application icon to the identification information.

Herein, the associated function that the sliding operation points to may be an associated function represented by the identification information that the sliding operation points to. The user interface may be an interface last displayed when the user last time exits the associated function that the sliding operation points to or may be a default start interface of the associated function represented by the identification information that the sliding operation points to.

In a second implementation, at least one prompt area of a preset shape may be displayed in a floating manner around the application icon, and identification information of the at least one associated function is respectively displayed in the at least one prompt area.

In a possible implementation, the graphical user interface may specifically include a user interface of an associated function that a sliding operation points to, displayed in response to the sliding operation, detected by the input apparatus, of sliding from the application icon to the identification information.

The associated function that the sliding operation points to may be an associated function represented by the identification information that the sliding operation points to in the prompt area of the preset shape. The user interface may be an interface last displayed when the user last time exits the associated function that the sliding operation points to or may be a default start interface of the associated function represented by the identification information that the sliding operation points to.

In another possible implementation, the graphical user interface may specifically include a user interface of an associated function on which the user operation acts, displayed in response to the user operation that is detected by the input apparatus and that is performed on the prompt area of the preset shape.

Herein, the associated function on which the user operation acts is an associated function represented by the identification information displayed in the prompt area that is of the preset shape and on which the user operation is performed. The user interface is an interface last displayed when the user last time exits the associated function on which the user operation acts or may be a default start interface of the associated function on which the user operation acts.

In a third implementation, at least one prompt area of a preset shape may be displayed in a floating manner on the application icon, and identification information of the at least one associated function is respectively displayed in the at least one prompt area.

In specific implementation, the graphical user interface may specifically include a user interface of an associated function on which the user operation acts, displayed in response to the user operation that is detected by the input apparatus and that is performed on the prompt area of the preset shape.

Herein, the associated function on which the user operation acts is an associated function represented by the identification information displayed in the prompt area that is of the preset shape and on which the user operation is performed. The user interface is an interface last displayed when the user last time exits the associated function on which the user operation acts or may be a default start interface of the associated function on which the user operation acts.

With reference to the second aspect, in some optional implementations, the graphical user interface may specifically include user interfaces of a plurality associated functions displayed in response to a sliding operation of an arc sliding track that is based on the application icon and that is detected by the input apparatus.

According to a third aspect, this application provides a terminal, where the terminal may include an input apparatus, a memory, and a processor coupled to the memory. The input apparatus may be configured to detect a user operation that is based on an application icon, and in response to the user operation detected by the input apparatus, the processor starts an associated function corresponding to the user operation.

Herein, an application represented by the application icon may have at least one associated function. The associated function corresponding to the user operation belongs to the at least one associated function, and the at least one associated function may include at least one of the following: an associated application of the application and a twin application of the application. Optionally, the at least one associated function may further include at least one of the following: a function provided by the application (for example, application level settings) and a system function associated with the application (for example, system settings).

Optionally, the input apparatus may include at least one of the following: a touch panel or a gesture sensor.

With reference to the third aspect, in some optional implementations, the terminal may further include a display that may be configured to display an operation prompt. The operation prompt herein may be used to indicate the user operation that is based on the application icon and that is used to start the associated function.

With reference to the third aspect, in some optional implementations, the terminal may further include a floating detector, where the floating detector may be configured to detect that an object performing the user operation approaches the application icon. In this case, the display may be specifically configured to display the operation prompt when the floating detector detects that the object performing the user operation approaches the application icon.

In some optional implementations, the display may display the operation prompt in, but not limited to, the following manners:

In a first implementation, the display may be specifically configured to display a ring prompt area around the application icon by using the application icon as a center, and identification information of the at least one associated function is displayed in the ring prompt area.

Specifically, the input apparatus may be specifically configured to detect a sliding operation of sliding from the application icon to the identification information. In response to the sliding operation of sliding from the application icon to the identification information, detected by the input apparatus, the processor may be specifically configured to start an associated function that the sliding operation points to. The display may be specifically configured to display a user interface of the associated function that the sliding operation points to. Herein, the user interface may be an interface last displayed when the user last time exits the associated function corresponding to the user operation or may be a default start interface of the associated function corresponding to the user operation. Herein, the associated function that the sliding operation points to is an associated function represented by the identification information that the sliding operation points to.

In a second implementation, the display may be specifically configured to display at least one prompt area of a preset shape in a floating manner around the application icon. Identification information of the at least one associated function is respectively displayed in the at least one prompt area.

In a possible implementation, the input apparatus may be specifically configured to detect a sliding operation of sliding from the application icon to the identification information. In response to the sliding operation of sliding from the application icon to the identification information, detected by the input apparatus, the processor may be specifically configured to start an associated function that the sliding operation points to. The display may be specifically configured to display a user interface of the associated function that the sliding operation points to. Herein, the user interface may be an interface last displayed when the user last time exits the associated function corresponding to the user operation or may be a default start interface of the associated function corresponding to the user operation. Herein, the associated function that the sliding operation points to is an associated function represented by the identification information that the sliding operation points to.

In another possible implementation, the input apparatus may be specifically configured to detect a user operation performed on the prompt area. In response to the user operation performed on the prompt area of the preset shape, detected by the input apparatus, the processor may be specifically configured to start an associated function on which the user operation acts. The display may be specifically configured to display a user interface of the associated function on which the user operation acts. Herein, the user interface is an interface last displayed when the user last time exits the associated function on which the user operation acts or may be a default start interface of the associated function on which the user operation acts. Herein, the associated function on which the user operation acts is an associated function represented by the identification information displayed in the prompt area that is of the preset shape and on which the user operation is performed.

In a third implementation, the display may be specifically configured to display at least one prompt area of a preset shape in a floating manner on the application icon. Identification information of the at least one associated function is respectively displayed in the at least one prompt area.

In specific implementation, the input apparatus may be specifically configured to detect a user operation performed on the prompt area. In response to the user operation performed on the prompt area of the preset shape, detected by the input apparatus, the processor may be specifically configured to start an associated function on which the user operation acts. The display may be specifically configured to display a user interface of the associated function on which the user operation acts. Herein, the user interface is an interface last displayed when the user last time exits the associated function on which the user operation acts or may be a default start interface of the associated function on which the user operation acts. Herein, the associated function on which the user operation acts is an associated function represented by the identification information displayed in the prompt area that is of the preset shape and on which the user operation is performed.

According to a fourth aspect, this application provides a terminal, including a functional unit configured to perform the application control method in the first aspect.

According to a fifth aspect, this application provides a readable non-volatile storage medium storing a computer instruction, where the computer instruction is executed by a terminal to implement the application control method described in the first aspect. The terminal may be the terminal described in the third aspect or the fourth aspect.

According to a sixth aspect, this application provides a computer program product including an instruction. When the computer program product is run on a computer, the computer is enabled to perform the application control method described in the first aspect.

BRIEF DESCRIPTION OF DRAWINGS

To describe the technical solutions in the embodiments of this application or in the background more clearly, the following briefly describes the accompanying drawings required for describing the embodiments of this application or the background.

FIG. 4A-1 and FIG. 4A-2 to FIG. 4C are schematic diagrams of other man-machine interaction embodiments according to this application;

DESCRIPTION OF EMBODIMENTS

Terms used in implementations of this application are merely used to explain specific embodiments of this application, but are not intended to limit this application.

A main inventive principle of this application may include: quickly starting an associated function of an application represented by an application icon, by performing a user operation that is based on the application icon. An associated function of an application may include at least one of the following: an associated application of the application, a function provided by the application (for example, application level settings), and a system function associated with the application (for example, system settings).

A system mentioned in this application is an operating system running on a terminal, for example, Android OS, Windows Phone, or iOS. In addition to functions of an embedded operating system (such as process management, a file system, and a network protocol stack), the system mentioned in this application may be further applied to a power management part of a battery power supply system, an input/output part for user interaction, an embedded graphical user interface service providing a call interface for an upper-layer application, an underlying encoding and decoding service for a multimedia application, a Java running environment, a wireless communications core function for a mobile communications service, an upper-layer application on a smartphone, and the like.

Specifically, if the application icon is a desktop folder icon, a desktop folder represented by the desktop folder icon is an application represented by the desktop folder icon. An associated application of the desktop folder may include an application in the desktop folder, and the desktop folder may include a plurality of applications.

In this application, one application may have one or more associated functions. A plurality of different associated functions may be quickly started respectively by using different user operations that are based on an application icon of the application.

For ease of understanding of this application, some man-machine interaction embodiments provided in this application are first described.

Figure 2A:
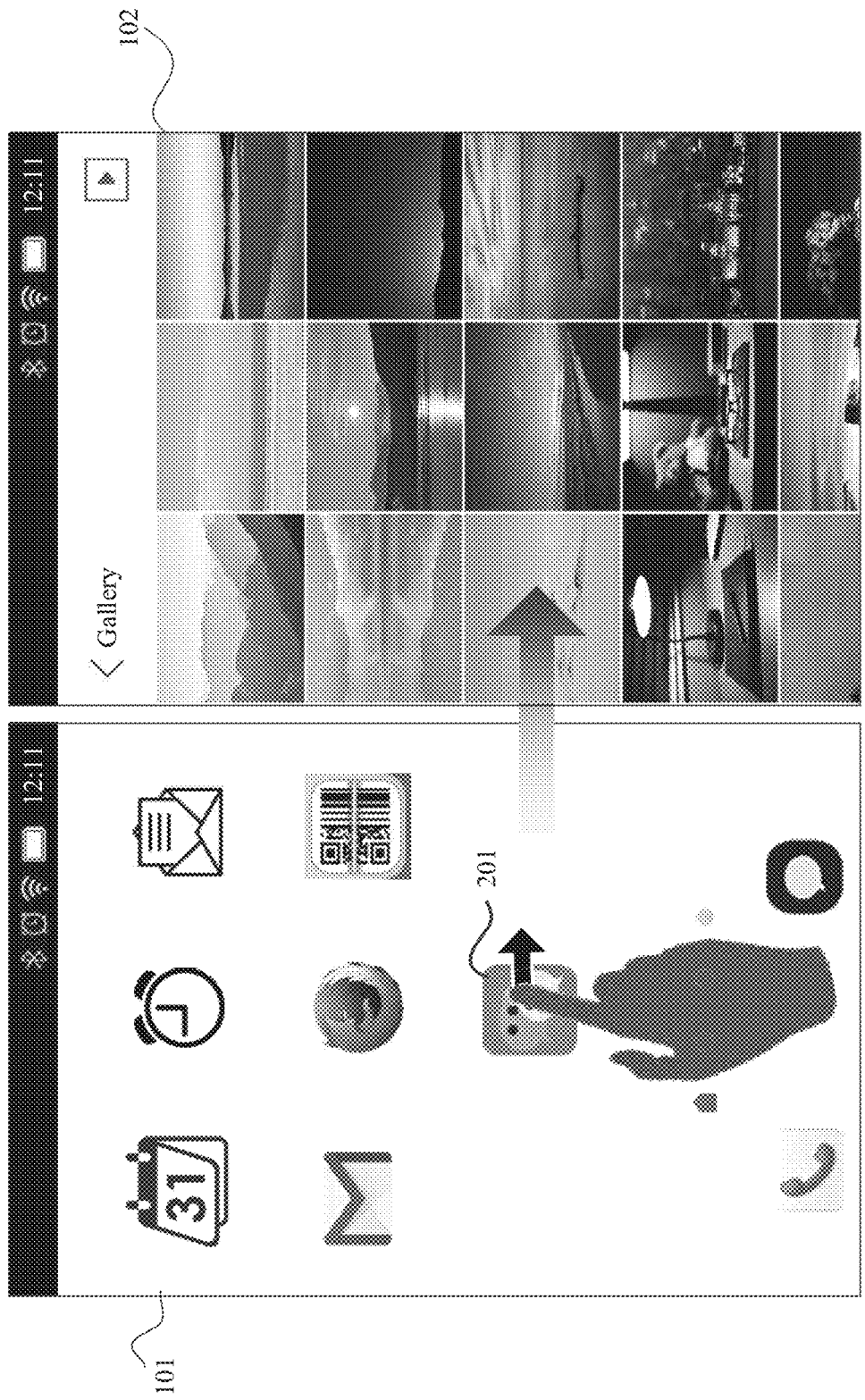
FIG. 2A and FIG. 2B are schematic diagrams of man-machine interaction embodiments according to this application.
Figure 2B:
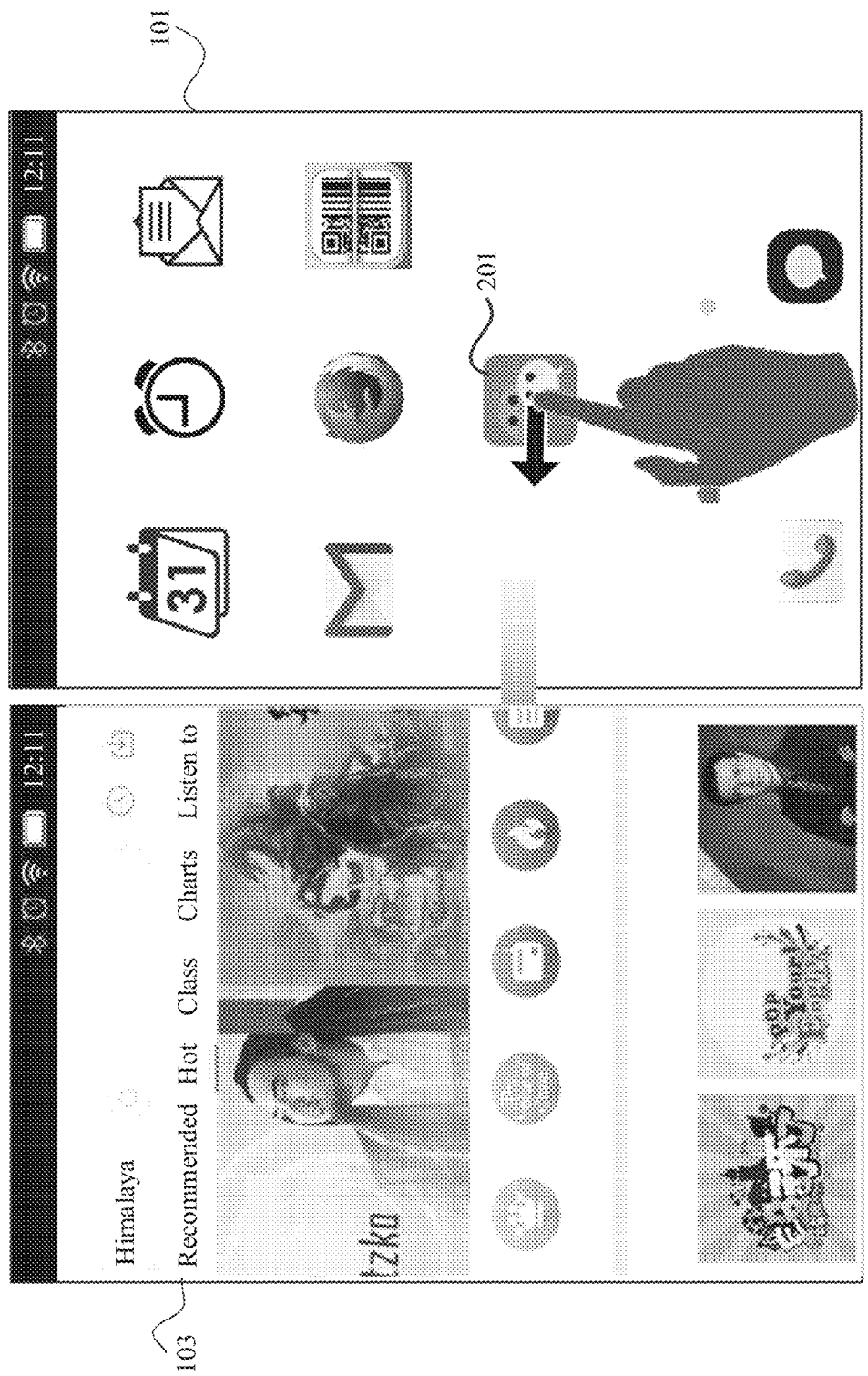

FIG. 2A and FIG. 2B show examples of some user operations that are based on an application icon and that are used to quickly start an associated application. A user operation based on a "WeChat (WeChat)" application icon

201 is used as an example. It is assumed that associated applications of "WeChat" include "Gallery" and "Himalaya", a user operation for quickly starting "Gallery" is a rightward sliding operation that is based on the "WeChat" application icon 201, and a user operation for quickly starting "Himalaya" is a leftward sliding operation that is based on the "WeChat" application icon 201. Herein, "WeChat" is an instant messaging application of a social type, "Gallery" is an application for storing pictures, and "Himalaya" is an online audio playback application. The three are merely used to explain this application and shall not be construed as a limitation.

As shown in FIG. 2A, on a home page 101, when the terminal detects a sliding operation on the "WeChat" application icon 201, and a sliding direction is rightward, the terminal may start (or open) "Gallery". In addition, the terminal may refresh an interface currently displayed on the screen from the home page 101 to a user interface 102 of "Gallery". The user interface 102 may be an interface last displayed when the user exits "Gallery" last time or may be a default start interface of "Gallery". Herein, the rightward sliding operation on the "WeChat" application icon 201 is a rightward sliding operation that is based on the "WeChat" application icon 201.

As shown in FIG. 2B, on the home page 101, when the terminal detects a sliding operation on the "WeChat" application icon 201, and a sliding direction is leftward, the terminal may start (or open) "Himalaya". In addition, the terminal may refresh an interface currently displayed on the screen from the home page 101 to a user interface 103 of "Himalaya". The user interface 103 may be an interface last displayed when the user exits "Himalaya" last time or may be a default start interface of "Himalaya". Herein, the leftward sliding operation on the "WeChat" application icon 201 is a leftward sliding operation that is based on the "WeChat" application icon 201.

It can be learned from FIG. 2A and FIG. 2B that, an associated application of an application represented by an application icon can be quickly started by performing a sliding operation based on the application icon, and a user does not need to perform a plurality of operations (for example, page turning for search and tap for start). This is easier and more convenient.

In addition to the user operations shown in FIG. 2A and FIG. 2B, the user operation that is based on the application icon and that is used to quickly start the associated application may alternatively be a sliding operation in another sliding direction or sliding track, for example, an upward sliding operation based on the application icon, a downward sliding operation based on the application icon, a sliding operation of an anti-clockwise arc track based on the application icon, a sliding operation of a clockwise arc track based on the application icon, or the like.

In addition to the sliding operation, the user operation that is based on the application icon and that is used to quickly start the associated application may alternatively be a touch operation in another form, for example, a tap operation of a specific frequency based on the application icon or a press operation of a specific frequency based on the application icon. This is not limited herein.

In addition to the touch operation, the user operation that is based on the application icon and that is used to quickly start the associated application may alternatively be a motion sensing operation for the application icon, requiring no direct touch on the touchscreen. Specifically, the motion sensing operation may be captured by using a floating detector (such as a floating touch panel, a depth camera, or a gesture sensor).

In embodiments shown in FIG. 2A and FIG. 2B, an associated application of an application may be determined in the following manners:

(1) The associated application may be set by the user.

For example, associated applications ("Gallery" and "Himalaya") of "WeChat" may be set by the user based on a preference of the user. The example is merely used to explain this application and shall not be construed as a limitation. A policy of setting an associated application by the user is not limited herein.

(2) The associated application may be set by the terminal according to a preset rule.

Optionally, for an application, the terminal may set another application whose application type is the same as an application type of the application as an associated application of the application.

For example, the terminal may set another instant messaging application of a social type (for example, an instant messaging application Twitter Twitter of a social type) as an associated application of "WeChat". The example is merely used to explain this application and shall not be construed as a limitation.

Optionally, for an application, the terminal may recommend, as an associated application of the application, another application whose application name has a same initial as that of the application. For example, the terminal may set another application whose application name has an initial "W" as an associated application of "WeChat" (an initial of "WeChat" is "W"). The example is merely used to explain this application and shall not be construed as a limitation.

It may be understood that determining an associated application of an application according to a preset rule makes it easy for a user to determine which applications are associated with the application. This is easy and effective. In addition to the foregoing two manners, there may be another different preset rule for the terminal to set an associated application. This is not limited herein.

(3) The associated application may be intelligently determined by the terminal based on a running status of the application.

Optionally, for an application, the terminal may determine, as an associated application of the application, another application that runs simultaneously with the application for a largest quantity of times or a longest time. For example, upon analysis of a running status of each application, the terminal finds that the user usually starts "Gallery" and "Himalaya" at the same time when the user starts "WeChat". Therefore, the terminal may determine that "Gallery" and "Himalaya" are associated applications of "WeChat". This implementation is more compliant with a use habit of the user, thereby further improving user experience. The example is merely used to explain this application and shall not be construed as a limitation.

Optionally, for an application, the terminal may set another application that shares data with the application as an associated application of the application. For example, "Taobao (Taobao)" and "Alipay (Alipay)" share data with each other, and the terminal may determine "Alipay" as an associated application of "Taobao". In this way, it is convenient for the user to quickly start "Alipay" when using "Taobao", further improving user experience. "Taobao" is an e-commerce application, and "Alipay" is an online payment application. The example is merely used to explain this application and shall not be construed as a limitation.

It may be understood that determining an associated application of an application intelligently based on a running status of the application may mine an association between applications in depth. This better meets a use habit of a user and further improves user experience. In addition to the foregoing two manners, there may be another different manner for the terminal to intelligently determine an associated application. This is not limited herein.

Figure 3A:
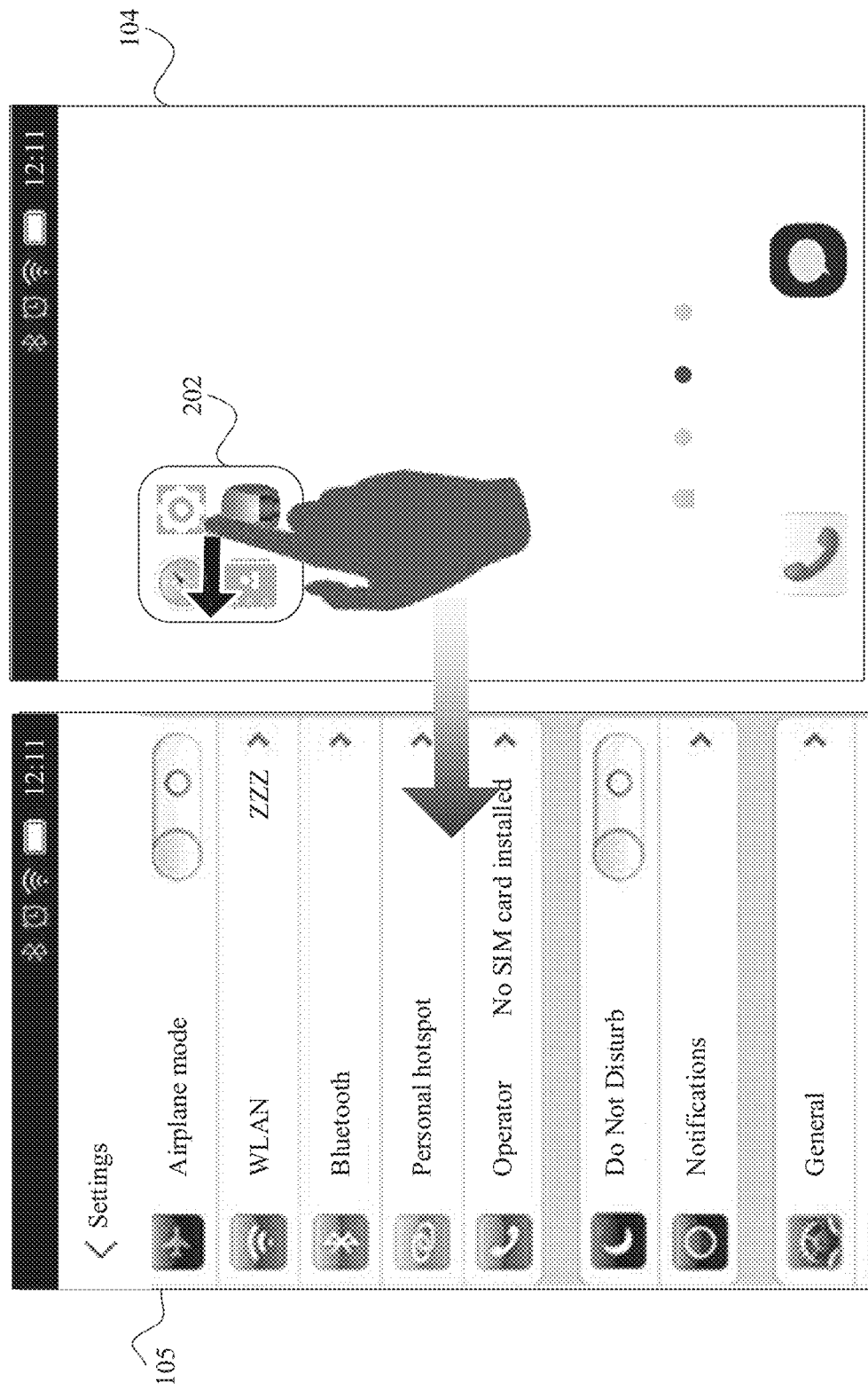
FIG. 3A and FIG. 3B are schematic diagrams of other man-machine interaction embodiments according to this application.
Figure 3B:
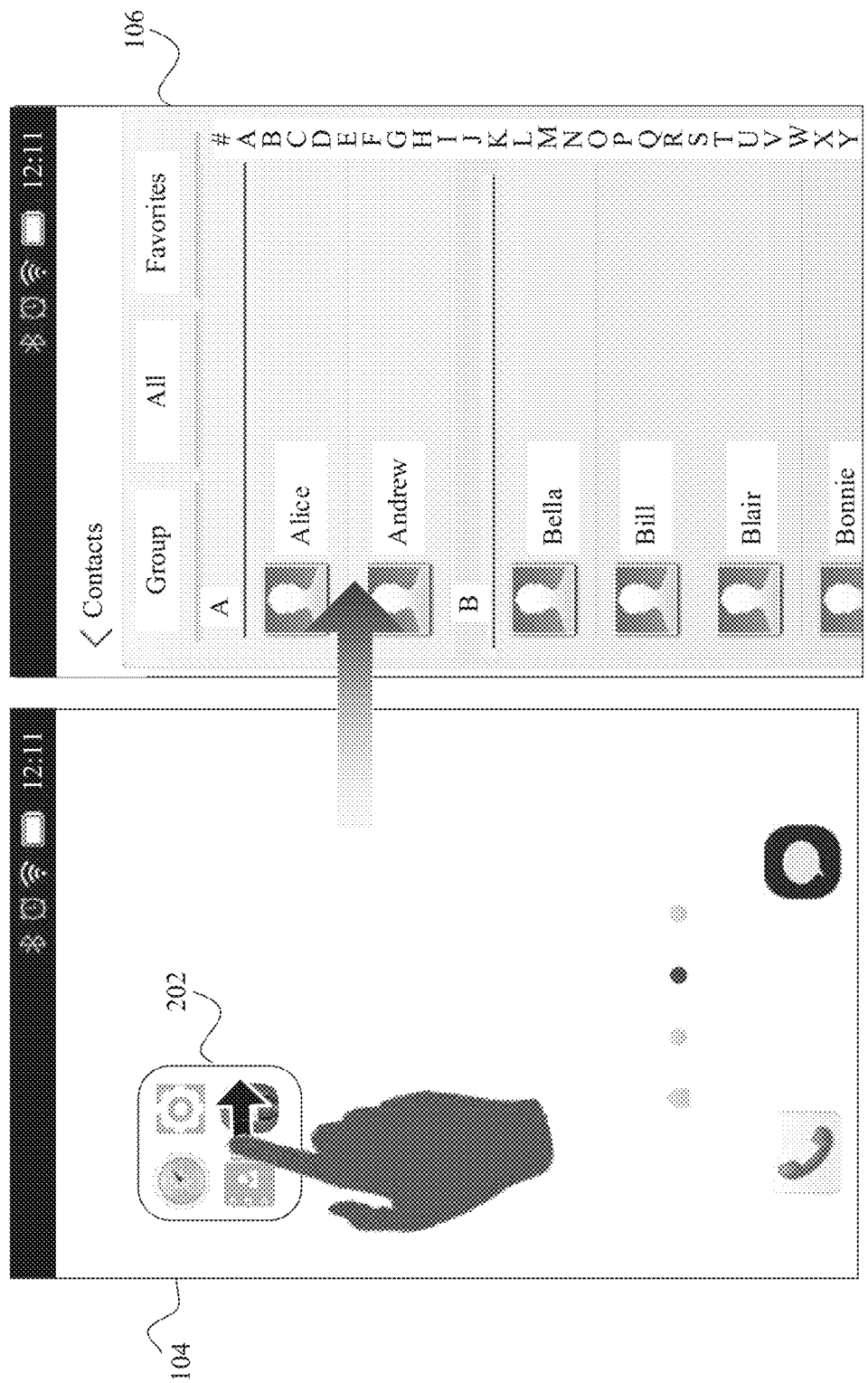

FIG. 3A and FIG. 3B show examples of some user operations that are based on an application icon and that are used to quickly start an associated application.

In embodiments shown in FIG. 3A and FIG. 3B, an application icon is a desktop folder icon. An application represented by the desktop folder icon is a desktop folder, and an associated application of the desktop folder is an application in the desktop folder. As shown in FIG. 3A and FIG. 3B, on a page 104, applications in a desktop folder represented by the desktop folder icon 202 include Safari, Settings (setting), Contacts (contact), and Flashlight. That is, associated applications of the desktop folder represented by the desktop folder icon 202 may include Safari, Settings (setting), Contacts (contact), and Flashlight. Herein, "Safari" is a browser.

As shown in FIG. 3A, on the page 104, when the terminal detects a sliding operation on the desktop folder icon 202, and a sliding direction is leftward, the terminal may start (or open) "Settings". In addition, the terminal may refresh an interface currently displayed on the screen from the page 104 to a user interface 105 of "Settings". The user interface 105 may be an interface last displayed when the user exits "Settings" last time or may be a default start interface of "Settings". Herein, the leftward sliding operation on the desktop folder icon 202 is a leftward sliding operation that is based on the desktop folder icon 202.

As shown in FIG. 3B, on the page 104, when the terminal detects a sliding operation on the desktop folder icon 202, and a sliding direction is rightward, the terminal may start (or open) "Contacts". In addition, the terminal may refresh an interface currently displayed on the screen from the page 104 to a user interface 106 of "Contacts". The user interface 106 may be an interface last displayed when the user exits "Contacts" last time or may be a default start interface of "Contacts". Herein, the rightward sliding operation on the desktop folder icon 202 is a rightward sliding operation that is based on the desktop folder icon 202.

It can be seen from FIG. 3A and FIG. 3B that, an application in a desktop folder can be quickly started by performing a sliding operation that is based on the desktop folder icon, and a user does not need to enter the desktop folder to search for and start the application, his is easier and more convenient.

Similar to the description of FIG. 2A and FIG. 2B, in addition to the user operations shown in FIG. 3A and FIG. 3B, the user operation that is based on a desktop folder icon and that is used to quickly start an application in a desktop folder may alternatively be a sliding operation in another sliding direction or sliding track, for example, an upward sliding operation based on the desktop folder icon, a downward sliding operation based on the desktop folder icon, a sliding operation of an anti-clockwise arc track based on the desktop folder icon, or a sliding operation of a clockwise arc track based on the desktop folder icon.

In addition to the sliding operation, the user operation that is based on the desktop folder icon and that is used to quickly start an application in the desktop folder may alternatively be a touch operation in another form, for example, a tap operation of a specific frequency based on the desktop folder icon or a press operation of a specific frequency based on the desktop folder icon. This is not limited herein.

In addition to the touch operation, the user operation that is based on the desktop folder icon and that is used to quickly start an application in the desktop folder may alternatively be a motion sensing operation for the desktop folder icon, requiring no direct touch on the screen. Specifically, the motion sensing operation may be captured by using a 3D motion sensor (for example, a depth camera).

In the embodiments shown in FIG. 3A and FIG. 3B, an associated application (that is, an application in the desktop folder) of the desktop folder may be determined in the following manners:

(1) The associated application may be set by the user.

For example, the associated applications ("Safari", "Settings", "Contacts", and "Flashlight") of the desktop folder represented by the desktop folder icon 202 may be set by the user based on a preference of the user. The example is merely used to explain this application and shall not be construed as a limitation. A policy of setting an associated application by the user is not limited herein.

(2) The associated application may be set by the terminal according to a preset rule.

Optionally, the terminal may add applications of a same application type to a same desktop folder.

For example, the terminal may add social applications (such as WeChat and Twitter Twitter) to a same desktop folder. The example is merely used to explain this application and shall not be construed as a limitation.

Optionally, the terminal may add applications whose application names have a same initial to a same desktop folder.

For example, the terminal may add other applications whose application names have an initial "G" (such as Google Maps (Google Maps) and Gmail (Gmail)) to a same desktop folder. The example is merely used to explain this application and shall not be construed as a limitation.

It may be understood that determining an associated application of an application according to a preset rule makes it easy for a user to quickly determine applications in a desktop folder. This is easy and effective. In addition to the foregoing two manners, there may be another different preset rule for the terminal to set an associated application. This is not limited herein.

(3) The associated application may be intelligently set by the terminal based on a running status of the application.

Optionally, the terminal may add a plurality of applications that run simultaneously for a relatively large quantity of times or a relatively long time to a same desktop folder.

For example, upon analysis of a running status of each application, the terminal finds that the user usually starts "Gallery" and "Himalaya" at the same time when the user starts "WeChat". Therefore, the terminal may determine that the three applications "Gallery", "Himalaya", and "WeChat" are relatively highly associated, and may add the three applications to a same desktop folder. The example is merely used to explain this application and shall not be construed as a limitation.

Optionally, the terminal may add a plurality of applications that need to share data with each other to a same desktop folder.

For example, "Taobao" and "Alipay" share data with each other, and the terminal may determine that "Alipay" and "Taobao" are relatively highly associated, and may add the two applications to a same desktop folder. The example is merely used to explain this application and shall not be construed as a limitation.

It may be understood that setting an application in a desktop folder intelligently based on a running status of the application may mine an association between applications in depth. This better meets a use habit of a user and further improves user experience. In addition to the foregoing two manners, there may be another different manner for the terminal to intelligently set an application in the desktop folder. This is not limited herein.

In addition to the foregoing described manners of (1) to (3), applications in a same desktop folder may alternatively be determined in another manner. This is not limited in this application.

With reference to the embodiments in FIG. 2A and FIG. 2B or the embodiments in FIG. 3A and FIG. 3B, the user operation that is based on the application icon and that is used to quickly start the associated application may be set in the following manners:

(1) The user operation that is based on the application icon and that is used to quickly start the associated application may be set by the user.

For example, in the examples in FIG. 2A and FIG. 2B, the user operation that is based on the "WeChat" application icon and that is used to quickly start "Gallery" (that is, the rightward sliding operation based on the "WeChat" application icon) and the user operation that is based on the "WeChat" application icon and that is used to quickly start "Himalaya" (to be specific, the leftward sliding operation based on the "WeChat" application icon) may be set by the user based on a preference of the user.

For example, in the examples in FIG. 3A and FIG. 3B, the user operation that is based on the desktop folder icon 202 and that is used to quickly start "Settings" (that is, the leftward sliding operation based on the desktop folder icon 202) and the user operation that is based on the desktop folder icon 202 and that is used to quickly start "Contacts" (that is, the rightward sliding operation based on the desktop folder icon 202) may be set by the user based on a preference of the user.

The example is merely used to explain this application and shall not be construed as a limitation. A policy of setting, by a user, a user operation used to quickly start each associated application is not limited herein. 2?

(2) The user operation that is based on the application icon and that is used to quickly start the associated application may be intelligently set by the terminal based on a use habit of the user.

Optionally, for a relatively common (or relatively highly associated) associated application, a common user operation based on an application icon may be set as a user operation used to quickly start the associated application.

For example, in the examples in FIG. 2A and FIG. 2B, it is assumed that a most common associated application of "WeChat" is "Gallery", and when the user holds the terminal with a single hand, the upward sliding operation based on the application icon is a common operation. In this case, the terminal may set the upward sliding operation that is based on the "WeChat" application icon as a user operation used to quickly start "Gallery".

For example, in the examples in FIG. 3A and FIG. 3B, it is assumed that a most common application in a desktop folder is "Settings", and when the user holds the terminal with a single hand, the upward sliding operation based on the desktop folder icon 202 is a common operation. In this case, the terminal may set the upward sliding operation that is based on the desktop folder icon 202 as a user operation used to quickly start "Settings".

The example is merely used to explain this application and shall not be construed as a limitation. For a policy of intelligently setting a user operation used to quickly start each associated application, by the terminal based on a use habit of the user, no limitation is imposed herein.

Herein, the terminal may obtain, by analyzing a user operation that is based on an application icon of any application, a common user operation that is based on the application icon. For example, it is assumed that the user usually slides upward on a "Taobao" application icon to start an associated application of "Taobao". In this case, the terminal may determine the user operation of sliding upward based on the application icon as a common user operation that is based on the application icon, and the common user operation that is based on the application icon is applicable to another application icon. For example, for a "Gallery" application icon, the terminal may determine that an upward sliding operation that is based on the "Gallery" application icon is a common user operation that is based on the "Gallery" application icon. The example is merely used to explain this application. In actual application, the terminal may alternatively use another manner to determine a common user operation that is based on an application icon. This is not limited herein.

It may be understood that intelligently setting, based on a use habit of the user, a user operation that is based on an application icon and that is used to quickly start each associated application can better meet a use habit of the user, improving user experience.

In addition to the foregoing manners of (1) and (2), a user operation that is based on an application icon and that is used to quickly start each associated application may be determined in another manner. For example, a user operation that is based on an application icon and that is used to quickly start an associated application may be randomly set by the terminal. This is not limited in this application.

Further, to help the user learn how to quickly start an associated application of an application, this application provides an operation prompt used to prompt the user how to perform a user operation that is based on an application icon to quickly start the associated application. Detailed descriptions are provided below with reference to accompanying drawings.

FIG. 4A-1 and FIG. 4A-2 to FIG. 4C show examples of an operation prompt provided in this application. In the embodiments in FIG. 4A-1 and FIG. 4A-2 to FIG. 4C, the operation prompt may be a ring prompt area that appears around an application icon. Specifically, when a user finger (or a stylus or the like) approaches the application icon, the terminal may output the ring prompt area used to prompt the user how to input an operation that is based on the application icon to start an associated application that the user wants to start.

Figure 1:
FIG. 1 is a schematic diagram of a page layout of a plurality of application icons related to this application.
Figures 2, 4A:
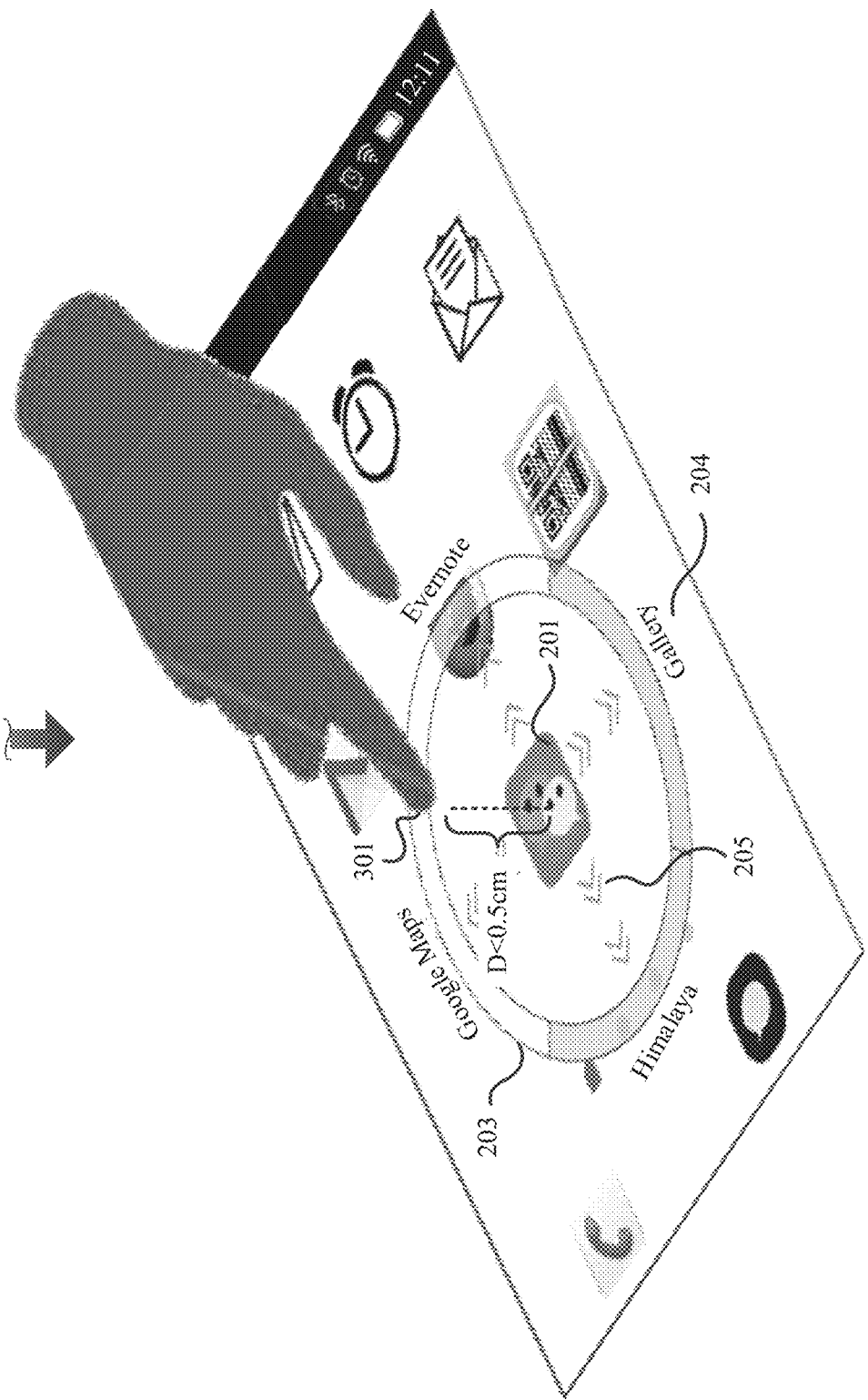

As shown in FIG. 4A-1 and FIG. 4A-2, on the home page 101, when it is detected that a user finger 301 approaches the "WeChat" application icon 201, the terminal may display a ring prompt area 203 centering on the "WeChat" application icon 201. Indication information (for example, an application name 204) of associated applications (such as "Google Maps", "Evernote", "Gallery", and "Himalaya") of "WeChat" is displayed in the ring prompt area 203. An application name of "Google Maps" is on a left side of the "WeChat" application icon 201, an application name of "Evernote" is above the "WeChat" application icon 201, an application name of "Gallery" is on a right side of the "WeChat" application icon 201, and an application name of "Himalaya" is below the "WeChat" application icon 201. In this way, when the user finger 301 slides from the "WeChat" application icon 201 to an associated application, the associated application may be triggered to start. Optionally, to further enhance the prompt performance, the terminal may further display, between identification information of the associated application and the "WeChat" application icon 201, a prompt symbol used to indicate a sliding direction, for example, a dynamic arrow 205.

Figure 4B:
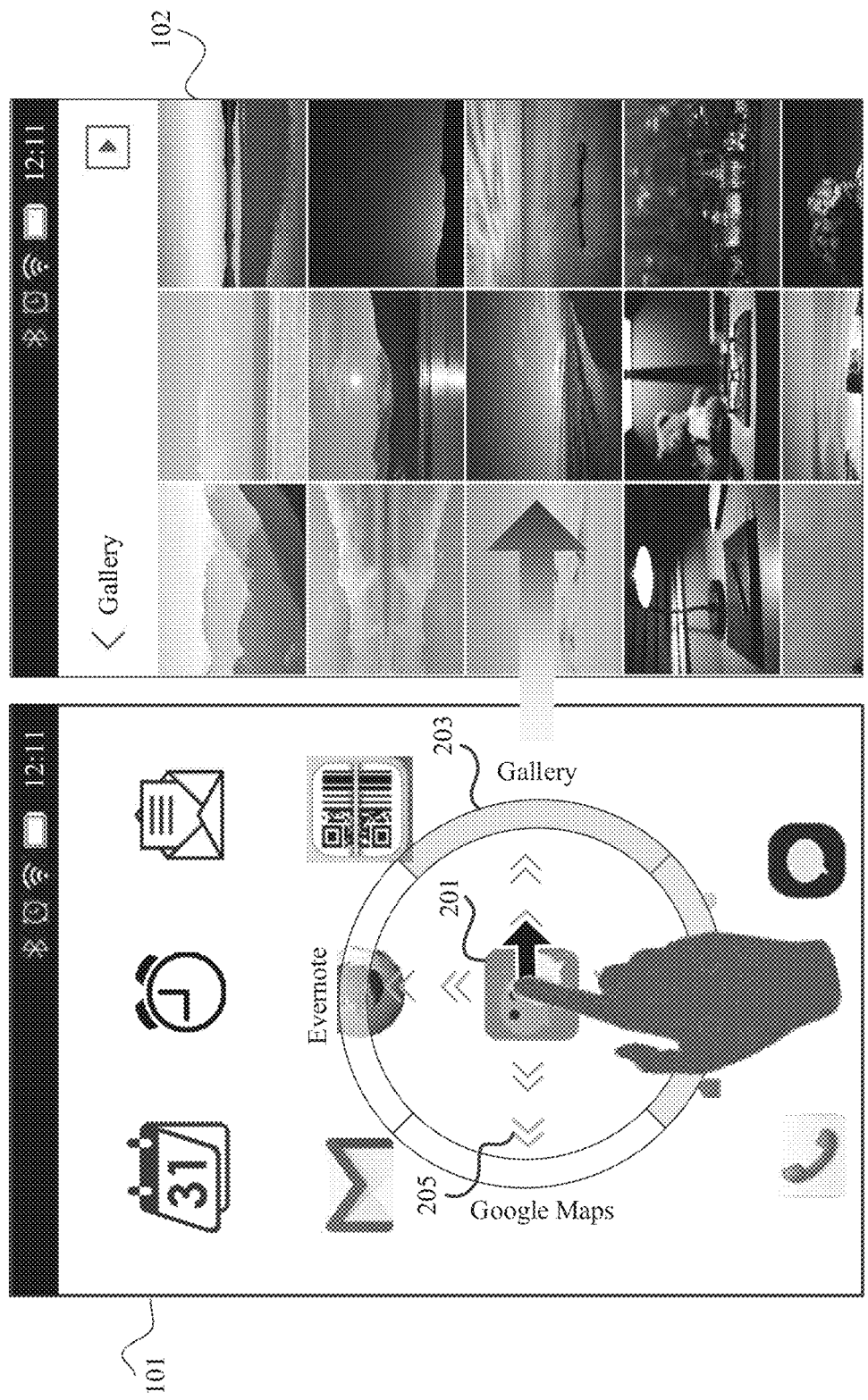
Figure 4C:
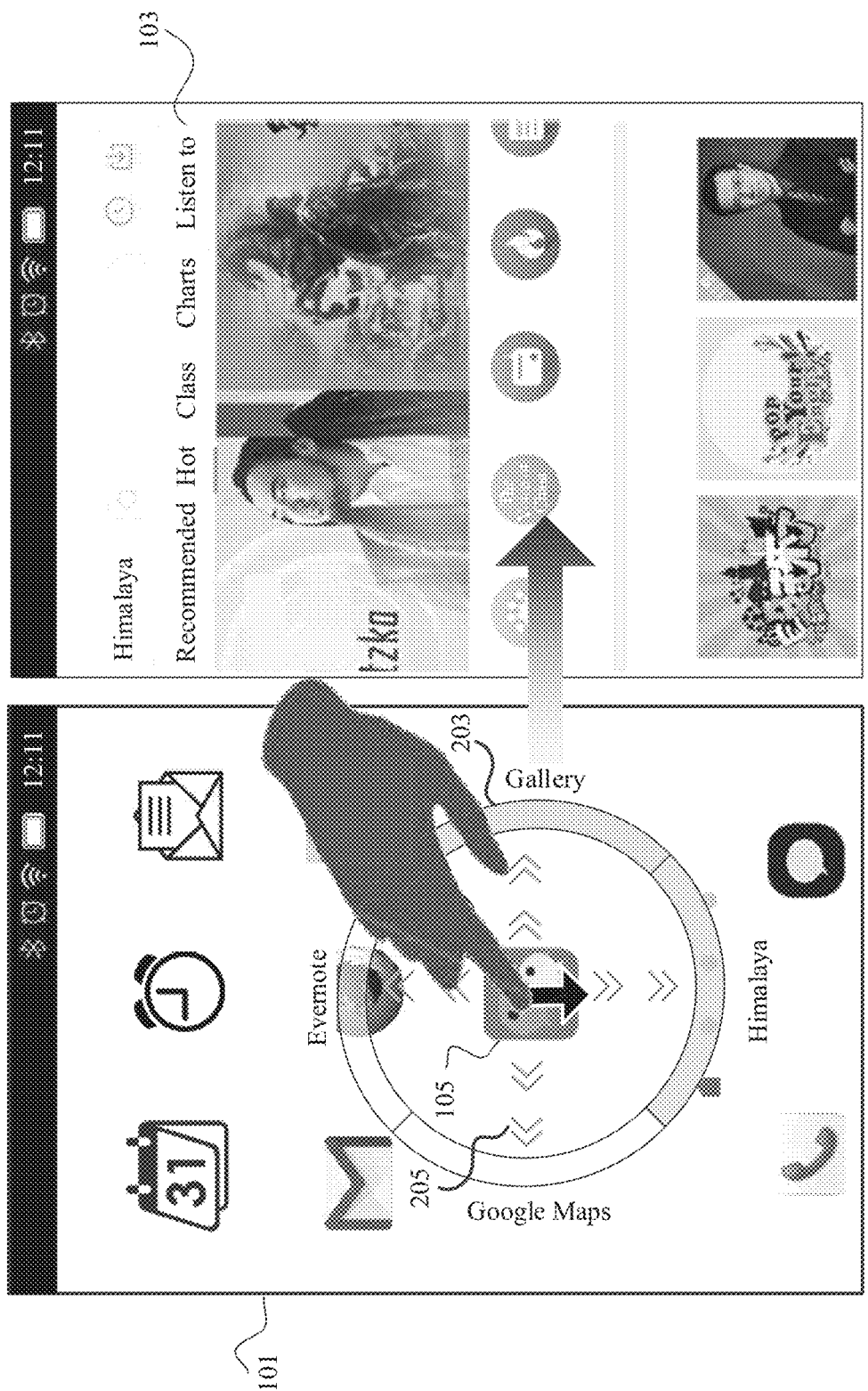

As shown in FIG. 4B and FIG. 4C, based on a prompt of the ring prompt area 203, the user may easily and conveniently start an associated application that the user wants to start. Details are as follows:

As shown in FIG. 4B, after the ring prompt area 203 is displayed, when a sliding operation is detected on the "WeChat" application icon 201, and a sliding direction is rightward, the terminal may start (or open) "Gallery". In addition, the terminal may refresh an interface currently displayed on the screen from the home page 101 to the user interface 102 of "Gallery". Herein, the rightward sliding operation on the "WeChat" application icon 201 is a rightward sliding operation that is based on the "WeChat" application icon 201.

As shown in FIG. 4B, after the ring prompt area 203 is displayed, when a sliding operation is detected on the "WeChat" application icon 201, and a sliding direction is downward, the terminal may start (or open) "Himalaya". In addition, the terminal may refresh an interface currently displayed on the screen from the home page 101 to the user interface 103 of "Himalaya". Herein, the leftward sliding operation on the "WeChat" application icon 201 is a leftward sliding operation that is based on the "WeChat" application icon 201.

FIG. 4A-1, FIG. 4A-2, and FIG. 4B show only an example of a man-machine interaction process about how to quickly start an associated application. In actual application, the man-machine interaction process shown in FIG. 4A-1, FIG. 4A-2, and FIG. 4B may alternatively be used to quickly start another associated function of an application, for example, a function provided by the application (for example, application level settings) and a system function associated with the application (for example, system settings).

In summary, the user may slide from the application icon to the identification information of the associated application according to the operation prompt. Correspondingly, in response to the detected sliding operation of sliding from the application icon to the identification information in the ring prompt area, the terminal may start an associated function that the sliding operation points to. Herein, the associated function that the sliding operation points to is an associated function represented by the identification information that the sliding operation points to.

In addition to the sliding operation shown in FIG. 4B and FIG. 4C, the user operation that is based on the application icon and that is used to quickly start the associated application may alternatively be a touch operation in another form, or may alternatively be a non-touch operation, for example, a motion sensing operation.

To avoid a misoperation, the terminal may further record duration in which the finger 301 stays above the "WeChat" application icon 201 and a vertical distance between the finger 301 and the "WeChat" application icon 201 is less than a preset threshold D. and may determine whether the duration exceeds a preset time length. If the duration exceeds the preset time length, the ring prompt area 203 is displayed. That is, the terminal may require that the user stay in a position close to the application icon for a period of time. This avoids that the user triggers display of the ring prompt area 203 when the user unintentionally approaches the application icon, thereby improving user experience. It may be understood that when the user finger 301 unintentionally approaches a specific application icon, a stay time is usually not long.

To further optimize user experience, for a relatively common (or relatively highly associated) associated application, the terminal may further display, at a position that a common sliding operation that is based on an application icon points to in the ring prompt area 203, identification information (for example, an application name) of the associated application.

For example, it is assumed that the common sliding operation based on the application icon is an upward sliding operation that is based on the application icon. In examples shown in FIG. 4A-1 and FIG. 4A-2 to FIG. 4C, if "Gallery" is a relatively common associated application of "WeChat", in the ring prompt area 203, the terminal may display indication information of "Gallery" (for example, an application name of "Gallery") above the "WeChat" application icon 201, to prompt the user to start "Gallery" by performing an upward sliding operation based on the "WeChat" application icon 201. In this way, the user can start a common associated application by performing a common operation, to more easily and conveniently start the associated application. The example is merely used to explain this application and shall not be construed as a limitation.

In the embodiments in FIG. 4A-1 and FIG. 4A-2 to FIG. 4C, the ring prompt area 203 disappears in, but not limited to, the following cases: 1. A user operation based on an application icon (a user operation shown in FIG. 4B) is detected; 2. It is detected that the user finger 301 touches an application icon (that is, before a user operation based on the application icon is detected); 3. Duration for continuously displaying the ring prompt area 203 exceeds certain duration (for example, 2 seconds).

It may be understood that, in implementing the embodiments in FIG. 4A-1 and FIG. 4A-2 to FIG. 4C, when the user finger approaches an application icon of an application, the ring prompt area 203 centering on the application icon is displayed, to prompt the user to slide from the application icon to an associated application in the ring prompt area 203. It is convenient for the user to learn how to quickly start the associated application of the application, and such outward sliding operation centering on the application icon quite conforms to an operation habit of the user, so that the user can quickly start the application by performing one sliding operation.

Figure 5A:
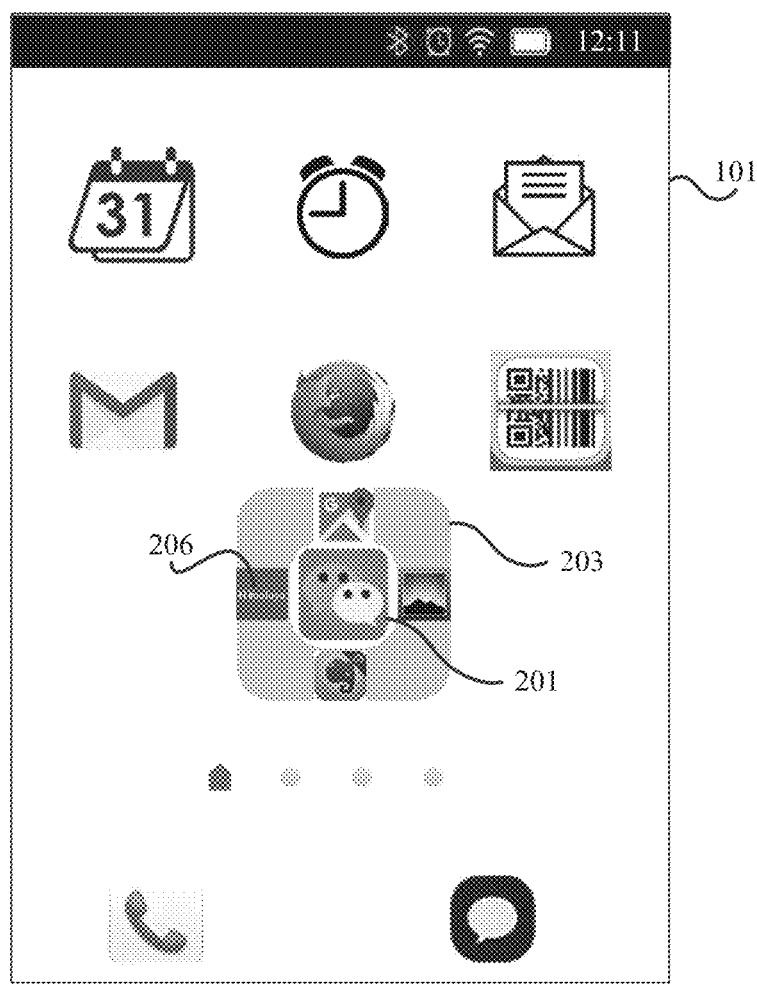
FIG. 5A and FIG. 5B are schematic diagrams of other man-machine interaction embodiments according to this application.
Figure 5B:
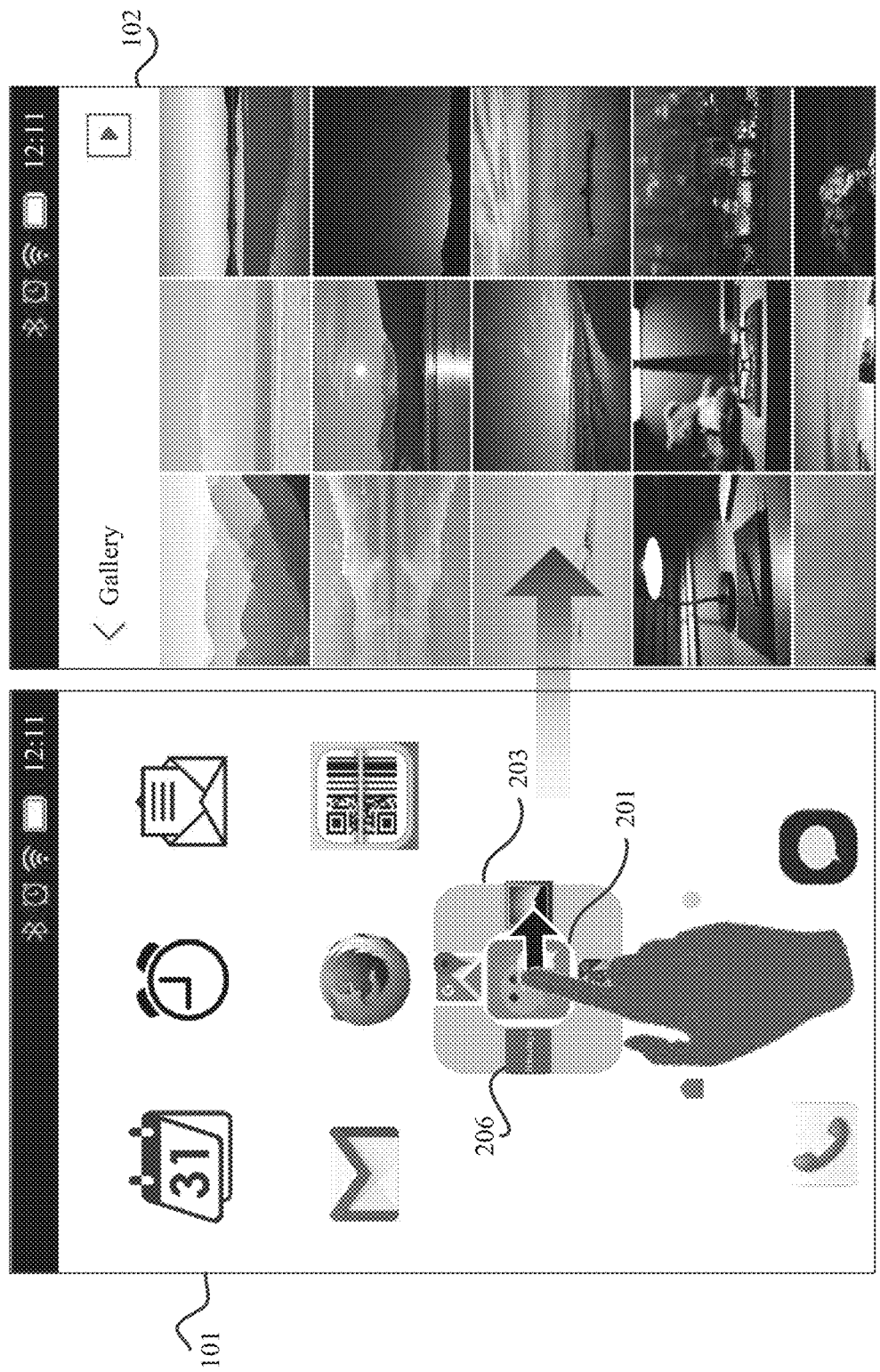

FIG. 5A and FIG. 5B show an example of another operation prompt provided in this application. In the embodiment in FIG. 5A and FIG. 5B, the ring prompt area may be displayed around the application icon in a wrapped manner.

As shown in FIG. 5A, on the home page 101, the terminal may display the ring prompt area 203 in a wrapped manner around the "WeChat" application icon 201. Indication information (for example, an application icon 206) of associated applications (such as "Google Maps", "Evernote", "Gallery", and "Himalaya") of "WeChat" is displayed in the ring prompt area 203. An application icon of "Google Maps" is on a left side of the "WeChat" application icon 201, an application icon of "Evernote" is above the "WeChat" application icon 201, an application icon of "Gallery" is on a right side of the "WeChat" application icon 201, and an application icon of "Himalaya" is below the "WeChat" application icon 201. In this way, when the user finger 301 slides from the "WeChat" application icon 201 to an associated application, the associated application may be triggered to start.

As shown in FIG. 5B, when the terminal detects a sliding operation on the "WeChat" application icon 201, and a sliding direction is rightward, the terminal may start (or open) "Gallery". In addition, the terminal may refresh an interface currently displayed on the screen from the home page 101 to the user interface 102 of "Gallery". Herein, the rightward sliding operation on the "WeChat" application icon 201 is a rightward sliding operation that is based on the "WeChat" application icon 201.

In addition to the sliding operation shown in FIG. 5B, the user operation that is based on the application icon and that is used to quickly start the associated application may alternatively be a touch operation in another form, or may alternatively be a non-touch operation, for example, a motion sensing operation.

To further optimize user experience, for a relatively common (or relatively highly associated) associated application, the terminal may further display, at a position that a common sliding operation that is based on an application icon points to in the ring prompt area 203, identification information (for example, an application name) of the associated application. In this way, the user can start a common associated application by performing a common operation, to more easily and conveniently start the associated application. For a specific example, refer to a related example in the embodiment in FIG. 4A-1, FIG. 4A-2, and FIG. 4C. Details are not described herein again.

In the embodiment in FIG. 5A and FIG. 5B, whether the ring prompt area is displayed may be determined in the following manners. In an implementation, the user may determine, by operating a display switch for an operation prompt, whether to display the ring prompt area. If the user turns on the display switch for the operation prompt, the terminal may display the ring prompt area in a wrapped manner around the application icon. If the user turns off the display switch for the operation prompt, the terminal may not display the ring prompt area in a wrapped manner around the application icon. In another implementation, when the user finger approaches the application icon (that is, the user operation shown in FIG. 4A-1 and FIG. 4A-2 occurs), the terminal may display the ring prompt area in a wrapped manner around the application icon. In still another implementation, provided that an application has an associated application, the terminal may always display the ring prompt area in a wrapped manner around an application icon of the application. In actual application, the terminal may further trigger, based on another condition, display of the ring prompt area shown in FIG. 5A and FIG. 5B. This is not limited herein.

It may be understood that, in implementing the embodiment in FIG. 5A and FIG. 5B, the ring prompt area is displayed in a wrapped manner around the application icon, to prompt the user to slide from the application icon to an associated application in the ring prompt area 203. It is convenient for the user to learn how to quickly start the associated application of the application, and such outward sliding operation centering on the application icon quite conforms to an operation habit of the user, so that the user can quickly start the application by performing one sliding operation.

Figure 6A:
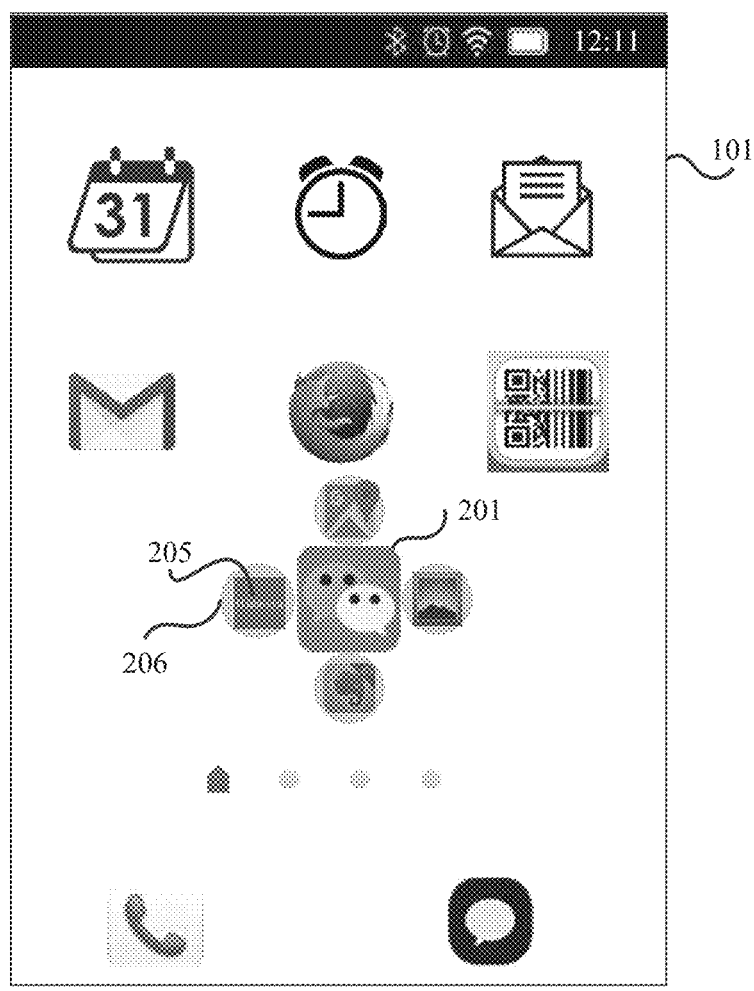
FIG. 6A to FIG. 6C are schematic diagrams of other man-machine interaction embodiments according to this application.
Figure 6B:
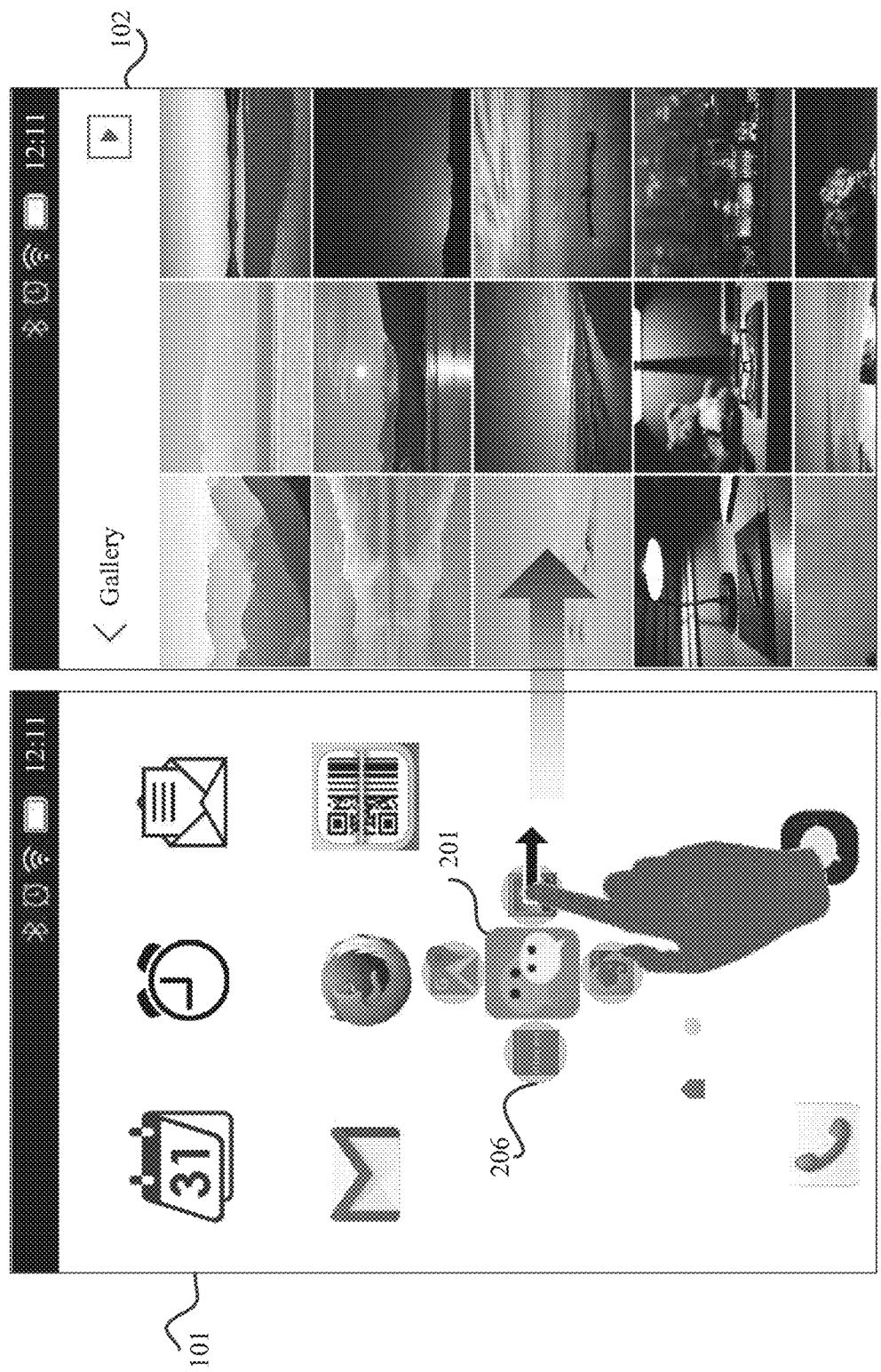
Figure 6C:
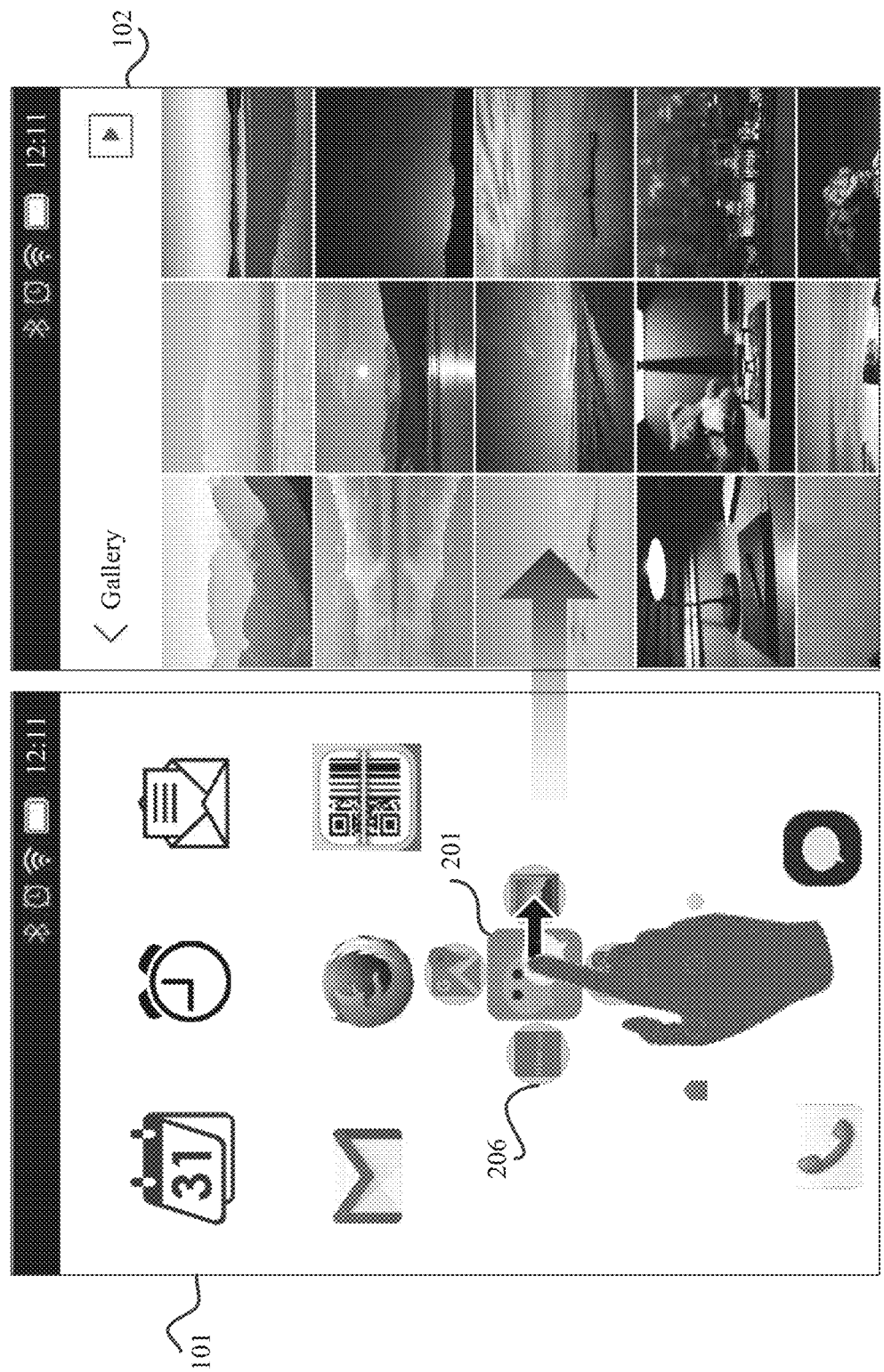

FIG. 6A to FIG. 6C show an example of still another operation prompt and a user operation used to quickly start an associated application according to this application. In the embodiment in FIG. 6A to FIG. 6C, the operation prompt may be a "bubble" displayed in a floating manner around the application icon, and identification information (for example, an application icon) of an associated application is displayed in the "bubble". The "bubble" may be a prompt area of a bubble shape, and the identification information (for example, an application icon) of the application is displayed in the prompt area. In specific implementation, the terminal may set a foreground picture of the prompt area to a bubble picture, to provide a visual effect that the application icon is placed inside the "bubble".

As shown in FIG. 6A, on the home page 101, the terminal may display four "bubbles" 206 around the "WeChat" application icon 201, and an application icon 205 is displayed in the "bubble" 206. A "Google Maps" application icon is displayed in a "bubble" above the "WeChat" application icon 201, an "Evernote" application icon is displayed in a "bubble" above the "WeChat" application icon 201, a "Gallery" application icon is displayed in a "bubble" on a right side of the "WeChat" application icon 201, and a "Himalaya" application icon is displayed in a "bubble" on a left side of the "WeChat" application icon 201.

As shown in FIG. 6B, when a sliding operation is detected on the "bubble" on the right side of the "WeChat" application icon 201, the terminal may output an effect of breaking the "bubble" (not shown), and start (or open) "Gallery". In addition, the terminal may refresh an interface currently displayed on the screen to the user interface 102 of "Gallery". Herein, a user operation on the "bubble" on the right side of the "WeChat" application icon 201 is a user operation that is based on the "WeChat" application icon 201. In this way, to start an associated application, the user may break (or poke or pierce) a "bubble" in which an application icon of the associated application is located. Therefore, user experience is easy and fun.

FIG. 6A and FIG. 6B show only an example of a man-machine interaction process about how to quickly start an associated application. In actual application, the man-machine interaction process shown in FIG. 6A and FIG. 6B may alternatively be used to quickly start another associated function of an application, for example, a function provided by the application (for example, application level settings) and a system function associated with the application (for example, system settings).

In summary, the user may perform a user operation of breaking or piercing a "bubble", that is, a user operation performed on the "bubble". Correspondingly, in response to the detected user operation performed on the "bubble", the terminal may start an associated function on which the user operation acts. Herein, the associated function on which the user operation acts is an associated function represented by identification information displayed in the prompt area that is of the preset shape (for example, a "bubble") and on which the user operation is performed.

Specifically, an effect of breaking a "bubble" may include but not limited to a visual effect, a sound effect, a mechanical vibration effect, and the like.

That is, the user operation used to quickly start the associated application may be a user operation performed on a "bubble", and an application icon of the associated application is displayed in the "bubble". In addition to the user operation shown in FIG. 6B, the user operation performed on a "bubble" may alternatively be another touch operation, for example, a tap operation (an effect of piercing a "bubble" may be generated), or may be a non-touch operation (for example, a gesture for breaking or piercing a "bubble").

Similar to the embodiments in FIG. 4A-1 and FIG. 4A-2 to FIG. 4C or the embodiment in FIG. 5A and FIG. 5B, the user operation used to quickly start the associated application may alternatively be a user operation of sliding to a "bubble" based on an application icon, and the application icon of the associated application is displayed in the "bubble".

For example, as shown in FIG. 6C, on the home page 101, when the terminal detects a sliding operation on the "WeChat" application icon 201, and a sliding direction is rightward, the terminal may start (or open) "Gallery". In addition, the terminal may refresh an interface currently displayed on the screen from the home page 101 to the user interface 102 of "Gallery". Herein, the rightward sliding operation on the "WeChat" application icon 201 is a rightward sliding operation that is based on the "WeChat" application icon 201. In this way, to start an associated application, the user may slide to a "bubble" in which an application icon of the associated application is located. This is easy and convenient, and user experience is good.

FIG. 6C shows only an example of a man-machine interaction process about how to quickly start an associated application. In actual application, the man-machine interaction process shown in FIG. 6C may alternatively be used to quickly start another associated function of an application, for example, a function provided by the application (for example, application level settings) and a system function associated with the application (for example, system settings).

In summary, the user may slide from the application icon to the identification information of the associated application according to the operation prompt. Correspondingly, in response to the detected sliding operation of sliding from the application icon to the identification information in the ring prompt area, the terminal may start an associated function that the sliding operation points to. Herein, the associated function that the sliding operation points to is an associated function represented by the identification information that the sliding operation points to.

In addition to the touch operation (directly touching the touchscreen) of sliding to a "bubble" shown in FIG. 6 C, the user operation used to quickly start the associated application may alternatively be a gesture operation (not directly touching the touchscreen) of sliding to a "bubble".

Further, in the embodiment in FIG. 6 C, the terminal may further display, in a "bubble" that a common sliding operation that is based on an application icon points to, an application icon of a relatively common (or relatively highly associated) associated application. For example, in the embodiment in FIG. 6 C, it is assumed that the user is used to slide upward. In this case, an application icon of a common associated application may be displayed above the "WeChat" application icon 201. The example is merely used to explain this application and shall not be construed as a limitation. In this way, the user can start a common associated application by performing a common operation, to more easily and conveniently start the associated application.

The bubbles are not limited to the circle bubbles shown in FIG. 6A to FIG. 6C. The bubble shape may alternatively be a half circle, an oval, or the like, provided that the bubble bulges due to internal air. In actual application, a UI effect may be 3 ?further set for the "bubble", for example, a translucent effect or a light shadow effect. This is not limited herein.

To further optimize user experience, for a relatively common (or relatively highly associated) associated application, the terminal may spotlight (for example, highlight) a "bubble" in which an application icon of the associated application is located.

In the embodiment in FIG. 6A to FIG. 6C, whether a "bubble" is displayed may be determined in the following manners. In an implementation, the user may determine, by operating a display switch for an operation prompt, whether to display the "bubble". If the user turns on the display switch for the operation prompt, the terminal may display the "bubble" in a floating manner around the application icon. If the user turns off the display switch for the operation prompt, the terminal may not display the "bubble" in a floating manner around the application icon. In another implementation, when the user finger approaches the application icon (that is, the user operation shown in FIG. 4A-I and FIG. 4A-2 occurs), the terminal may display the "bubble" in a floating manner around the application icon. In still another implementation, provided that an application has an associated application, the terminal may always display the "bubble" in a floating manner around an application icon of the application. In actual application, the terminal may further trigger, based on another condition, display of the "bubbles" shown in FIG. 6A to FIG. 6C. This is not limited herein.

Figure 7A:
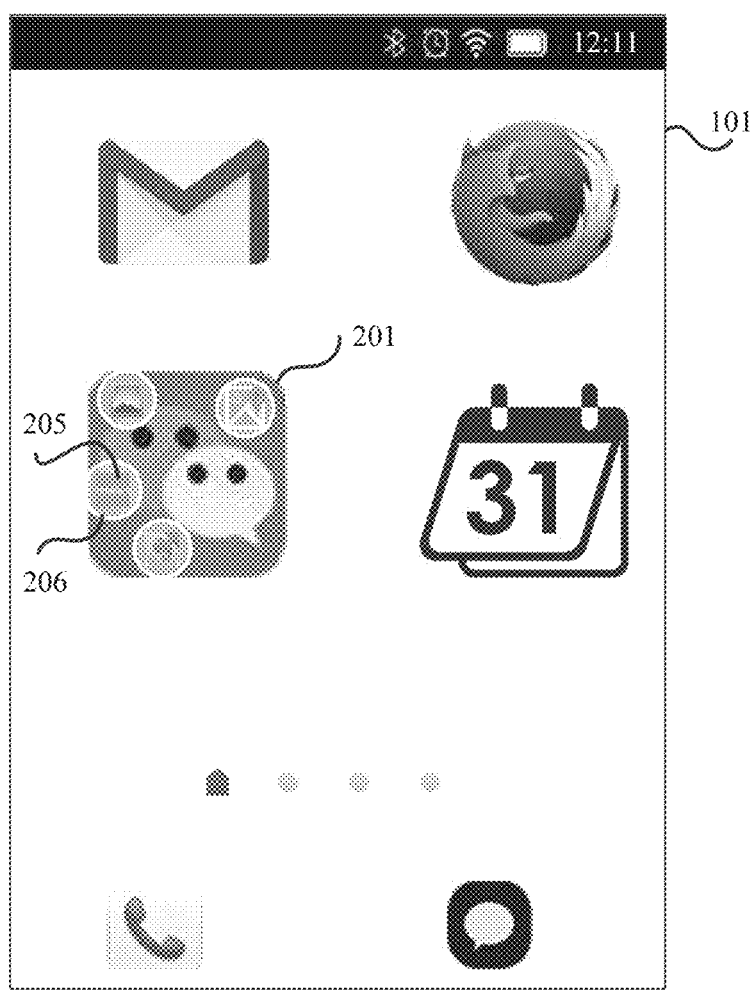
FIG. 7A and FIG. 7B are schematic diagrams of other man-machine interaction embodiments according to this application.
Figure 7B:
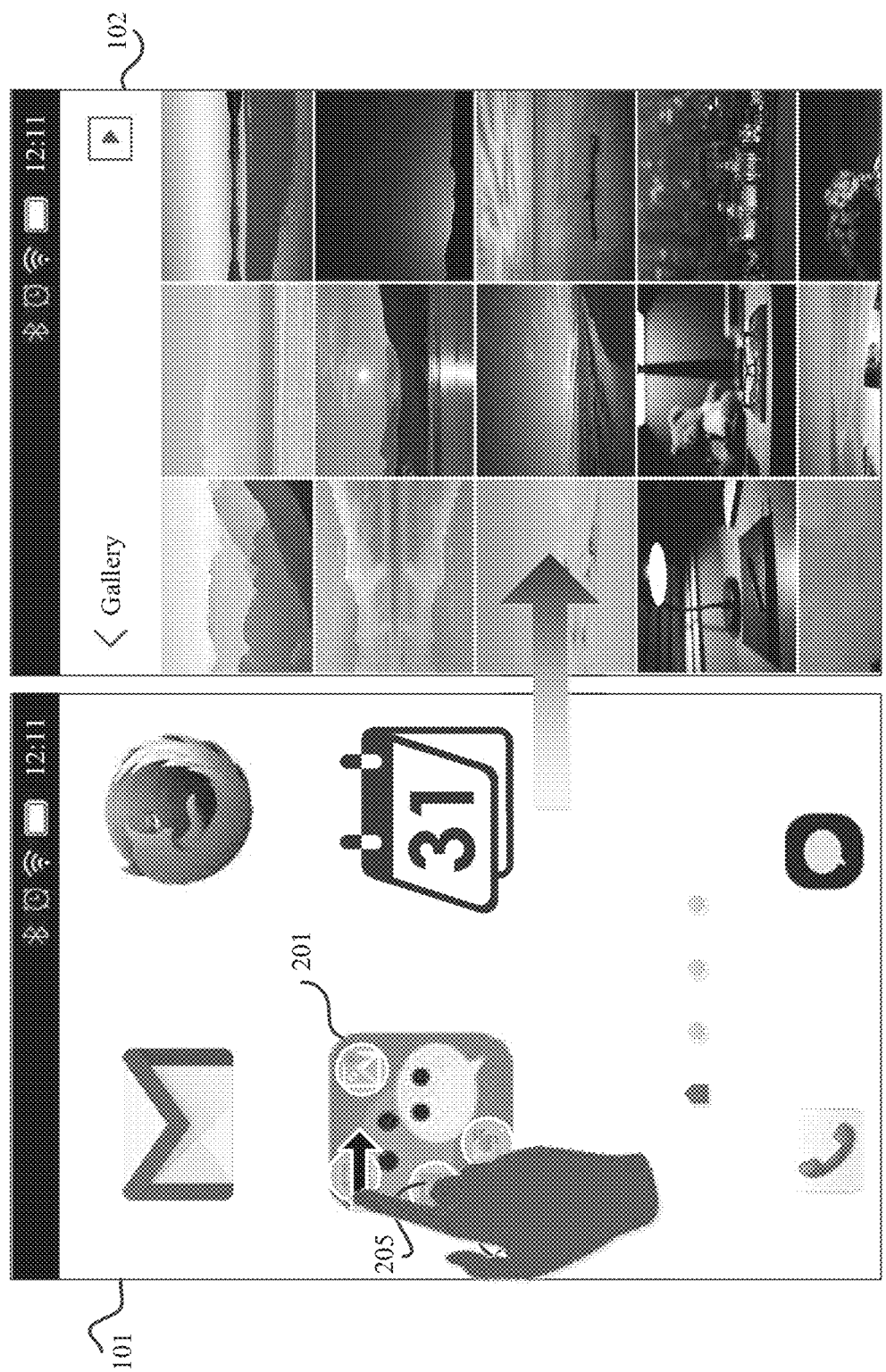

FIG. 7A to FIG. 7B show an example of still another operation prompt and a user operation used to quickly start an associated application according to this application. Different from the embodiment in FIG. 6A to FIG. 6C, a "bubble" may be displayed in a floating manner on the application icon. Vividly, an application icon may be similar to a container containing a "bubble".

As shown in FIG. 7A, on the home page 101, the terminal may display four "bubbles" 206 above the "WeChat" application icon 201, and an application icon 205 is displayed in the "bubble" 206. A "Google map" application icon, an "Evernote" application icon, a "Gallery" application icon, and a "Himalaya" application icon are respectively displayed in the four "bubbles".

As shown in FIG. 7B, when a sliding operation is detected on the "bubble" in which the "Gallery" application icon is displayed, the terminal may output an effect of breaking the "bubble" (not shown), and start (or open) "Gallery". In addition, the terminal may refresh an interface currently displayed on the screen to the user interface 102 of "Gallery". Herein, a user operation on a "bubble" above the "WeChat" application icon 201 is a user operation that is based on the "WeChat" application icon 201. In this way, to start an associated application, the user may break a "bubble" in which an application icon of the associated application is located. Therefore, user experience is easy and fun.

In addition to the user operation shown in FIG. 7B, the user operation may alternatively be a touch operation in another form, for example, a tap operation (an effect of piercing a "bubble" may be generated), or may be a non-touch operation (for example, a gesture for breaking or piercing a "bubble").

In the embodiment in FIG. 7A and FIG. 7B, in addition to the several manners of determining whether a "bubble" is displayed in the embodiment in FIG. 6A to FIG. 6C, the terminal may further display a "bubble" on an application icon when the display manner of the application icon is a large icon display manner. Optionally, the terminal may further detect a size of the application icon, and if the size exceeds a preset size (for example, 96×96 px) (a full name of px is pixel, pixel), a "bubble" may be displayed on the application icon. In actual application, the terminal may further trigger, based on another condition, display of the "bubbles" shown in FIG. 7A and FIG. 7B. This is not limited herein.

In some possible embodiments, the terminal may simultaneously display "bubbles" both around the application icon and on the application icon. In other words, scenario examples in FIG. 6A or FIG. 7A exist at the same time. This is not limited herein.

Figure 8A:
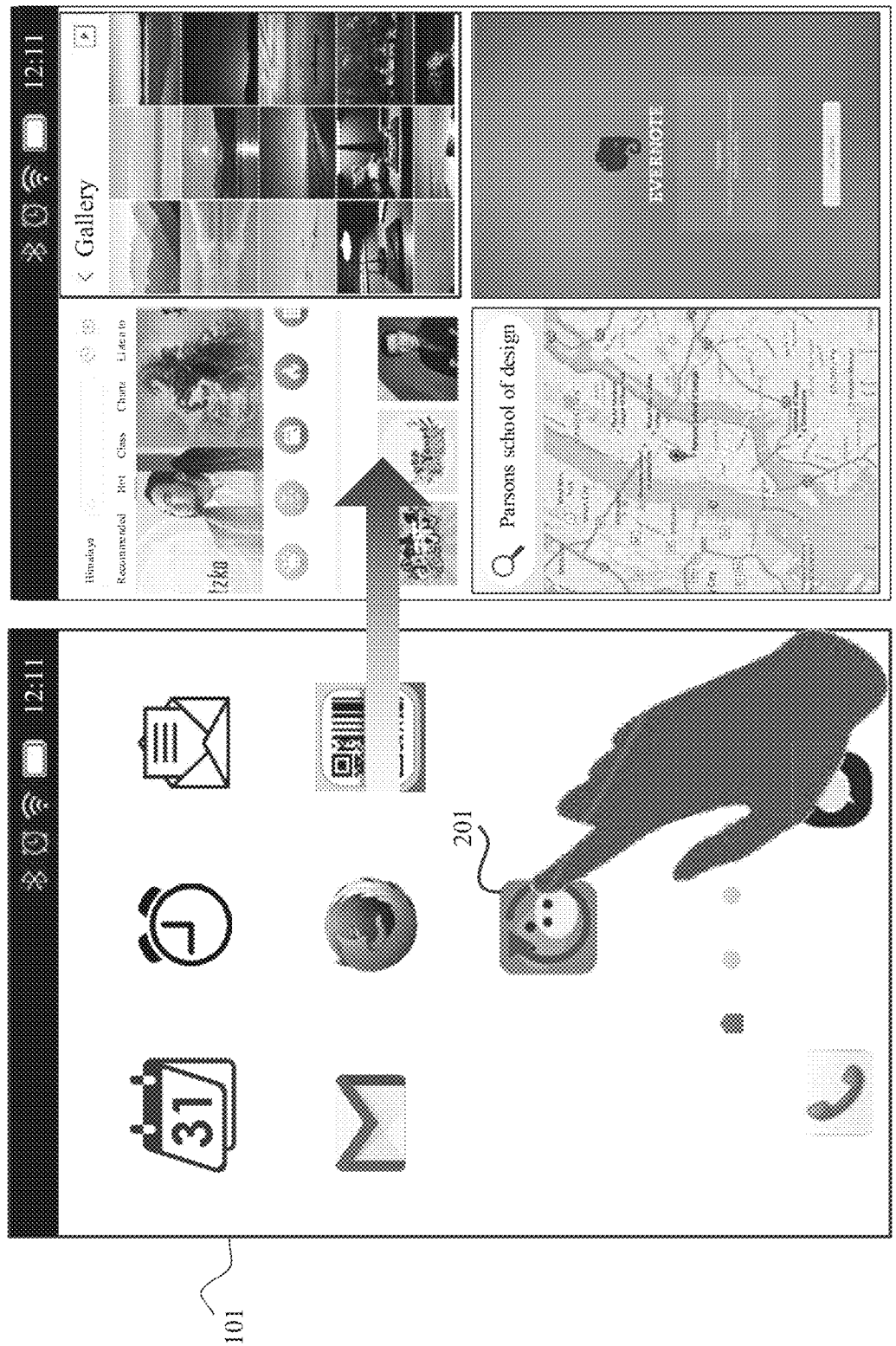
FIG. 8A to FIG. 8C are schematic diagrams of other man-machine interaction embodiments according to this application.
Figure 8B:
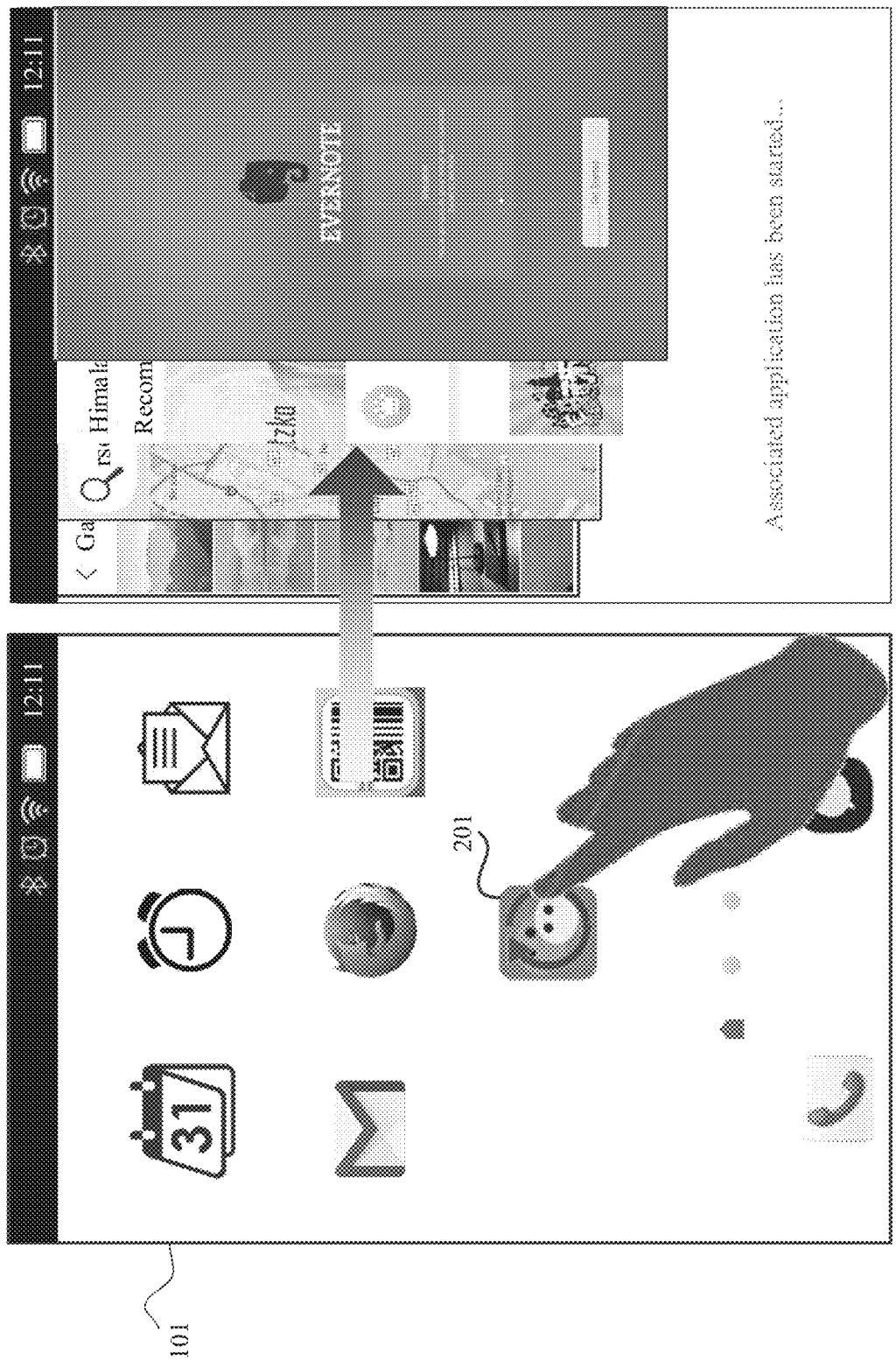

FIG. 8A and FIG. 8B show an example of a user operation that is based on an application icon and that is used to quickly start a plurality of associated applications. A user operation based on a "WeChat" application icon 201 is used as an example. It is assumed that associated applications of "WeChat" are "Google Maps", "Evernote", "Gallery", and "Himalaya".

As shown in FIG. 8A and FIG. 8B, on the home page 101, when the terminal detects a sliding operation on the "WeChat" application icon 201, and a sliding track is a clockwise sliding track, the terminal may start (or open) the plurality of associated applications of the "WeChat" application icon 201. Optionally, the plurality of associated applications may be all associated applications of "WeChat".

In addition, the terminal may display pages of the plurality of associated applications on a current screen. Optionally, as shown in FIG. 8A, the terminal may display the plurality of started associated applications in a split-screen manner. Optionally, as shown in FIG. 8B, the terminal may display the plurality of started associated applications in a stacking (stacking) manner. In actual application, the terminal may alternatively display the plurality of started associated applications in another manner. This is not limited herein.

In addition to the sliding operation shown in FIG. 8A and FIG. 8B, the user operation used to quickly start the plurality of associated applications may alternatively be a sliding operation of another sliding track that is based on the application icon, for example, a sliding operation of an anti-clockwise sliding track, or a Z shaped sliding track, or may be another touch operation or a non-touch operation that is based on the application icon. It should be understood that when the technical solutions provided in this application are implemented, it is necessary to distinguish between a user operation used to quickly start a specific associated application and a user operation used to quickly start a plurality of associated applications.

Optionally, if the user operation used to quickly start the plurality of associated applications is a sliding operation of an arc sliding track, the terminal may detect a ratio R of a sliding arc length to an entire circumference, determine, based on the ratio R, a quantity N of the associated applications to be started, and finally start the N associated applications. N is directly proportional to R. That is, closer proximity between the user sliding arc and the entire circumference indicates a larger quantity of associated applications that the user may start.

For example, FIG. 8 C shows examples of three different sliding arc lengths (1) to (3). A ratio of the sliding arc length (1) to the entire circumference is minimum, and a ratio of the sliding arc length (3) to the entire circumference is maximum. In an example shown in FIG. 8B, when detecting that an arc length of sliding implemented by the user is greater than the sliding arc length (1), the terminal may start one associated application of "WeChat". When detecting that an arc length of sliding implemented by the user is greater than the sliding arc length (2), the terminal may start two associated applications of "WeChat". When detecting that an arc length of sliding implemented by the user is greater than the sliding arc length (3), the terminal may start three associated applications of "WeChat". The example is merely used to explain this application and shall not be construed as a limitation.

It may be understood that, in the embodiment in FIG. 8A and FIG. 8B, a plurality of associated applications of one application can be quickly started by performing a user operation that is based on an application icon. This is very easy and efficient.

Based on the foregoing embodiments (the embodiment in FIG. 2A and FIG. 2B, FIG. 3A and FIG. 3B, FIG. 4A-1 and FIG. 4A-2 to FIG. 4C, FIG. 5A and FIG. 5B, FIG. 6A to FIG. 6C, or FIG. 7A and FIG. 7B), the following describes related extended embodiments.

(1) Extended Embodiment 1

In this embodiment, in the scenario shown in FIG. 6A or FIG. 7A, the user may start a plurality of associated applications by breaking a plurality of "bubbles" at a time or by consecutively poking a plurality of "bubbles".

Optionally, when the terminal detects a sliding operation on the "WeChat" application icon 201, and the sliding operation is performed on a plurality of "bubbles", the terminal may output an effect of breaking the plurality of "bubbles" (not shown), and start (or open) associated applications respectively corresponding to the plurality of "bubbles". Herein, an associated application corresponding to a "bubble" is an application represented by an application icon displayed in the "bubble".

Optionally, when the terminal detects a plurality of consecutive tap operations on the "WeChat" application icon 201, and a plurality of bubbles are selected by performing the plurality of tap operations, the terminal may output an effect of poking the plurality of "bubbles" (not shown), and start (or open) associated applications respectively corresponding to the plurality of "bubbles". Herein, an associated application corresponding to a "bubble" is an application represented by an application icon displayed in the "bubble".

For the plurality of tap operations, optionally, the terminal may detect a time interval between two adjacent tap operations, and if a time interval between any two adjacent tap operations is less than a preset interval, determine that the plurality of tap operations are a plurality of consecutive tap operations. In actual application, the terminal may alternatively determine a plurality of consecutive tap operations in another manner. This is not limited herein.

By implementing the extended Embodiment 1, a user may start a plurality of associated applications by breaking a plurality of "bubbles" at a time or by poking a plurality of "bubbles" consecutively. This is quite easy, efficient, and fun.

(2) Extended Embodiment 2

In this embodiment, in addition to the associated application, the various user operations used to quickly start an associated application mentioned in the foregoing embodiment may alternatively be used to quickly start another associated function of an application, for example, a function (such as application level settings) provided by the application or a system function (for example, system settings) associated with the application.

Figure 9A:
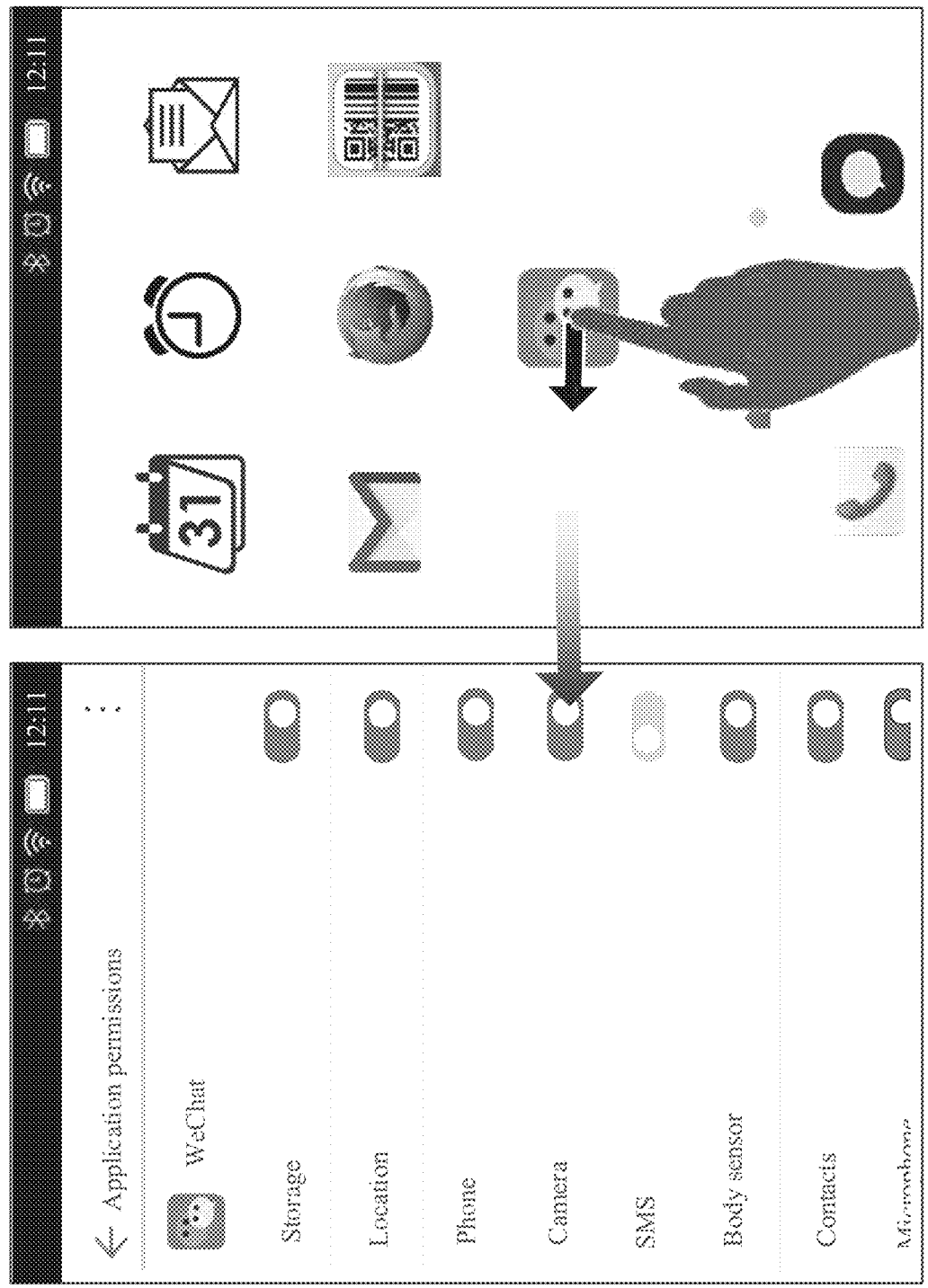
FIG. 9A to FIG. 9C are schematic diagrams of other man-machine interaction embodiments according to this application.

As shown in FIG. 9A, on the home page 101, when the terminal detects a sliding operation on the "WeChat" application icon 201, and a sliding direction is leftward, the terminal may start (or open) application permission settings of "WeChat". The application permission settings of "WeChat" belong to application level settings.

Optionally, when detecting the user operation shown in FIG. 9A on an application icon of another application (for example, "Email"), the terminal may alternatively start (or open) application permission settings of the another application (for example, "Email"). That is, user operations used to start (or open) application permission settings of different applications may be the same. To be specific, on application icons of different applications, a same user operation may be used to start (or open) the application permission settings of the different applications.

Figure 9B:
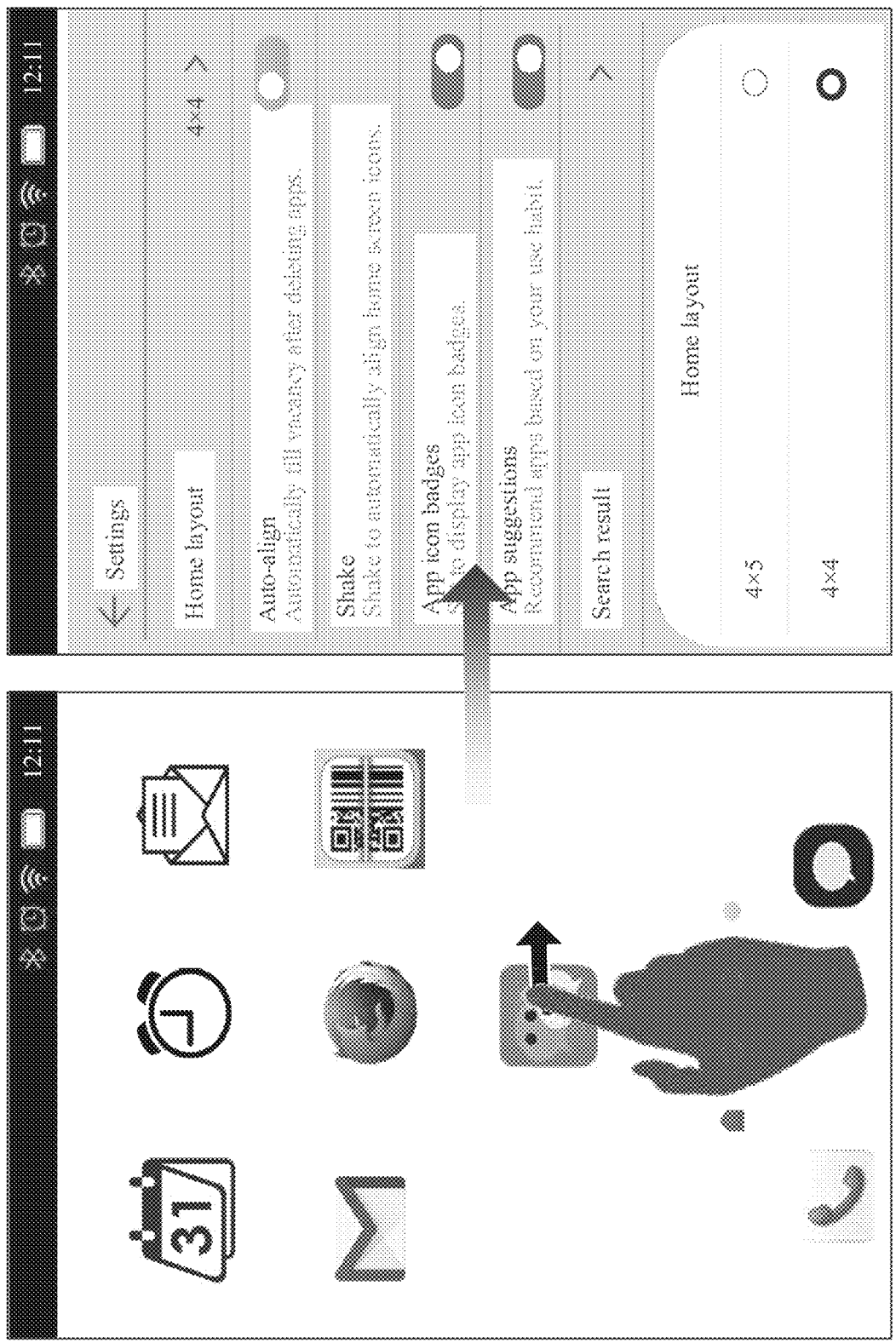

As shown in FIG. 9B, on the home page 101, when the terminal detects a sliding operation on the "WeChat" application icon 201, and a sliding direction is rightward, the terminal may start (or open) desktop layout settings. The desktop layout settings belong to terminal level settings.

Optionally, when detecting the user operation shown in FIG. 9B on an application icon of another application (for example, "Email"), the terminal may also start (or open) the desktop layout settings. That is, a same user operation may be performed on application icons of different applications (for example, "Email"), to start (open) the desktop layout settings.

As shown in FIG. 9 C, on the home page 101, when the terminal detects a sliding operation on an "Email" application icon 207, and a sliding direction is upward, the terminal may start (or open) notification message settings of "Email". The notification message settings of "Email" belong to application level settings.

Optionally, when detecting the user operation shown in FIG. 9 C on an application icon of another application (for example, "WeChat"), the terminal may start (or open) notification message settings of the another application (for example, "WeChat"). That is, user operations used to start (or open) notification message settings of different applications may be the same. To be specific, on application icons of different applications, a same user operation may be used to start (or open) the notification message settings of the different applications.

Figure 9C:
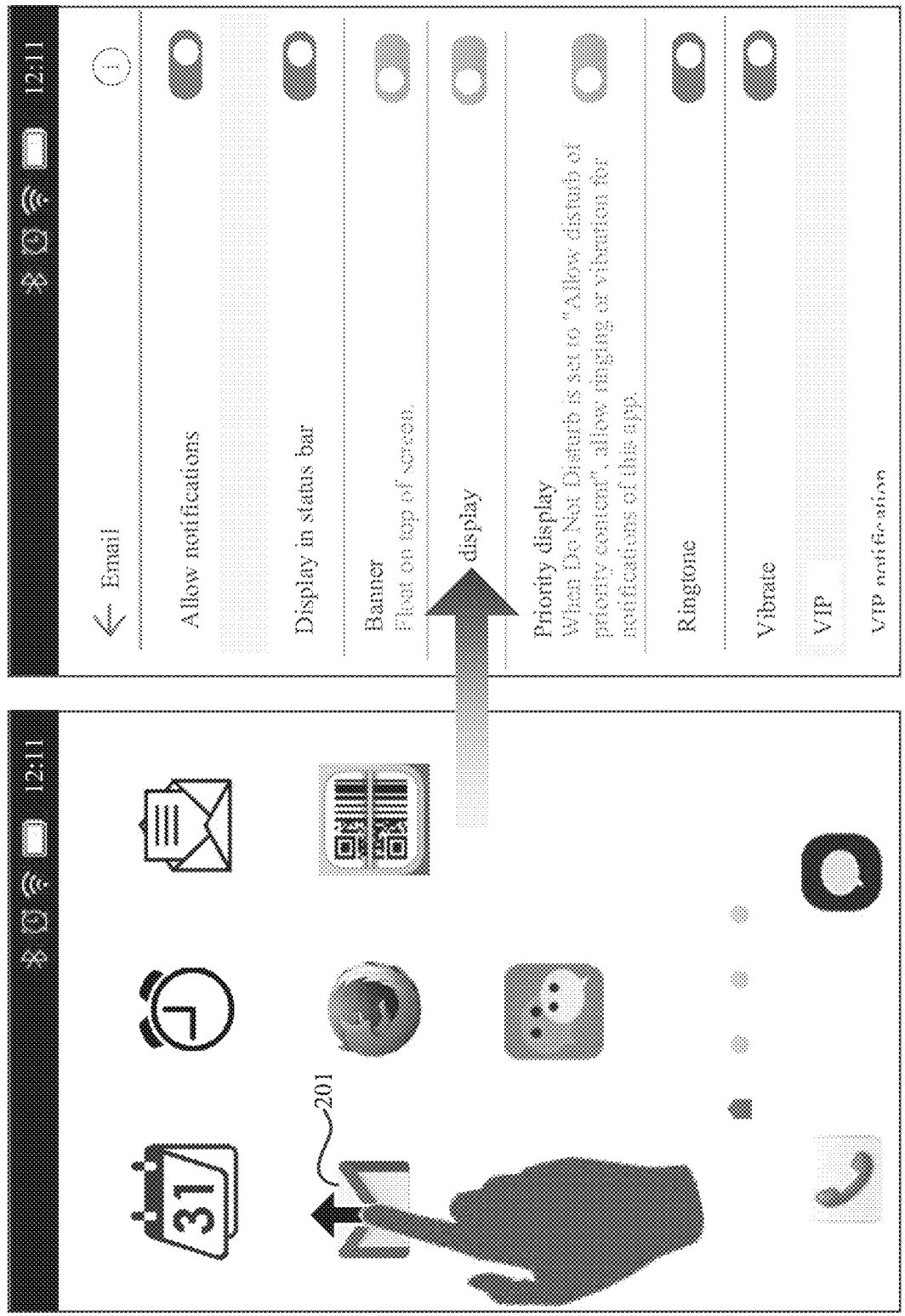

In addition to the user operations shown in FIG. 9A-9C, the user operation used to quickly start another associated function of an application may be another user operation mentioned in the foregoing embodiments (the embodiment shown in FIG. 2A and FIG. 2B, FIG. 3A and FIG. 3B, FIG. 4A-1 and FIG. 4A-2 to FIG. 4C, FIG. 5A and FIG. 5B, FIG. 6A to FIG. 6C, or FIG. 7A and FIG. 7B), and details are not described herein again.

In addition to the application permission settings, the desktop layout settings, and the notification message settings that are shown in FIG. 9A to FIG. 9C, another associated function of an application may further include another system function (for example, another system setting) and a function (for example, another application level setting) provided by another application. This is not limited herein.

(3) Extended Embodiment 3

In this embodiment, the user may quickly start an associated function of an application by performing a multi-touch operation based on an application icon. Herein, the associated function includes but is not limited to: an associated application of the application, a function provided by the application (for example, application level settings), and a system function associated with the application (for example, system settings).

Figure 10A:
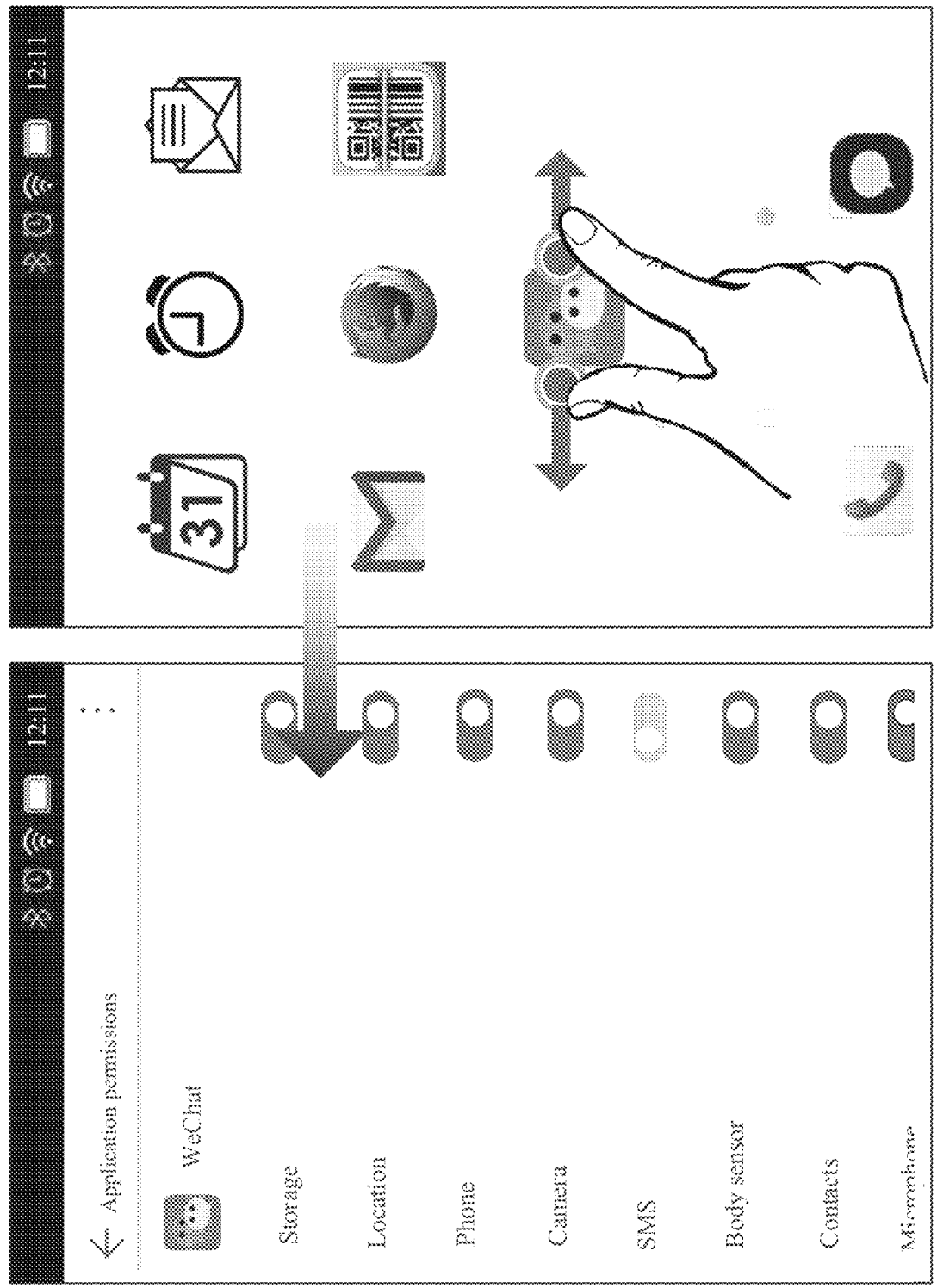
FIG. 10A to FIG. 10C are schematic diagrams of other man-machine interaction embodiments according to this application.

As shown in FIG. 10A, on the home page 101, when the terminal detects, on the "WeChat" application icon 201, an operation of spreading two fingers apart, and a direction in which the two fingers are spread is a horizontal direction, the terminal may start (or open) application permission settings of "WeChat". The application permission settings of "WeChat" belong to application level settings.

Figure 10B:
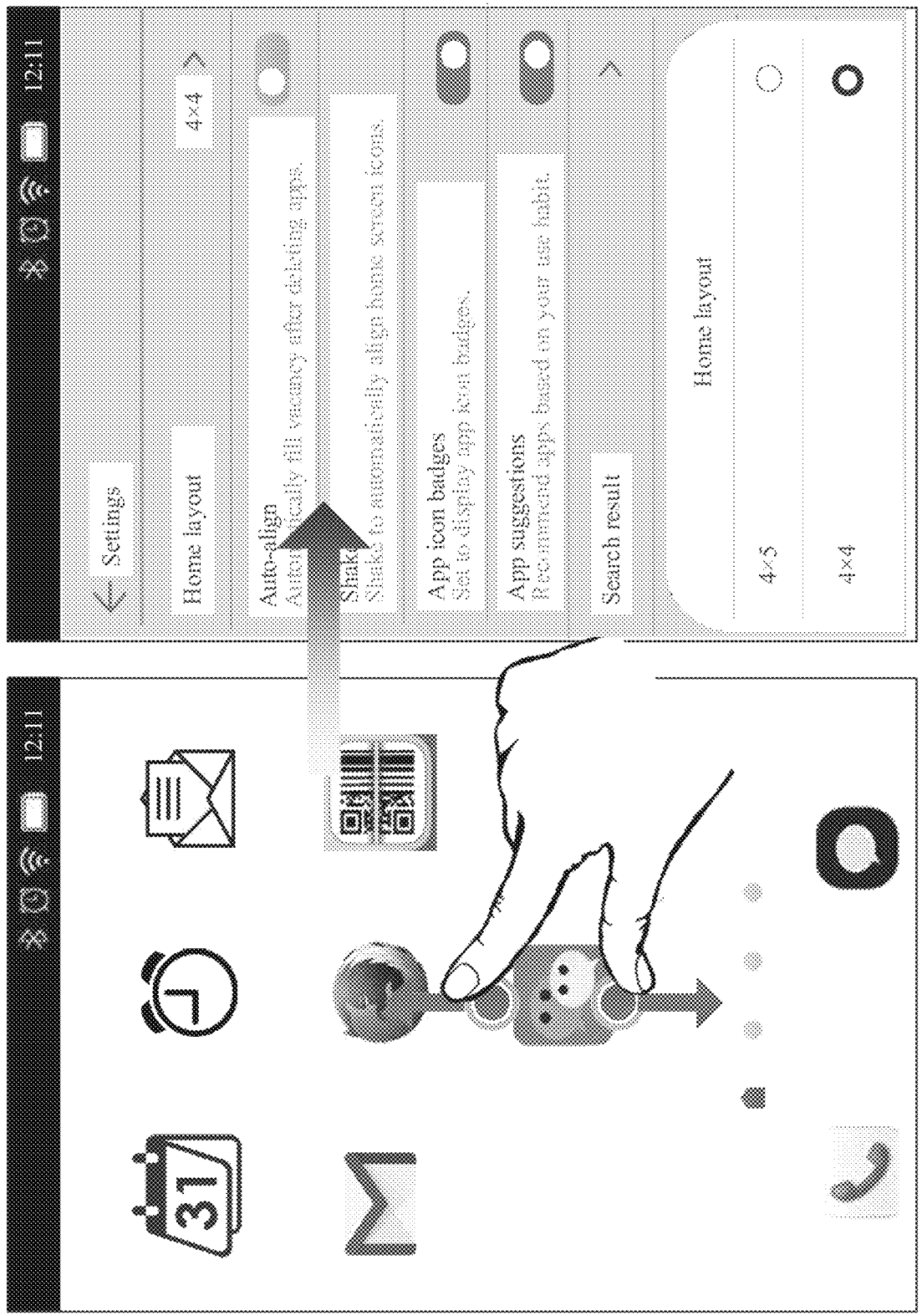

As shown in FIG. 10B, on the home page 101, when the terminal detects, on the "WeChat" application icon 201, an operation of spreading two fingers apart, and a direction in which the two fingers are spread is a longitudinal direction, the terminal may start (or open) desktop layout settings. The desktop layout settings belong to terminal level settings.

As shown in FIG. 10 C, on the home page 101, when the terminal detects, on an "Email" application icon 207, an operation of spreading two fingers apart, and a direction in which the two fingers are spread is a diagonal direction, the terminal may start (or open) notification message settings of "email". The notification message settings of "Email" belong to application level settings.

Figure 10C:
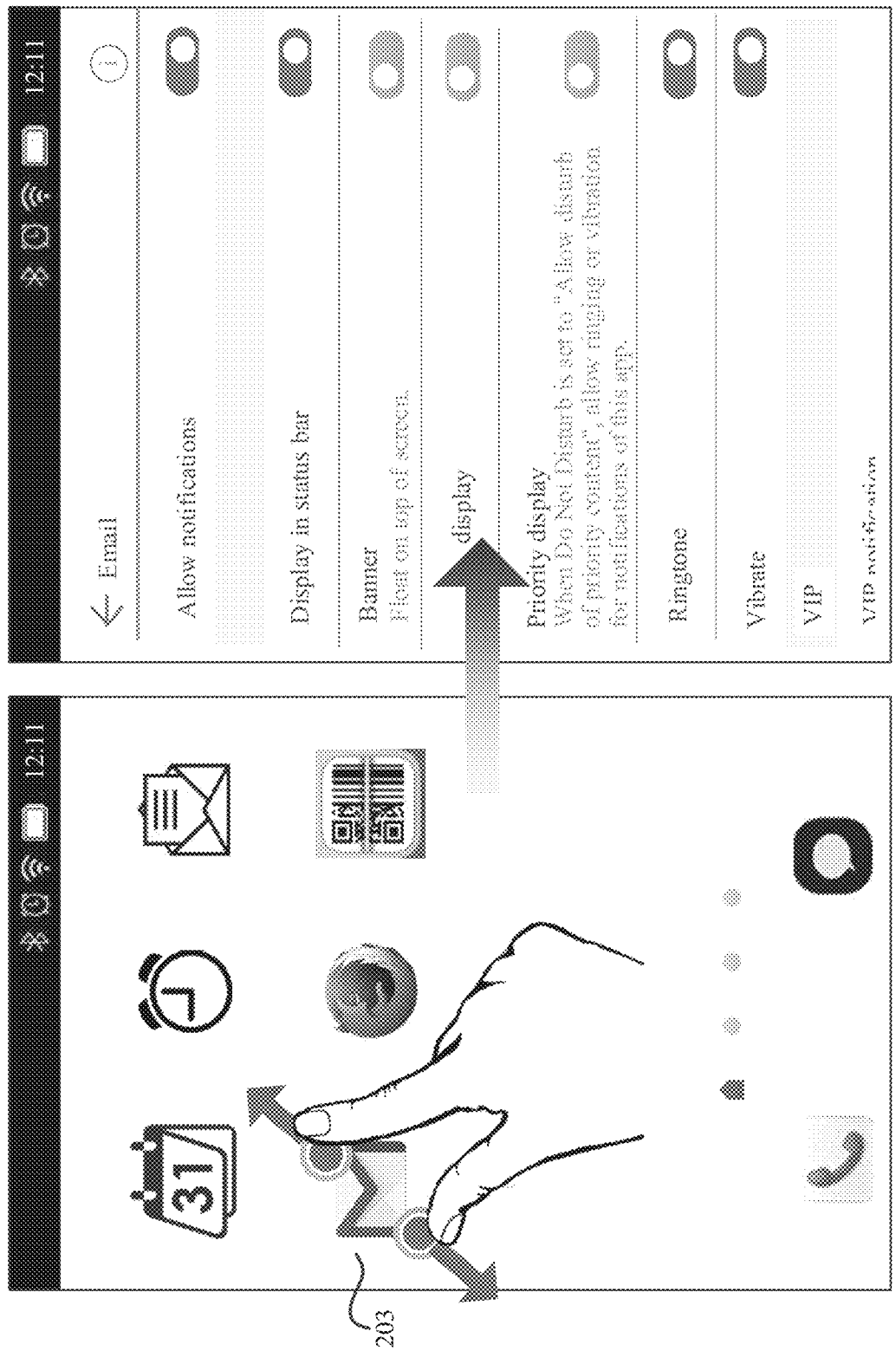

In addition to the multi-touch operations shown in FIG. 10A to FIG. 10C, a multi-touch operation that is based on an application icon and that is used to quickly start an associated function may alternatively be a multi-touch operation in another form, for example, an operation of sliding with two fingers. This is not limited herein. In addition to the multi-touch operations, the user operation that is based on the application icon and that is used to quickly start the associated function may alternatively be a multi-finger gesture operation, requiring no direct touch on the screen of the terminal. In addition to the several associated functions shown in FIG. 10A to FIG. 10C, the multi-touch operation based on an application icon may be further used to quickly start another associated function, for example, the associated applications shown in the embodiment in FIG. 2A and FIG. 2B or FIG. 3A and FIG. 3B. This is not limited herein.

(4) Extended Embodiment 4

In this embodiment, an associated application of an application may further include a twin application of the application.

Specifically, the user may quickly start (or open) a twin application of an application by performing a user operation based on an application icon. Specifically, the user operation may be the user operation described in the embodiment of FIG. 2A and FIG. 2B, FIG. 3A and FIG. 3B. FIG. 4A-1 and FIG. 4A-2 to FIG. 4C, FIG. 5A and FIG. 5B, FIG. 6A to FIG. 6C, or FIG. 7A and FIG. 7B, or may be the user operation described in the foregoing extended Embodiment 1 or extended Embodiment 3.

A twin application of an application refers to another installed application that has a same function as the application. The user may use different identities (for example, accounts) to use the application and the twin application of the application respectively. For example, "WeChat" is used for work, and a twin application of "WeChat" is used for life. In this way, an application and a twin application of the application may meet different requirements of a user in different scenarios.

To protect user privacy, when detecting a user operation that is based on an application icon and that is used to start a twin application, the terminal may further obtain identity information (such as fingerprint information or facial feature information) of the user, and start the twin application when the identity information is verified successfully.

The following describes an implementation of a terminal provided in this application. The terminal may be provided with a touch apparatus (for example, a touch panel in a display) and/or a gesture sensor. The touch apparatus can detect a touch operation (such as a tap operation, a touch and hold operation, or a sliding operation) of the user. The gesture sensor can sense a user gesture (such as a sliding gesture or a selection gesture, requiring no direct touch on the touch panel of the terminal) in a sensing area of the gesture sensor. In this application, the touch apparatus may be configured to detect the touch control operation that is based on an application icon and that is used to quickly start an associated function in the foregoing man-machine interaction embodiment, and the gesture sensor may be configured to detect the user gesture that is based on an application icon and that is used to quickly start an associated function in the foregoing man-machine interaction embodiment.

Optionally, the terminal may be further provided with a floating detector. The floating detector can sense an object in three-dimensional (3D) space above the touch apparatus (for example, a touchscreen), and motion of the object (for example, whether a user finger approaches a screen). In some embodiments, the floating detector may be a 3D camera. In some embodiments, the touch apparatus may have a floating detection function. For example, the touch panel may be a self-capacitive floating touch panel or a floating touch panel on which an infrared sensor is configured. In some embodiments, the gesture sensor may also be used as a floating detector.

Figure 11:
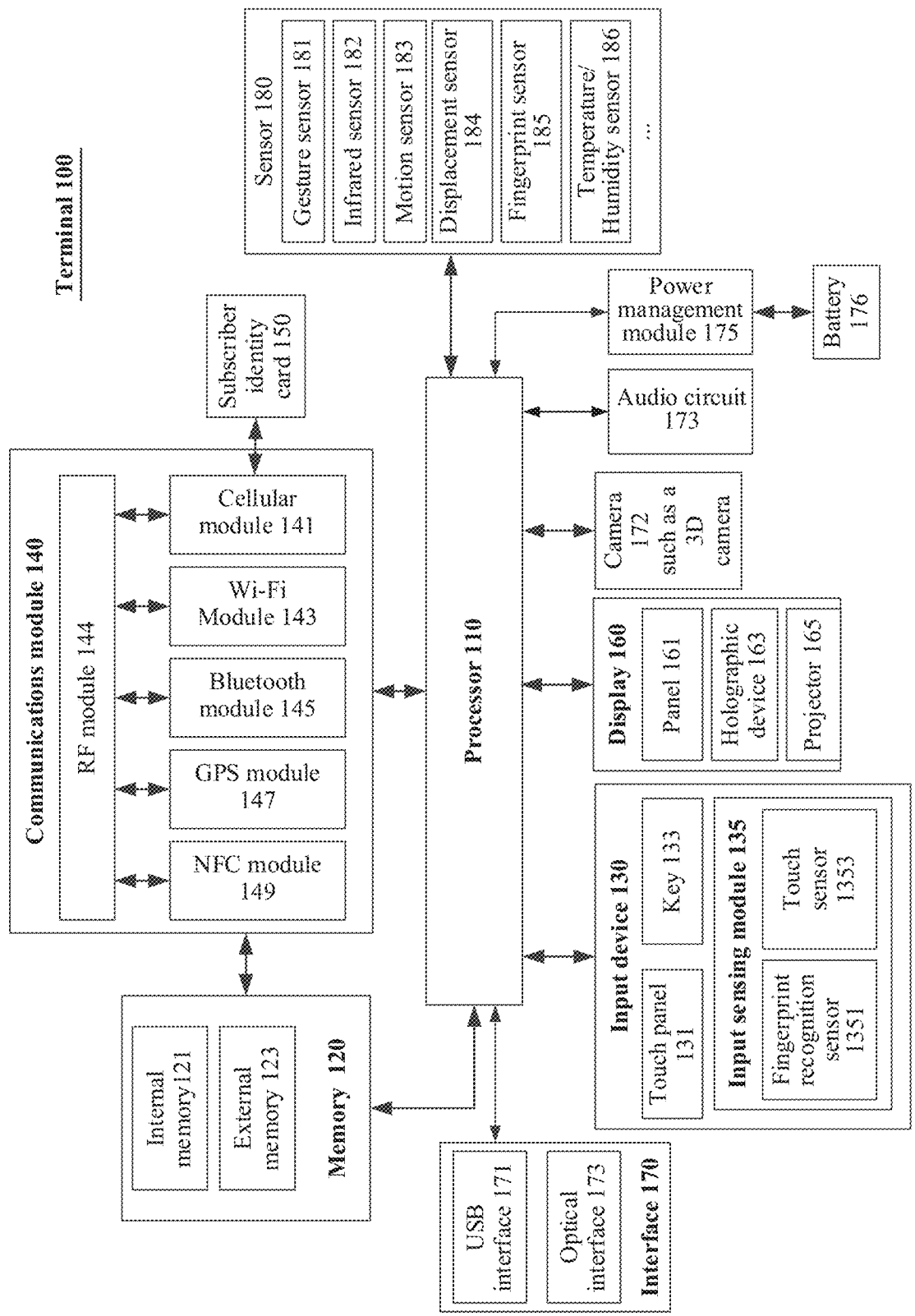
FIG. 11 is a schematic diagram of a hardware architecture of a terminal in this application.

FIG. 11 is a structural block diagram of an implementation of a terminal 100. As shown in FIG. 11, the terminal 100 may include: one or more processors 110, a subscriber identity module (SIM) card 150, a communications module 140, a memory 120, a sensor 180, an input device 130, a display 160, an interface 170, an audio circuit 173, a camera 172, a power management module 175, and a battery 176, and any other similar and/or suitable components.

The processor 110 may include one or more application processors (application processor, AP) or one or more communications processors, for example, a baseband processor (baseband processor, BP).

The processor 110 may run an operating system (OS) or an application program, to control a plurality of hardware or software elements connected to the processor 110 and perform processing or arithmetic operations on various data including multimedia data. The processor 110 may be implemented by a system on chip (system on chip, SoC). Optionally, the processor 110 may further include a graphics processing unit (graphic processor unit, GPU) (not shown).

The SIM card 150 may be a card that implements a subscriber identity module. The SIM card 150 may include unique identification information (for example, an integrated circuit card identifier (ICCID)) or user information (for example, an international mobile subscriber identity (IMSI)).

The communications module 140 may include a radio frequency (radio frequency, RF) module 144. The communications module 140 may further include a cellular module 141, a Wi-Fi module 143, a Bluetooth module 145, a GPS module 147, and a near field communication (near field communication, NFC) module 149. The communications module 140 may provide a wireless communication function by using a radio frequency. Additionally or alternatively, the communication module 140 may include a network interface (for example, a LAN card), a modulator/demodulator (modem) configured to connect the terminal 110 to a network (for example, the Internet, a local area network (LAN), a wide area network (WAN), a telecommunications network, a cellular network, a satellite network, and a plain old telephone service (POTS)), and the like.

The communications module 140 may be connected to the communications processor in the processor 110. The communications processor may control the communication module 140 to send and receive data. The communications processor may include a plurality of communications processors implementing different communications protocols. For example, the baseband processor is connected to the cellular module 141, and may be configured to control the cellular module 141 to receive and send data.

The RF module 144 may be configured to send and receive data. In specific implementation, the RF module 144 may include a transceiver, a power amplification module (PAM), a frequency filter, a low-noise amplifier (LNA), and the like. Optionally, the RF module 144 may further include a component configured to send and receive an electromagnetic wave in free space during wireless communication, for example, a conductor or a conducting wire.

The sensor 180 may include, for example, at least one of the following: a gesture sensor 181, an infrared sensor 182, a motion sensor 183, a displacement sensor 184, a fingerprint sensor 185, a temperature/humidity sensor 186, and the like. The sensor 180 may measure a physical quantity of the terminal 110 and/or may detect an operating status of the terminal 110, and may convert measured or detected information into an electrical signal. The sensor 180 may further include, for example, an E-nose sensor (not shown), an electromyogram (EMG) sensor (not shown), an electroencephalogram (EEG) sensor (not shown), an electrocardiogram (ECG) sensor (not shown), or a fingerprint sensor (not shown). The sensor 180 may further include a control circuit (not shown) configured to control one or more sensors included in the sensor 180.

The input device 130 may include a touch panel 131, a key 133, or an input sensing module 135.

The touch panel 131 may use at least one of a capacitive method, a resistive method, an infrared method, or an ultrasonic method. The touch panel 131 may further include a control circuit. In this application, the touch panel 131 may be a floating touch panel.

The input sensing module 135 may include at least one fingerprint recognition sensor 1351 and at least one touch sensor 1353. The input sensing module 135 may include a fingerprint recognition sensor 1351 and a touch sensor 1353 that detect input by using a same sensing method. For example, both the fingerprint recognition sensor 1351 and the touch sensor 1353 in the input sensing module 135 can use a capacitive method to detect input. The input sensing module 135 may include an input processor. The input processor is electrically connected to the fingerprint recognition sensor 1351 and the touch sensor 1353, processes input received from the fingerprint recognition sensor 1351 or the touch sensor 1353, and transmits processed input to the processor. The input sensing module 135 may include a flexible circuit board, and the touch sensor 1353, the fingerprint recognition sensor 1351, and the input processor in the input sensing module 135 may be electrically connected to the flexible circuit board. The input sensing module 135 may be arranged at a position corresponding to a lower end key (such as a home key or a soft key) on the front face of the electronic device. For example, the input sensing module 135 may detect, by using the touch sensor 1353 or the fingerprint recognition sensor 1351, user fingerprint input or touch input received from the home key or the soft key. The input sensing module 135 may detect, by using the touch sensor 1353, touch input received by using a touch input area formed on a side part of the electronic device, and may detect, by using the fingerprint recognition sensor 1351, fingerprint input received by using the home key. The input sensing module 135 may process received input, and transmit the processed input to the processor. The input processor and the fingerprint recognition sensor 1351 may be formed in a form of a chip.

The display 160 may include a panel 162, a holographic device 163, a projector 165, and the like. The panel 162 may be a liquid crystal display (LCD), an active-matrix organic light-emitting diode (AM-OLED) display, or the like. The panel 162 may be flexible, transparent, or wearable. The panel 162 may be formed by using a single module having the touch panel 131. The holographic device 163 may display a three-dimensional image in the air by using light interference. In this application, the display 160 may further include a control circuit that is configured to control the panel 162 and/or the holographic device 163. In this application, the display 160 and the touch panel 131 may be integrated to form a touchscreen of the terminal 110.

The interface 170 may include a universal serial bus (USB) interface 171, an optical interface 173, and the like. Optionally, the interface 170 may further include one or more interfaces used for an SD/a multimedia card (MMC) (not shown) or the infrared data association (IrDA) (not shown). The interface 170 or any sub-interface of the interface 170 may be configured to interact with another electronic device (for example, an external electronic device), an input device, an external storage device, or the like.

The audio circuit 173 may be configured to encode/decode voice into an electrical signal, and may be configured to convert the electrical signal into voice. In specific implementation, the audio circuit 173 may be connected to at least one of the following: a speaker (not shown), a receiver (not shown), a headset (not shown), or a microphone (not shown), and may be configured to decode/encode a signal input/output by the at least one of the foregoing.

The camera 172 may capture still images or videos. In specific implementation, the camera 172 may include one or more image sensors (for example, a front-facing sensor module or a rear-facing sensor module, which is not shown), an image signal processor (ISP, which is not shown), or a flash LED (not shown). In this application, the camera 172 may be a 3D camera.

The power management module 175 may manage a power supply of the terminal 110. In specific implementation, the power management module 175 may include power management IC (PMIC), a charger IC, a battery fuel meter, and the like. The battery 176 may supply power to, for example, the terminal 110. The battery 176 may be a rechargeable battery.

The memory 120 may include an internal memory 121 and an external memory 123. In specific implementation, the internal memory 121 may include at least one of the following: a volatile memory (such as a dynamic random access memory (DRAM), a static RAM (SRAM), a synchronous dynamic RAM (SDRAM)) and a non-volatile memory (such as a one-time programmable read-only memory (OTPROM), a programmable ROM (PROM), an erasable programmable ROM (EPROM), an electrically erasable programmable ROM (EEPROM), a mask ROM, a flash ROM, a NAND (NAND) flash, or a NOR (NOR) flash). The internal memory 121 may be in a form of a solid state drive (SSD). The external memory 123 may include a flash drive, such as a compact flash (CF), secure digital (SD), micro SD, mini SD, extreme digital (xD), a memory stick, and the like.

The internal memory 120 is coupled to the processor 110, and is configured to store various software programs and/or a plurality of sets of instructions. In specific implementation, the internal memory 120 may include a high-speed random access memory, or may include a non-volatile memory, for example, one or more magnetic storage devices, a flash memory device, or another non-volatile solid state storage device. The internal memory 120 may store an operating system (system for short in the following description), for example, Android, iOS, Windows. Linux, or another embedded operating system. The internal memory 120 may further store a network communication program. The network communication program may be configured to communicate with one or more additional devices, one or more terminals, and one or more network devices. The internal memory 120 may further store a user interface program. The user interface program may vividly display content of an application program by using a graphical operation interface, and receive, by using an input control such as an application icon, a menu, a dialog box, and a key, a control operation performed by a user on the application program.

The internal memory 120 may further store one or more application programs, for example, a social application program (for example, WeChat (WeChat)), an image management application program (for example, Gallery), or another application program, for example, Evernote or Himalaya.

According to the embodiments disclosed in this application, the terminal 100 is merely an example provided in this embodiment of the present invention. In addition, the terminal 100 may include more or fewer components than shown components, or may combine two or more components, or may have different component configurations.

Figure 12:
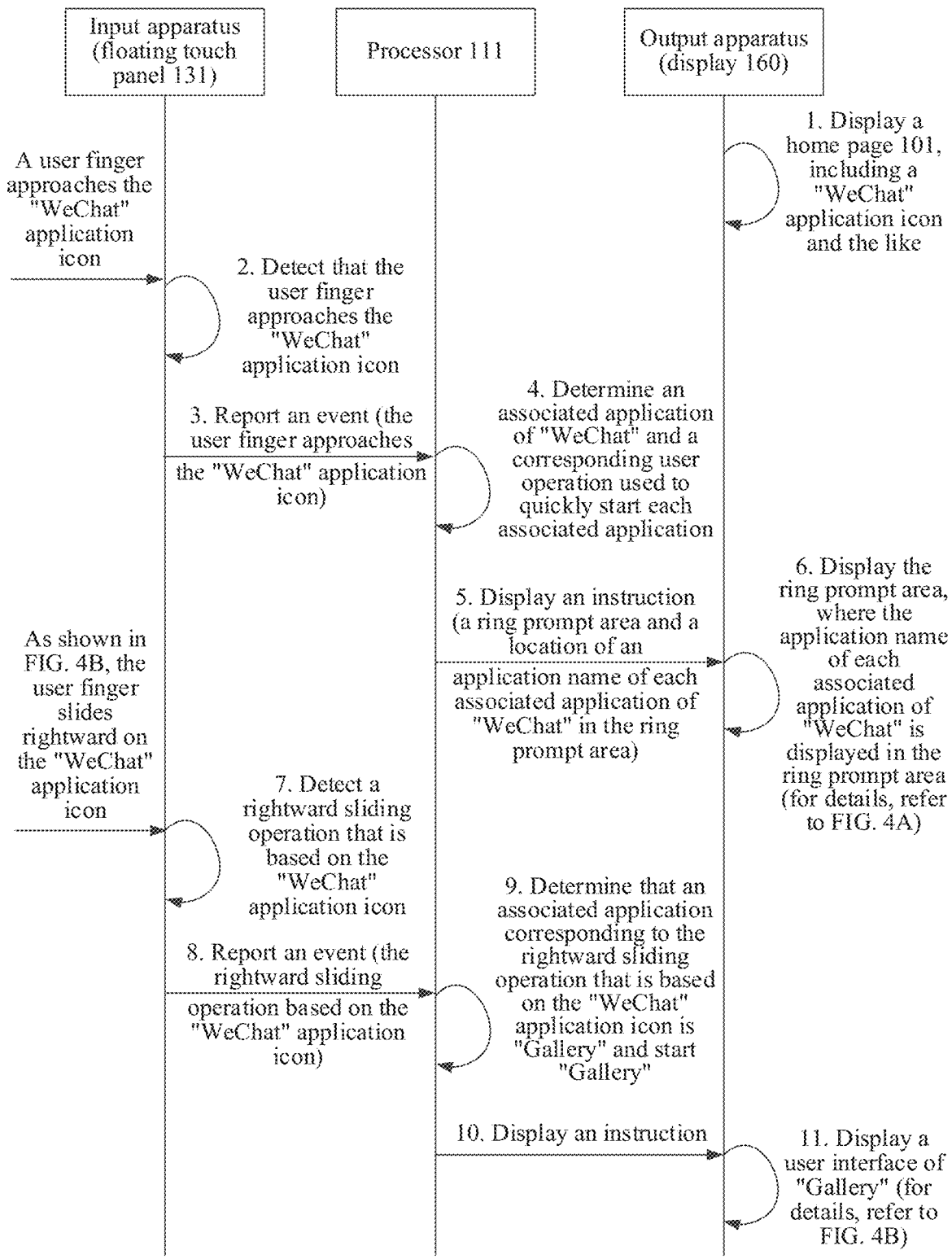
FIG. 12 is a schematic flowchart of hardware drive interaction inside the terminal shown in FIG. 11.

Referring to FIG. 12, the embodiment in FIG. 4A-1 and FIG. 4A-2 to FIG. 4C is used as an example below to describe in detail a cooperative relationship between the components of the terminal 100 (the touch panel 131 is a floating touch panel) in this application.

1. The display 160 displays the home page 101. Application icons of a plurality of applications are displayed on the home page 101, including the "WeChat" application icon.

2. The touch panel 131 detects that the user finger approaches the "WeChat" application icon. Specifically, the self-capacitive floating touch panel configured in the touch panel 131 may be configured to detect that the user finger approaches the "WeChat" application icon.

3. The touch panel 131 may report, to the processor 110, the event that the user finger approaches the "WeChat" application icon.

4. In response to the event reported by the touch panel 131, the processor 110 may determine associated applications of "WeChat", and determine a user operation used to quickly start each of the associated applications.

Specifically, as shown in FIG. 4A-1 and FIG. 4A-2, the associated applications of "WeChat" include "Google Maps", "Evernote", "Gallery", and "Himalaya". A user operation used to quickly start "Google Maps" is a leftward sliding operation based on the "WeChat" application icon, and a user operation used to quickly start "Evernote" is an upward sliding operation based on the "WeChat" application icon, and the user operation used to quickly start "Gallery" is a rightward sliding operation based on the "WeChat"

application icon, and the user operation used to quickly start "Himalaya" is a downward sliding operation based on the "WeChat" application icon.

5. The processor 110 may send a display instruction to the display 160, to instruct the display 160 to display a ring prompt area and display application names of the associated applications of "WeChat" in the ring prompt area.

6. In response to the display instruction sent by the processor 110, the display 160 displays the ring prompt area and displays the application names of the associated applications of "WeChat" in the ring prompt area.

Specifically, as shown in FIG. 4A-1 and FIG. 4A-2, the display 160 may display, in the ring prompt area 203, the application names 204 of the associated applications (such as "Google Maps", "Evernote", "Gallery", and "Himalaya") of "WeChat". The application name of "Google Maps" is on a left side of the "WeChat" application icon 201, the application name of "Evernote" is above the "WeChat" application icon 201, the application name of "Gallery" is on a right side of the "WeChat" application icon 201, and the application name of "Himalaya" is below the "WeChat" application icon 201. In this way, when the user finger 301 slides from the "WeChat" application icon 201 to an associated application, the associated application may be triggered to start.

Optionally, as shown in FIG. 4A-1 and FIG. 4A-2, to further enhance the prompt performance, the display 160 may further display, between a location of an associated application and the "WeChat" application icon 201, a prompt symbol used to indicate a sliding direction, for example, the dynamic arrow 205.

7. The touch panel 131 detects a rightward sliding operation that is based on the "WeChat" application icon.

8. The touch panel 131 may report the event that the rightward sliding operation based on the "WeChat" application icon is detected to the processor 110.

9. In response to the event reported by the touch panel 131, the processor 110 may determine that an associated application corresponding to the rightward sliding operation that is based on the "WeChat" application icon is "Gallery", and start "Gallery".

10. The processor 110 may send a display instruction to the display 160, to instruct the display 160 to display a user interface of "Gallery".

11. The display 160 displays the user interface of "Gallery" in response to the display instruction sent by the processor 110. For details, refer to FIG. 4B.

Optionally, the input apparatus in FIG. 12 may alternatively be a gesture sensor (which may also be referred to as a gesture sensor), and may be configured to detect a gesture operation that is based on an application icon (for example, the "WeChat" application icon). A touch point is correspondingly a point to which the gesture operation is applied. Optionally, the input apparatus in FIG. 12 may further include the touch panel 131 (which is not configured with a capacitive floating touch panel) and the 3D camera 172. The touch panel 131 may be configured to detect a touch operation that is based on an application icon, and the 3D camera 172 may be configured to detect whether the user finger approaches the touch panel 131. In actual application, the input apparatus in FIG. 12 may alternatively be an input apparatus of another type. This is not limited herein.

Based on the foregoing man-machine interaction embodiment and the terminal 100 described in the embodiment in FIG. 11, the following describes an application control method according to an embodiment of the present invention.

Figure 13:
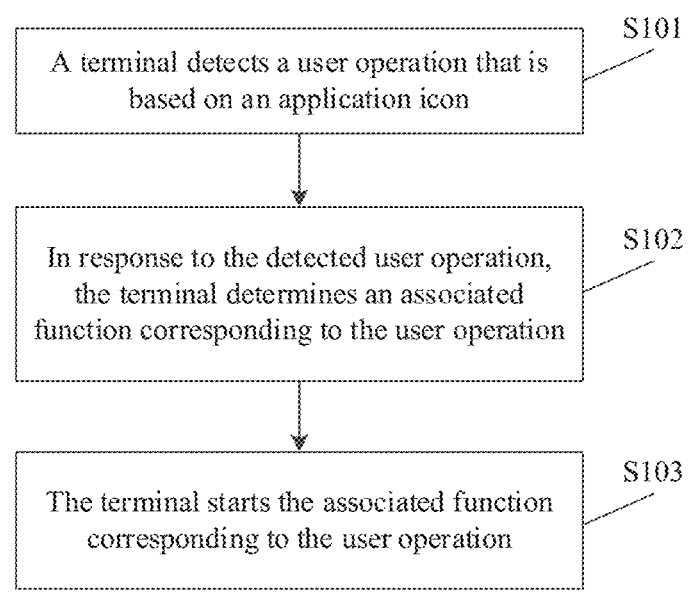
FIG. 13 is a schematic flowchart of an application control method according to this application.

FIG. 13 is a schematic flowchart of an application control method according to this application. The following provides description by using a terminal as an execution body.

S101. The terminal detects a user operation that is based on an application icon.

Optionally, the foregoing user operation based on the application icon may be a touch operation. Referring to the embodiment in FIG. 11, the terminal may be provided with a touch apparatus (such as a touchscreen), and may detect a touch operation (such as a tap operation, a touch and hold operation, or a sliding operation) of the user by using the touch apparatus.

Optionally, the user operation based on the application icon may be a motion sensing operation. Referring to the embodiment in FIG. 11, the terminal may be provided with a gesture sensor (which may also be referred to as a gesture sensor), and may sense a motion sensing operation (such as a sliding gesture or a selection gesture) of the user by using the gesture sensor.

S102. In response to the detected user operation, the terminal may determine an associated function corresponding to the user operation. Specifically, in the at least one associated function, each associated function may be corresponding to at least one user operation that is based on the application icon and that is used to start the associated function.

S103. The terminal starts the associated function corresponding to the user operation.

In this application, an associated function of an application may include at least one of the following: an associated application of the application, a function provided by the application (for example, application level settings), a system function associated with the application (for example, system settings), or a twin application of the application.

Specifically, if the application icon is a desktop folder icon, a desktop folder represented by the desktop folder icon is an application represented by the desktop folder icon. An associated application of the desktop folder may include an application in the desktop folder.

In this application, one application may have one or more associated functions. A plurality of different associated functions may be quickly started respectively by using different user operations that are based on an application icon of the application.

The following describes in detail how to quickly start an associated function of an application by using a user operation that is based on an application icon of the application.

(1) User operations that may be included in the user operation that is based on the application icon Optionally, the user operation based on the application icon may be a sliding operation that is based on the application icon.

For example, as shown in FIG. 2A and FIG. 2B, when the terminal detects the sliding operation that is based on the "WeChat" application icon 201, the terminal may determine, based on a sliding direction of the sliding operation, an associated application corresponding to the sliding operation, and start the associated application corresponding to the sliding operation. As shown in FIG. 2A, when detecting the rightward sliding operation that is based on the "WeChat" application icon 201, the terminal may start "Gallery". As shown in FIG. 2B, when detecting the leftward sliding operation that is based on the "WeChat" application icon 201, the terminal may start "Himalaya". The example is merely used to explain this application and shall not be construed as a limitation.

It can be learned from the embodiment in FIG. 2A and FIG. 2B that the sliding operations that are based on the application icon and that are in different directions may be used to start different associated functions.

Optionally, as shown in FIG. 10A to FIG. 10C, the user operation based on the application icon may alternatively be a multi-touch operation that is based on the application icon, and details are not described herein.

In addition to the user operations shown in FIG. 2A and FIG. 2B, the user operation that is based on the application icon and that is used to quickly start the associated application may alternatively be a sliding operation in another sliding direction or sliding track, for example, an upward sliding operation based on the application icon, a downward sliding operation based on the application icon, a sliding operation of an anti-clockwise arc track based on the application icon, a sliding operation of a clockwise arc track based on the application icon, or the like.

In addition to the user operations shown in FIG. 2A and FIG. 2B or FIG. 10 A to FIG. 10C, the user operation that is based on the application icon and that is used to quickly start the associated application may alternatively be a touch operation in another form, for example, a tap operation of a specific frequency based on the application icon or a press operation of a specific frequency based on the application icon. This is not limited herein.

In addition to the touch operation, the user operation that is based on the application icon and that is used to quickly start the associated application may alternatively be a motion sensing operation for the application icon, requiring no direct touch on the touchscreen. Specifically, the motion sensing operation may be captured by using a 3D motion sensor (for example, a depth camera).

(2) Further, to reduce a memory burden of the user, the terminal may further output an operation prompt.

Specifically, when detecting that an object performing the user operation approaches an application icon of an application, the terminal may display an operation prompt. The operation prompt may be used to indicate the user operation that is based on the application icon and that is used to start the associated function of the application, that is, used to prompt the user how to perform an operation that is based on the application icon to start a specific associated function.

Herein, the object performing the user operation may be a user finger, a stylus, or the like.

Specifically, the terminal may output the operation prompt in the following manners.

1. Ring Prompt Area

As shown in FIG. 4A-I and FIG. 4A-2 to FIG. 4C, the operation prompt may be a ring prompt area that is displayed around the application icon by using the application icon as a center, and identification information (for example, an application name) of the at least one associated function is displayed in the ring prompt area.

Herein, the user operation based on the application icon may be a sliding operation of sliding from the application icon to the identification information.

Specifically, after the ring prompt area is displayed around an application icon of an application, when a sliding operation based on the application icon is detected, the terminal may collect a sliding direction of the sliding operation, and then determine, from the at least one piece of identification information displayed in the ring prompt area, identification information that the sliding operation points to, and determine an associated function represented by the identification information that the sliding operation points to as an associated function corresponding to the user operation. Finally, the terminal may start the associated function corresponding to the user operation.

For a specific example, refer to FIG. 4B and FIG. 4C. Details are not described herein again. In addition to the sliding operation shown in FIG. 4B and FIG. 4C, the user operation that is based on the application icon and that is used to quickly start the associated application may alternatively be a touch operation in another form, or may be a non-touch operation, for example, a motion sensing operation.

To avoid a misoperation, further, the terminal may further record duration in which the user finger stays above the application icon and a vertical distance between the user finger and the application icon is less than a preset threshold, and may determine whether the duration exceeds a preset time length. If the duration exceeds the preset time length, the ring prompt area is displayed around the application icon. That is, in a user operation used to trigger display of the ring prompt area, the user finger needs to stay in a position close to the application icon for a period of time. This avoids display of the ring prompt area when the user unintentionally approaches the application icon, thereby improving user experience. It may be understood that when the user finger unintentionally approaches a specific application icon, a stay time is usually not long.

In some optional embodiments, as shown in FIG. 5A and FIG. 5B, the terminal may alternatively display the ring prompt area in a wrapped manner around the application icon. For details, refer to the embodiment in FIG. 5A and FIG. 5B. Details are not described herein again.

To further optimize user experience, for a relatively common (or relatively highly associated) associated function, the terminal may further display, at a position that a common sliding operation that is based on an application icon points to in the ring prompt area, identification information (for example, an application name) of the associated function.

It may be understood that, when the user finger approaches an application icon of an application, the ring prompt area centering on the application icon is displayed, to prompt the user to slide from the application icon to an associated application in the ring prompt area. It is convenient for the user to learn how to quickly start the associated application of the application, and such outward sliding operation centering on the application icon quite conforms to an operation habit of the user, so that the user can quickly start the application by performing one sliding operation.

2. Prompt Area of a Bubble Shape

As shown in FIG. 6A to FIG. 6C, the operation prompt may be prompt areas that are of one or more preset shapes (for example, a bubble shape) and that are displayed in a floating manner around the application icon. Identification information (for example, an application icon) of the associated function is displayed in the prompt area. In specific implementation, the system may set a foreground picture of the prompt area of the preset type to a bubble picture, to provide a visual effect that the application icon is placed inside the "bubble". In actual application, the preset shape may alternatively be another shape, to provide another visual effect. This is not limited herein.

Optionally, the user operation based on the application icon may be a sliding operation of sliding from the application icon to the prompt area of the bubble shape.

Specifically, after at least one prompt area of the bubble shape is displayed in a floating manner around an application icon of an application, when a sliding operation based on the application icon is detected, the terminal may collect a sliding direction of the sliding operation, then determine, from the at least one prompt area of the bubble shape around the application icon, a prompt area that is of the bubble shape and that the sliding operation points to, and determine an associated function represented by identification information in the prompt area that is of the preset shape and that the sliding operation points to as the associated function corresponding to the user operation. Finally, the terminal may start the associated function corresponding to the user operation.

Optionally, the user operation based on the application icon may be a user operation performed on the prompt area of the bubble shape, for example, a sliding operation.

Specifically, after at least one prompt area of the bubble shape is displayed in a floating manner around an application icon of an application, when a sliding operation performed on the prompt area of the bubble shape is detected, the terminal may determine, from the at least one prompt area of the bubble shape, a prompt area that is of the bubble shape and on which the sliding operation acts, and determine an associated function represented by identification information in the prompt area that is of the bubble shape and on which the sliding operation acts as the associated function corresponding to the sliding operation. Finally, the terminal may start the associated function corresponding to the user operation.

Optionally, when detecting a sliding operation performed on the prompt area of the bubble shape, the terminal may further output an effect of breaking a "bubble". In this way, to start an associated function, the user may break (or poke or pierce) a "bubble" in which identification information of the associated function is located. Therefore, user experience is easy and fun.

In some optional embodiments, as shown in FIG. 7A and FIG. 7B, the prompt area of the preset shape may alternatively be displayed on the application icon in a floating manner. Vividly, an application icon may be similar to a container containing a "bubble". Herein, the user operation based on the application icon may be a user operation performed on the prompt area of the bubble shape, for example, a sliding operation.

In addition to the user operation shown in FIG. 6A to FIG. 6C or FIG. 7A and FIG. 7B, the user operation performed on a "bubble" may alternatively be another touch operation, for example, a tap operation (an effect of piercing a "bubble" may be generated), or may be a non-touch operation (for example, a gesture for breaking or piercing a "bubble").

The bubbles are not limited to the circle bubbles shown in FIG. 6A to FIG. 6C or FIG. 7A and FIG. 7B. The bubble shape may alternatively be a half circle, an oval, or the like, provided that the bubble bulges due to internal air. In actual application, a UI effect may be further set for the "bubble", for example, a translucent effect or a light shadow effect. This is not limited herein.

To further optimize user experience, for a relatively common (or relatively highly associated) associated application, the system may spotlight (for example, highlight) a "bubble" in which an application icon of the associated application is located.

In some optional embodiments, whether the prompt area of the preset shape (for example, the bubble shape) is displayed may be determined in the following manners. In an implementation, the user may determine, by operating a display switch for the operation prompt, whether to display a "bubble" (that is, a prompt area of the bubble shape). If the user turns on the display switch for the operation prompt, the terminal may display the "bubble" (that is, a prompt area of the bubble shape) in a floating manner around the application icon. If the user turns off the display switch for the operation prompt, the terminal may not display the "bubble" (that is, a prompt area of the bubble shape) in a floating manner around the application icon. In another implementation, when the user finger approaches the application icon (that is, the user operation shown in FIG. 4A-1 and FIG. 4A-2 occurs), the terminal may display a "bubble" (that is, a prompt area of the bubble shape) in a floating manner around the application icon. In still another implementation, provided that an application has an associated application, the terminal may always display a "bubble" (that is, a prompt area of the bubble shape) in a floating manner around an application icon of the application. In actual application, the terminal may further trigger, based on another condition, display of the "bubble". This is not limited herein.

(3) User Operation that is Based on an Application Icon and that is Used to Quickly Start a Plurality of Associated Functions 1. The user operation that is based on an application icon and that is used to start a plurality of associated functions may be a sliding operation of an arc sliding track on the application icon.

For example, as shown in FIG. 8A and FIG. 8B, when a sliding operation of an arc sliding track is detected on an application icon of an application, the terminal may start a plurality of associated applications. Optionally, the plurality of associated applications may be all associated applications of the application. The example is merely used to explain this application and shall not be construed as a limitation.

Optionally, as shown in FIG. 8A, the terminal may display the plurality of started associated applications in a split-screen manner. Optionally, as shown in FIG. 8B, the terminal may display the plurality of started associated applications in a stacking manner. In actual application, the terminal may alternatively display the plurality of started associated applications in another manner. This is not limited herein.

In addition to the sliding operation shown in FIG. 8A and FIG. 8B, the user operation used to quickly start the plurality of associated applications may alternatively be a sliding operation of another sliding track that is based on the application icon, for example, a sliding operation of an anti-clockwise sliding track, or a Z shaped sliding track, or may be another touch operation or a non-touch operation that is based on the application icon. It should be understood that when the technical solutions provided in this application are implemented, it is necessary to distinguish between a user operation used to quickly start a specific associated application and a user operation used to quickly start a plurality of associated applications.

Optionally, if the user operation used to quickly start the plurality of associated functions of an application is a sliding operation of an arc sliding track, the terminal may detect a ratio R of a sliding arc length to an entire circumference, determine, based on the ratio R, a quantity N of the associated applications to be started, and finally start the N associated functions. N is directly proportional to R, N is a positive integer, R is an integer, and $R \in [0, 1]$. That is, closer proximity between the user sliding arc and the entire circumference indicates a larger quantity of associated applications that the user may start. Particularly, when R=100%, N is a quantity of all associated functions of the application.

2. The user operation that is based on an application icon and that is used to start a plurality of associated functions may be a sliding operation performed on a plurality of prompt areas of a preset shape, or may be tap operations (or a selection gesture) performed consecutively on a plurality of prompt areas of a preset shape.

That is, the user may start a plurality of associated applications by breaking a plurality of "bubbles" at a time or poking a plurality of "bubbles" consecutively.

Optionally, when a sliding operation is detected on the application icon, and the sliding operation is performed on a plurality of "bubbles" (that is, a prompt area of the bubble shape), the terminal may output an effect of breaking the plurality of "bubbles", and start (or open) associated functions respectively corresponding to the plurality of "bubbles". Herein, an associated function corresponding to a "bubble" is an application represented by identification information displayed in the "bubble".

Optionally, when the system detects a plurality of consecutive tap operations on the application icon, and a plurality of bubbles are selected by performing the plurality of tap operations, the terminal may output an effect of poking the plurality of "bubbles", and start (or open) associated functions respectively corresponding to the plurality of "bubbles". Herein, an associated function corresponding to a "bubble" is an application represented by identification information displayed in the "bubble".

For the plurality of tap operations, optionally, the terminal may detect a time interval between two adjacent tap operations, and if a time interval between any two adjacent tap operations is less than a preset interval, determine that the plurality of tap operations are a plurality of consecutive tap operations. In actual application, the terminal may alternatively determine a plurality of consecutive tap operations in another manner. This is not limited herein.

It may be understood that a user may start a plurality of associated applications by breaking a plurality of "bubbles" at a time or by poking a plurality of "bubbles" consecutively. This is quite easy, efficient, and fun.

(4) Manner for Setting an Associated Application

1. The associated application may be set by the user.

Specifically, the terminal may receive a first setting operation input by the user, and set, based on the first setting operation, an associated function of an application represented by the application icon. Herein, the first setting operation may be used to set the associated function of the application.

For example, associated applications ("Gallery" and "Himalaya") of "WeChat" may be set by the user based on a preference of the user. The example is merely used to explain this application and shall not be construed as a limitation. A policy of setting an associated application by the user is not limited herein.

2. The associated application may be set by the terminal according to a preset rule.

Optionally, for an application, the terminal may set another application whose application type is the same as an application type of the application as an associated application of the application.

For example, the terminal may set another instant messaging application of a social type (for example, an instant messaging application Twitter Twitter of a social type) as an associated application of "WeChat". The example is merely used to explain this application and shall not be construed as a limitation.

Optionally, for an application, the terminal may recommend, as an associated application of the application, another application whose application name has a same initial as that of the application. For example, the terminal may set another application whose application name has an initial "W" as an associated application of "WeChat" (an initial of "WeChat" is "W"). The example is merely used to explain this application and shall not be construed as a limitation.

It may be understood that determining an associated application of an application according to a preset rule makes it easy for a user to determine which applications are associated with the application. This is easy and effective. In addition to the foregoing two manners, there may be another different preset rule for the terminal to set an associated application. This is not limited herein.

3. The associated application may be intelligently determined by the terminal based on a running status of the application.

Optionally, the terminal may determine, as an associated function of the application, a function that simultaneously runs with the application for a quantity of times exceeding a first threshold, or may determine, as an associated function of the application, a function that simultaneously runs with the application for a period of time exceeding a second threshold, or may determine, as the associated function of the application, a function sharing data with the application.

That is, for an application, the terminal may determine, as an associated application of the application, another application that runs simultaneously with the application for a largest quantity of times or a longest time. For example, upon analysis of a running status of each application, the terminal finds that the user usually starts "Gallery" and "Himalaya" at the same time when the user starts "WeChat". Therefore, the terminal may determine that "Gallery" and "Himalaya" are associated applications of "WeChat". This implementation is more compliant with a use habit of the user, thereby further improving user experience. The example is merely used to explain this application and shall not be construed as a limitation.

Optionally, for an application, the terminal may set another application that shares data with the application as an associated application of the application. For example, "Taobao" and "Alipay" share data with each other, and the terminal may determine "Alipay" as an associated application of "Taobao". In this way, it is convenient for the user to quickly start "Alipay" when using "Taobao", further improving user experience. The example is merely used to explain this application and shall not be construed as a limitation.

It may be understood that determining an associated application of an application intelligently based on a running status of the application may mine an association between applications in depth. This better meets a use habit of a user and further improves user experience. In addition to the foregoing two manners, there may be another different manner for the terminal to intelligently determine an associated application. This is not limited herein.

In addition to the foregoing several manners, the terminal may alternatively determine an associated application of an application in another manner. This is not limited in this application.

Specially, if the application icon is a desktop folder icon, an associated application (that is, an application in a desktop folder) of the desktop folder represented by the desktop folder icon may be determined in the following manners:

1. The application in the desktop folder may be set by a user.

For details, refer to related content in the embodiment in FIG. 3A and FIG. 3B. Details are not described herein again.

2. The application in the desktop folder may be set by the terminal according to a preset rule.

For details, refer to related content in the embodiment in FIG. 3A and FIG. 3B. Details are not described herein again.

3. The terminal may add a plurality of functions that simultaneously run for a quantity of times exceeding a third threshold to a same desktop folder, or may add a plurality of functions that simultaneously run for a period of time exceeding a fourth threshold to a same desktop folder, or may add a plurality of functions sharing data with each other to a same desktop folder.

For details, refer to related content in the embodiment in FIG. 3A and FIG. 3B. Details are not described herein again.

(5) How to Set the User Operation Used to Quickly Start the Associated Function

1. The user operation that is based on the application icon and that is used to quickly start the associated application may be set by the user.

Specifically, for an application, the terminal may receive a second setting operation entered by the user, and set, based on the second setting operation, a user operation that is based on an application icon and that is used to quickly start an associated function of the application.

For example, in the examples in FIG. 2A and FIG. 2B, the user operation that is based on the "WeChat" application icon and that is used to quickly start "Gallery" (that is, the rightward sliding operation based on the "WeChat" application icon) and the user operation that is based on the "WeChat" application icon and that is used to quickly start "Himalaya" (to be specific, the leftward sliding operation based on the "WeChat" application icon) may be set by the user based on a preference of the user.

For example, in the examples in FIG. 3A and FIG. 3B, the user operation that is based on the desktop folder icon 202 and that is used to quickly start "Settings" (that is, the leftward sliding operation based on the desktop folder icon 202) and the user operation that is based on the desktop folder icon 202 and that is used to quickly start "Contacts" (that is, the rightward sliding operation based on the desktop folder icon 202) may be set by the user based on a preference of the user.

The example is merely used to explain this application and shall not be construed as a limitation. A policy of setting, by a user, a user operation used to quickly start each associated application is not limited herein.

2. The user operation that is based on the application icon and that is used to quickly start each associated application may be intelligently set by the system based on a use habit of the user.

Specifically, for an application, the terminal may separately record a quantity of times of using each associated function of the application or duration for using each associated function of the application, and determine a common associated function. Herein, a quantity of times of using the common associated function exceeds a fifth threshold or duration for using the common associated function exceeds a sixth threshold. For the common associated function, the terminal may set a common user operation that is based on an application icon of the application as a user operation for starting the common associated function. The common user operation based on the application icon may be a default user operation of the terminal, or may be determined based on a user habit.

That is, for a relatively common (or relatively highly associated) associated application, a common user operation based on an application icon may be set as a user operation used to quickly start the associated application.

For example, in the examples in FIG. 2A and FIG. 2B, it is assumed that a most common associated application of "WeChat" is "Gallery", and when the user holds the terminal with a single hand, the upward sliding operation based on the application icon is a common operation. In this case, the system may set the upward sliding operation that is based on the "WeChat" application icon as a user operation used to quickly start "Gallery".

For example, in the examples in FIG. 3A and FIG. 3B, it is assumed that a most common application in a desktop folder is "Settings", and when the user holds the terminal with a single hand, the upward sliding operation based on the desktop folder icon 202 is a common operation. Therefore, the system may set the upward sliding operation that is based on the desktop folder icon 202 as a user operation used to quickly start "Settings".

The example is merely used to explain this application and shall not be construed as a limitation. For a policy of intelligently setting a user operation used to quickly start each associated application, by the system based on a use habit of the user, no limitation is imposed herein.

It may be understood that intelligently setting, based on a use habit of the user, a user operation that is based on an application icon and that is used to quickly start each associated application can better meet a use habit of the user, improving user experience.

In addition to the foregoing several manners, a user operation that is based on an application icon and that is used to quickly start each associated application may be determined in another manner. For example, a user operation that is based on an application icon and that is used to quickly start an associated application may be randomly set by the terminal. This is not limited in this application.

It may be understood that, for content or descriptions not mentioned in this embodiment, reference may be made to a related part in the foregoing man-machine interaction embodiment, and details are not described herein again.

Figure 8C:
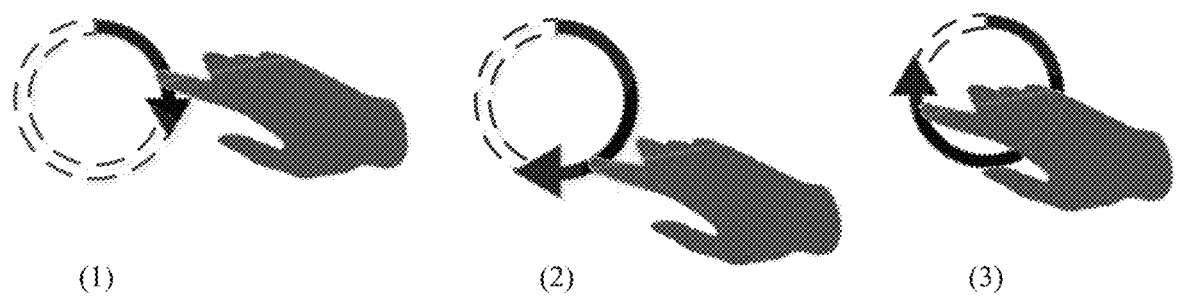
Figure 14:
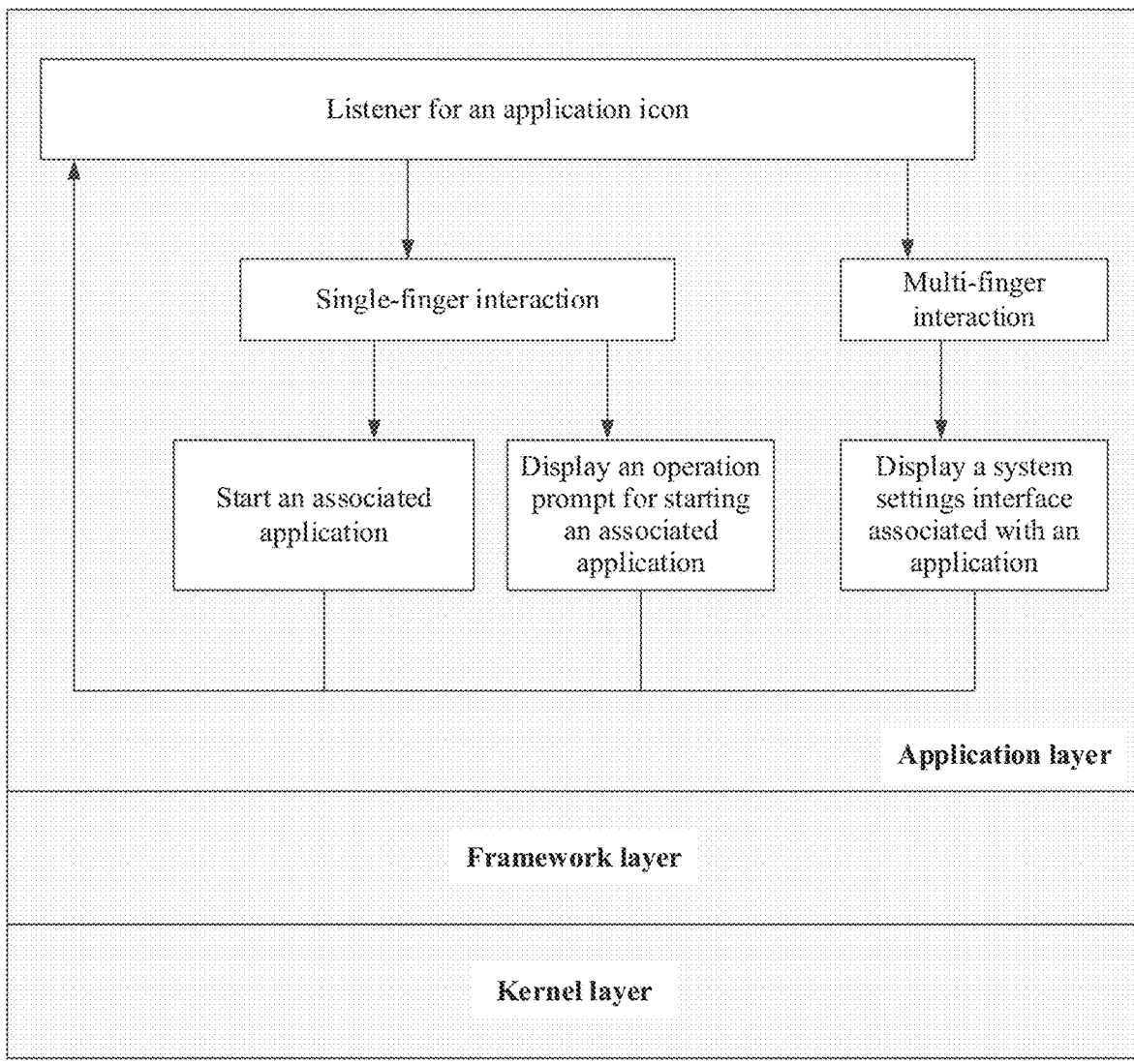
FIG. 14 is a schematic diagram of software functions of an embodiment of this application implemented at an application layer of an operating system.
Figure 15:
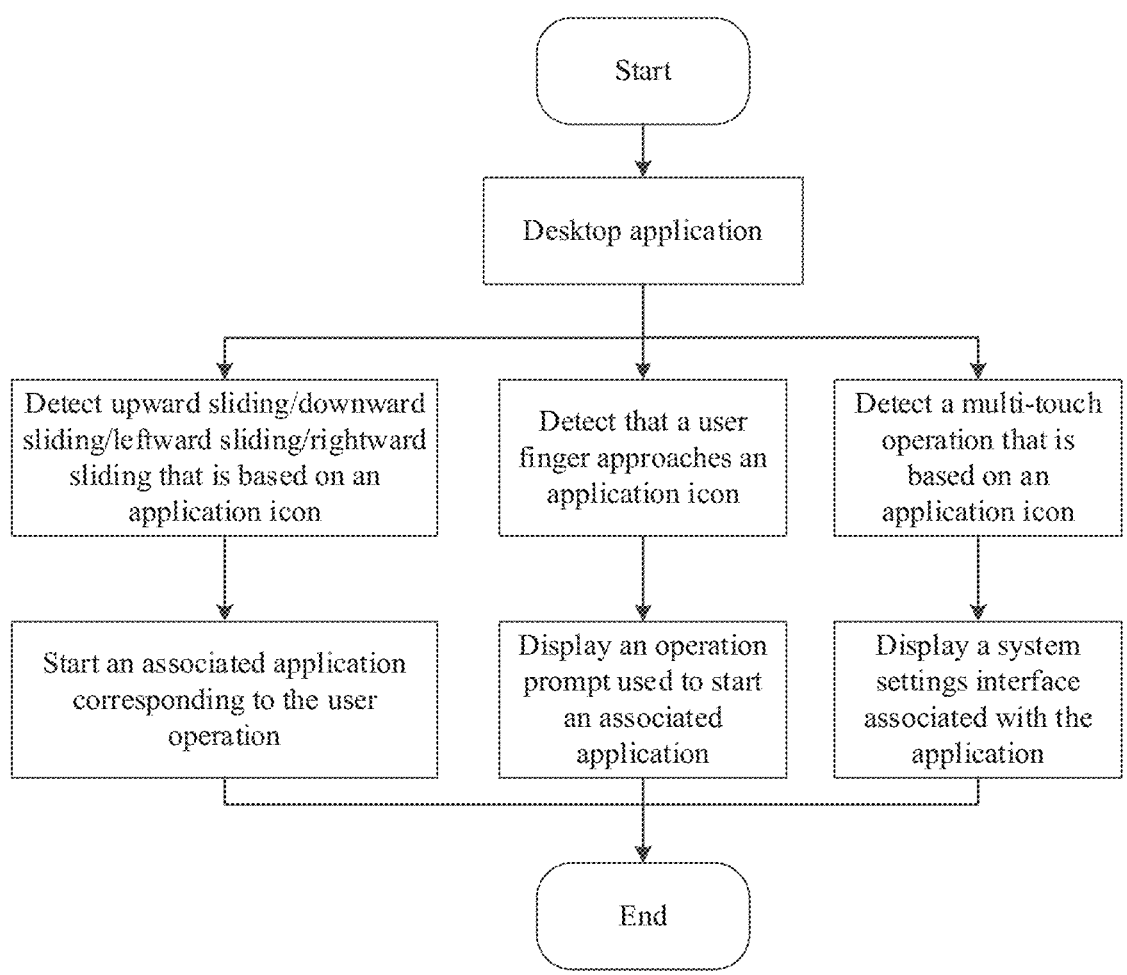
FIG. 15 is a schematic flowchart of a method corresponding to the software functions shown in FIG. 14.

To further understand the application control method provided in this application, the following describes in detail, by using FIG. 14 and FIG. 15, combined implementation of the foregoing several embodiments, that is, combined implementation of quickly starting the associated application through single-finger interaction (as shown in FIG. 2A and FIG. 2B or FIG. 3A and FIG. 3B), triggering the operation prompt through single-finger interaction (as shown in FIG. 4A-1 and FIG. 4A-2 to FIG. 4C, FIG. 5A to FIG. 5C, FIG. 6A to FIG. 6C, or FIG. 7A and FIG. 7B), and quickly starting the system settings associated with the application through multi-finger interaction (as shown in FIG. 8A to FIG. 8C).

FIG. 14 is a schematic functional diagram of combined implementation of the foregoing several embodiments in a system. As shown in FIG. 14, the system may include an application (application) layer, a framework (framework) layer, and a kernel (kernel) layer.

In specific implementation, a listener may be configured on the application layer for an application icon on a desktop, to monitor an instruction for operating the application icon by the user. As shown in FIG. 15, when the listener captures different types of user operations that are based on a desktop application, the system may perform, but not limited to, the following steps.

When the listener captures a single-finger operation that is based on an application icon, for example, an upward sliding operation, a downward sliding operation, a leftward sliding operation, or a rightward sliding operation that is based on the application icon, the system may start an associated application corresponding to the sliding operation. For example, in the examples in FIG. 2A and FIG. 2B, it is assumed that the listener is a listener for the "WeChat" application icon. When the listener captures the user operation shown in FIG. 2A, the system may start the associated application "Gallery". The example is merely used to explain this application and shall not be construed as a limitation.

When the listener captures a single-finger operation that is based on an application icon, for example, approaching the application icon by the user finger, the system may trigger display of an operation prompt used to start an associated application. For example, in the examples in FIG. 4A-1 and FIG. 4A-2 to FIG. 4C, it is assumed that the listener is a listener for the "WeChat" application icon. When the listener captures the user operation shown in FIG. 4A-1 and FIG. 4A-2, the system may trigger display of the ring prompt area 203. The example is merely used to explain this application and shall not be construed as a limitation.

When the listener captures a multi-finger operation, for example, a multi-finger touch operation based on an application icon, the system may start system settings associated with the application. For example, in the examples in FIG. 10A to FIG. 10C, it is assumed that the listener is a listener for the "WeChat" application icon. When the listener captures the user operation shown in FIG. 10A, the system may start application permission settings of "WeChat". The example is merely used to explain this application and shall not be construed as a limitation.

Not limited to FIG. 14 and FIG. 15, in actual application, the foregoing embodiments provided in this application may be further implemented in combination with a specific requirement.

Figure 16:
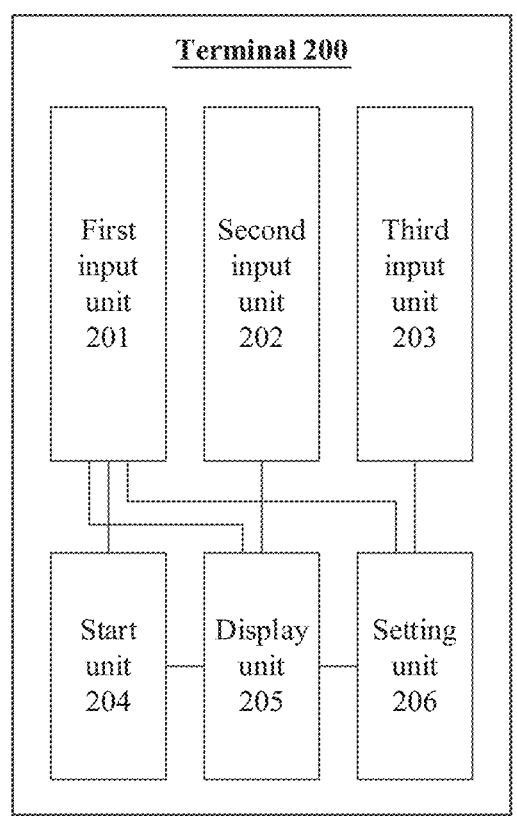
FIG. 16 is a functional block diagram of a terminal according to this application.

FIG. 16 is a functional block diagram of a terminal according to this application. Function blocks of the terminal may be implemented in hardware, software, or a combination of the software and the hardware to implement the technical solutions of this application. A person skilled in the art should understand that the function blocks described in FIG. 16 may be combined or separated into some sub-blocks to implement the technical solutions of this application. Therefore, the content described above in this application may support any possible combination or separation or further definition of the following function blocks. As shown in FIG. 16, the terminal 200 may include a first input unit 201 and a start unit 204.

The first input unit 201 may be configured to detect a user operation that is based on an application icon.

The start unit 204 may be configured to start, in response to the user operation detected by the first input unit 201, an associated function corresponding to the user operation.

An application represented by the application icon may have at least one associated function. The associated function corresponding to the user operation belongs to the at least one associated function, and the at least one associated function may include at least one of the following: an associated application of the application and a twin application of the application.

In specific implementation, the first input unit 201 may be an input apparatus such as the touch panel 131 or the gesture sensor 181 in the embodiment in FIG. 11. The start unit 204 may be the processor 110 in the embodiment in FIG. 11.

Optionally, the at least one associated function may further include at least one of the following: a function provided by the application (for example, application level settings) and a system function associated with the application (for example, system settings).

Specifically, if the application icon is a desktop folder icon, a desktop folder represented by the desktop folder icon is an application represented by the desktop folder icon. An associated application of the desktop folder may include an application in the desktop folder.

In this application, the user operation based on the application icon may be a sliding operation based on the application icon. A sliding direction, a sliding track, or the like may be used to define different sliding operations. Different sliding operations based the application icon may be used to start different associated functions. In addition to the sliding operation, the user operation that is based on the application icon and that is used to quickly start the associated application may alternatively be a touch operation in another form, for example, a tap operation of a specific frequency based on the application icon or a press operation of a specific frequency based on the application icon. This is not limited herein. In addition to the touch operation, the user operation that is based on the application icon and that is used to quickly start the associated application may alternatively be a motion sensing operation for the application icon, requiring no direct touch on the touchscreen.

In some optional implementations, as shown in FIG. 16, the terminal 200 may further include a setting unit 206 that may be configured to set an associated application of an application. In specific implementation, the start unit 204 may be the processor 110 in the embodiment in FIG. 11. Specifically, the setting unit 206 may set an associated application in, but not limited to, the following manners.

(1) As shown in FIG. 16, the terminal 200 may further include a third input unit 203 that may be configured to receive a first setting operation input by a user. In specific implementation, the third input unit 203 may be an input apparatus such as the touch panel 131, the key 133, or the audio circuit 173 in the embodiment in FIG. 11. Herein, the first setting operation may be used to set an associated function of an application. The setting unit 206 may be configured to set an associated function of an application based on the first setting operation.

(2) The setting unit 206 may be configured to set an associated application according to a preset rule.

Optionally, for an application, the setting unit 206 may be configured to set another application whose application type is the same as an application type of the application as an associated application of the application.

Optionally, for an application, the setting unit 206 may be configured to set, as an associated application of the application, another application whose application name has a same initial as an application name of the application. For example, the setting unit 206 may set another application whose application name has an initial "W" as an associated application of "WeChat" (an initial of "WeChat" is "W"). The example is merely used to explain this application and shall not be construed as a limitation.

It may be understood that determining an associated application of an application according to a preset rule makes it easy for a user to determine which applications are associated with the application. This is easy and effective. In addition to the foregoing two manners, there may be another different preset rule for the setting unit 206 to set an associated application. This is not limited herein.

(3) The setting unit 206 may be configured to set an associated application based on a running status of an application.

Optionally, for an application, the setting unit 206 may be configured to determine, as an associated application of the application, another application that runs simultaneously with the application for a largest quantity of times or a longest time. For example, upon analysis of a running status of each application, the setting unit 206 finds that the user usually starts "Gallery" and "Himalaya" at the same time when the user starts "WeChat". Therefore, the setting unit 206 may determine that "Gallery" and "Himalaya" are associated applications of "WeChat". This implementation is more compliant with a use habit of the user, thereby further improving user experience. The example is merely used to explain this application and shall not be construed as a limitation.

Optionally, for an application, the setting unit 206 may set another application that shares data with the application as an associated application of the application. For example, "Taobao (Taobao)" and "Alipay (Alipay)" share data with each other, and the setting unit 206 may determine "Alipay" as an associated application of "Taobao". In this way, it is convenient for the user to quickly start "Alipay" when using "Taobao", further improving user experience. "Taobao" is an e-commerce application, and "Alipay" is an online payment application. The example is merely used to explain this application and shall not be construed as a limitation.

It may be understood that determining an associated application of an application intelligently based on a running status of the application may mine an association between applications in depth. This better meets a use habit of a user and further improves user experience. In addition to the foregoing two manners, there may be another different manner for the terminal to intelligently determine an associated application. This is not limited herein.

In this application, if the application icon is a desktop folder icon, a desktop folder represented by the desktop folder icon is an application represented by the desktop folder icon. An associated application of the desktop folder may include an application in the desktop folder, and the desktop folder may include a plurality of applications.

In some optional implementations, the setting unit 206 may set an associated application of a desktop folder (that is, an application in the desktop folder) in, but not limited to, the following manners:

(1) As shown in FIG. 16, the terminal 200 may further include a third input unit 203 that may be configured to receive a first setting operation input by a user. In specific implementation, the third input unit 203 may be an input apparatus such as the touch panel 131, the key 133, or the audio circuit 173 in the embodiment in FIG. 11. Herein, the first setting operation may be used to set an application in a desktop folder. The setting unit 206 may be configured to set an application in a desktop folder based on the first setting operation.

For example, associated applications ("Safari", "Settings", "Contacts", and "Flashlight") of a desktop folder represented by a desktop folder icon may be set by the user based on a preference of the user. The example is merely used to explain this application and shall not be construed as a limitation. A policy of setting an associated application by the user is not limited herein.

(2) The setting unit 206 may be configured to set an application in a desktop folder according to a preset rule.

Optionally, the setting unit 206 may be configured to add applications of a same application type to a same desktop folder.

For example, the setting unit 206 may be configured to add social applications (such as WeChat and Twitter Twitter) to a same desktop folder. The example is merely used to explain this application and shall not be construed as a limitation.

Optionally, the setting unit 206 may be configured to add applications whose application names have a same initial to a same desktop folder.

For example, the setting unit 206 may add other applications whose application names have an initial "G" (such as Google Maps (Google Maps) and Gmail (Gmail)) to a same desktop folder. The example is merely used to explain this application and shall not be construed as a limitation.

It may be understood that determining an associated application of an application according to a preset rule makes it easy for a user to quickly determine applications in a desktop folder. This is easy and effective. In addition to the foregoing two manners, there may be another different preset rule for the setting unit 206 to set an application in a desktop folder. This is not limited herein.

(3) The setting unit 206 may be configured to intelligently set an application in a desktop folder based on a running condition of the application.

Optionally, the setting unit 206 may be configured to add a plurality of applications that run simultaneously for a relatively large quantity of times or a relatively long time to a same desktop folder.

For example, upon analysis of a running status of each application, the setting unit 206 finds that the user usually starts "Gallery" and "Himalaya" at the same time when the user starts "WeChat". Therefore, the setting unit 206 may determine that the three applications "Gallery", "Himalaya", and "WeChat" are relatively highly associated, and may add the three applications to a same desktop folder. The example is merely used to explain this application and shall not be construed as a limitation.

Optionally, the setting unit 206 may be configured to add a plurality of applications that need to share data with each other to a same desktop folder.

For example, "Taobao" and "Alipay" share data with each other, and the terminal may determine that "Alipay" and "Taobao" are relatively highly associated, and may add the two applications to a same desktop folder. The example is merely used to explain this application and shall not be construed as a limitation.

It may be understood that setting an application in a desktop folder intelligently based on a running status of the application may mine an association between applications in depth. This better meets a use habit of a user and further improves user experience. In addition to the foregoing two manners, there may be another different manner for the setting unit 206 to intelligently set an application in the desktop folder. This is not limited herein.

In some optional implementations, the setting unit 206 may set in, but not limited to, the following several manners, a user operation that is based on an application icon and that is used to quickly start an associated application.

(1) As shown in FIG. 16, the terminal 200 may further include a third input unit 203 that may be configured to receive a second setting operation input by a user. In specific implementation, the third input unit 203 may be an input apparatus such as the touch panel 131, the key 133, or the audio circuit 173 in the embodiment in FIG. 11. Herein, the second setting operation may be used to set the user operation that is based on the application icon and that is used to quickly start the associated function of the application. The setting unit 206 may be configured to set, based on the second setting operation, the user operation that is based on the application icon and that is used to quickly start the associated function of the application.

(2) The setting unit 206 may be configured to intelligently set, based on a use habit of the user, the user operation that is based on an application icon and that is used to quickly start the associated application.

Optionally, for a relatively common (or relatively highly associated) associated application, the setting unit 206 may be configured to set a common user operation that is based on an application icon as the user operation used to quickly start the associated application.

For example, it is assumed that a most common associated application of "WeChat" is "Gallery", and when the user holds the terminal with a single hand, an upward sliding operation based on an application icon is a common operation. In this case, the setting unit 206 may be configured to set the upward sliding operation that is based on the "WeChat" application icon as a user operation used to quickly start "Gallery".

For example, it is assumed that a most common application in a desktop folder is "Settings", and when the user holds the terminal with a single hand, an upward sliding operation based on a desktop folder icon is a common operation. In this case, the setting unit 206 may be configured to set the upward sliding operation that is based on the desktop folder icon as a user operation used to quickly start "Settings".

The example is merely used to explain this application and shall not be construed as a limitation. For a policy of intelligently setting a user operation used to quickly start each associated application, by the terminal based on a use habit of the user, no limitation is imposed herein.

Herein, the setting unit 206 may be configured to obtain, by analyzing a user operation that is based on an application icon of any application, a common user operation that is based on the application icon. For example, it is assumed that the user usually slides upward on a "Taobao" application icon to start an associated application of "Taobao". In this case, the setting unit 206 may be configured to determine the user operation of sliding upward based on the application icon as a common user operation that is based on the application icon, and the common user operation that is based on the application icon is applicable to another application icon. For example, for a "Gallery" application icon, the setting unit 206 may be configured to determine that the upward sliding operation that is based on the "Gallery" application icon is a common user operation that is based on the "Gallery" application icon. The example is merely used to explain this application. In actual application, the setting unit 206 may alternatively use another manner to determine a common user operation that is based on an application icon. This is not limited herein.

It may be understood that intelligently setting, based on a use habit of the user, a user operation that is based on an application icon and that is used to quickly start each associated application can better meet a use habit of the user, improving user experience.

In some optional implementations, as shown in FIG. 16, the terminal 200 may further include a display unit 205 that may be configured to display an operation prompt. In specific implementation, the display unit 205 may be the display 160 in the embodiment in FIG. 11. The operation prompt may be used to indicate the user operation that is based on the application icon and that is used to start the associated function of the application, that is, used to prompt the user how to perform an operation that is based on the application icon to start a specific associated function. This brings no memory burden to the user.

Optionally, as shown in FIG. 16, the terminal 200 may further include a second input unit 202 that may be configured to detect that an object (for example, a user finger or a stylus) performing the user operation approaches an application icon. In specific implementation, the second input unit 202 may be an input apparatus such as the touch panel 131 provided with a floating touch detection function, the gesture sensor 181, or the 3D camera 172 in the embodiment in FIG. 11. The display unit 205 may be specifically configured to display the operation prompt when the second input unit 202 detects that the object (for example, a user finger or a stylus) performing the user operation approaches the application icon.

In some optional implementations, the display unit 205 may display the operation prompt in, but not limited to, the following manners:

In a first implementation, the display unit 205 may be specifically configured to display a ring prompt area around the application icon, and display identification information of at least one associated function in the ring prompt area.

In specific implementation, in response to a sliding operation, detected by the first input unit 201, of sliding from the application icon to the identification information in the ring prompt area, the start unit 204 may be configured to start a user interface of an associated function that the sliding operation points to. Herein, the associated function that the sliding operation points to is an associated function represented by the identification information that the sliding operation points to.

In a second implementation, the display unit 205 may be specifically configured to display, in a floating manner around the application icon, at least one prompt area of a preset shape, for example, a "bubble". Identification information (for example, an application icon) of an associated application may be displayed in the prompt area of the preset shape. The "bubble" may be a prompt area of a bubble shape, and the identification information (for example, an application icon) of the application is displayed in the prompt area.

In a possible implementation, in response to the detected sliding operation of sliding from the application icon to the identification information in the prompt area of the preset shape, the start unit 204 may start an associated function that the sliding operation points to. Herein, the associated function that the sliding operation points to is an associated function represented by the identification information that the sliding operation points to.

In another possible implementation, in response to the user operation that is detected by the first input unit 201 and that is performed on the prompt area of the preset shape, the start unit 204 may be configured to start an associated function on which the user operation acts. Herein, the associated function on which the user operation acts is an associated function represented by identification information displayed in the prompt area that is of the preset shape (for example, a "bubble") and on which the user operation is performed.

In a third implementation, the display unit 205 may be specifically configured to display, in a floating manner on the application icon, at least one prompt area of a preset shape, for example, a "bubble". Identification information (for example, an application icon) of an associated application may be displayed in the prompt area of the preset shape.

In specific implementation, in response to the user operation that is detected by the first input unit 201 and that is performed on the prompt area of the preset shape, the start unit 204 may be configured to start an associated function on which the user operation acts. Herein, the associated function on which the user operation acts is an associated function represented by identification information displayed in the prompt area that is of the preset shape (for example, a "bubble") and on which the user operation is performed.

In some optional implementations, the first input unit 201 may be configured to detect a sliding operation of an arc sliding track on the application icon. The start unit 204 may be configured to start a plurality of associated applications in response to the sliding operation of the arc sliding track detected by the first input unit 201.

In addition to the sliding operation of the arc sliding track, the user operation used to quickly start the plurality of associated applications may alternatively be a sliding operation of another sliding track that is based on the application icon, for example, a sliding operation of an anti-clockwise sliding track, or a Z shaped sliding track, or may be another touch operation or a non-touch operation that is based on the application icon.

It may be understood that, for a specific implementation of the function blocks included in the terminal 200 in FIG. 16, refer to the foregoing method embodiment. Details are not further described herein.

In summary, the technical solutions in this application are implemented, so that the associated function can be quickly started by performing the user operation based on the application icon, avoiding that a user performs a plurality of operations (for example, page turning for search and tap for start). This is easier and more convenient.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a ROM or a random access memory RAM, a magnetic disk or an optical disc, or the like.

What is claimed is:

1. An application control method implemented by a terminal, comprising:

associating a first direction of a first user operation performed on an application icon of a first application with a second application using a preset rule, wherein the first user operation comprises a first sliding operation, wherein the first direction comprises a first sliding direction, wherein the first sliding operation comprises a first starting location and a first ending location, wherein the first starting location comprises the application icon of the first application, and wherein the first ending location comprises a first area without any application icons on a home page of the terminal;

associating a second direction of a second user operation performed on the application icon of the first application with a third application using the preset rule, wherein the second user operation comprises a second sliding operation, wherein the second direction comprises a second sliding direction, wherein the second sliding operation comprises a second starting location and a second ending location, wherein the second starting location comprises the application icon of the first application, wherein the second ending location comprises a second area without any application icons on the home page of the terminal, wherein the first sliding direction and the second sliding direction comprise different sliding directions, wherein the first application, the second application, and the third application comprise different types of applications that are associated with different content types, and wherein the first area without any application icons on the home page of the terminal and the second area without any application icons on the home page of the terminal comprise different areas of the home page;

detecting that either the first user operation having the first direction is performed on the application icon of the first application or the second user operation having the second direction is performed on the application icon of the first application, wherein the first application corresponding to the application icon has at least one associated function;

starting, in response to detecting the first user operation, a first associated function corresponding to the first user operation, wherein the first associated function comprises switching a currently displayed interface to a second interface associated with the second application, and wherein the second interface is either a third interface last displayed when a user exits the second application last time or a first default interface of the second application; and starting, in response to detecting the second user operation, a second associated function corresponding to the second user operation, wherein the second associated function comprises switching the currently displayed interface to a fourth interface associated with the third application, and wherein the fourth interface is either a fifth interface last displayed when the user exits the third application last time or a second default interface of the third application.

2. The application control method of claim 1, wherein the first application comprises a social application, wherein the social application is associated with message content, wherein the second application comprises an image application, wherein the image application is associated with image content, wherein the third application comprises an audio application, wherein the audio application is associated with audio content, wherein the application control method further comprises displaying an operation prompt, and wherein the operation prompt indicates the first user operation and the second user operation.

3. The application control method of claim 2, further comprising:

detecting that an object performing the first user operation or the second user operation approaches the application icon; and displaying the operation prompt.

4. The application control method of claim 2, wherein the operation prompt comprises either:

a ring prompt area displayed around the application icon using the application icon as a center, wherein identification information of the at least one associated function is displayed in the ring prompt area; or at least one prompt area of a preset shape displayed in a floating manner around the application icon, wherein the identification information is displayed in the at least one prompt area.

5. The application control method of claim 4, wherein the first user operation comprises the first sliding operation of sliding from the application icon to the identification information, wherein the application control method further comprises starting, in response to the first sliding operation, the first associated function that the first sliding operation points to, and wherein the first associated function corresponds to second identification information that the first sliding operation points to.

6. The application control method of claim 2, wherein the operation prompt comprises at least one prompt area of a preset shape displayed in a floating manner either on the application icon or around the application icon, and wherein identification information of the at least one associated function is displayed in the at least one prompt area.

7. The application control method of claim 6, further comprising:
    detecting a third user operation performed on the at least one prompt area; and
    starting, in response to the third user operation, a sixth interface of a third associated function on which the third user operation acts, wherein the third associated function corresponds to second identification information, and wherein the second identification information is displayed in the at least one prompt area on which the second user operation is performed.

8. A non-transitory computer-readable medium comprising instructions that, when executed by a processor, cause a terminal device to:
    associate a first direction of a first user operation performed on an application icon of a first application with a second application using a preset rule, wherein the first user operation comprises a first sliding operation, wherein the first direction comprises a first sliding direction, wherein the first sliding operation comprises a first starting location and a first ending location, wherein the first starting location comprises the application icon of the first application, and wherein the first ending location comprises a first area without any application icons on a home page of the terminal device;
    associate a second direction of a second user operation performed on the application icon of the first application with a third application using the preset rule, wherein the second user operation comprises a second sliding operation, wherein the second sliding operation comprises a second starting location and a second ending location, wherein the second starting location comprises the application icon of the first application, wherein the second ending location comprises a second area without any application icons on the home page of the terminal device, wherein the second direction comprises a second sliding direction, wherein the first sliding direction and the second sliding direction comprise different sliding directions, wherein the first application, the second application, and the third application comprise different types of applications that are associated with different content types, and wherein the first area without any application icons on the home page of the terminal device and the second area without any application icons on the home page of the terminal device comprise different areas of the home page;
    display the application icon of the first application on a display of the terminal device;
    display, in response to detecting that the first user operation having the first direction is performed on the application icon of the first application, a first user interface of a first associated function corresponding to the first user operation, wherein the first user interface is either a first interface last displayed when a user exits the second application last time or a first default start interface of the second application; and
    display, in response to detecting that the second user operation having the second direction is performed on the application icon of the first application, a second user interface of a second associated function corresponding to the second user operation, wherein the second user interface is either a second interface last displayed when the user exits the third application last time or a second default start interface of the third application.

9. The non-transitory computer-readable medium of claim 8, wherein the first application comprises a social application, wherein the social application is associated with message content, wherein the second application comprises an image application, wherein the image application is associated with image content, wherein the third application comprises an audio application, wherein the audio application is associated with audio content, wherein the instructions further cause the terminal device to display an operation prompt when detecting that an object performing the first user operation or the second user operation approaches the application icon, and wherein the operation prompt indicates the first user operation and the second user operation.

10. The non-transitory computer-readable medium of claim 9, wherein the instructions further cause the terminal device to:
    display a ring prompt area around the application icon using the application icon as a center, wherein identification information of the first associated function and the second associated function is displayed in the ring prompt area; or
    display at least one prompt area of a preset shape in a floating manner around the application icon, wherein the identification information of the first associated function and the second associated function is displayed in the at least one prompt area.

11. The non-transitory computer-readable medium of claim 10, wherein the instructions further cause the terminal device to display, in response to a third sliding operation of sliding from the application icon to second identification information, a third user interface of a third associated function that the third sliding operation points to, wherein the third associated function corresponds to the second identification information that the third sliding operation points to, and wherein the third user interface is either a fourth interface last displayed when the user exits the third associated function last time or a third default start interface of the third associated function.

12. The non-transitory computer-readable medium of claim 9, wherein the instructions further cause the terminal device to display at least one prompt area of a preset shape in a floating manner either on the application icon or around the application icon, and wherein identification information of the first associated function and the second associated function is respectively displayed in the at least one prompt area.

13. The non-transitory computer-readable medium of claim 8, wherein the instructions further cause the terminal device to display, in response to the first user operation that is performed on a prompt area of a preset shape, the first user interface, wherein the first associated function corresponds to identification information displayed in the prompt area, and wherein the first user interface is either the first interface last displayed when the user exits the first associated function last time or the first default start interface of the first associated function.

14. A terminal, comprising:
a memory comprising instructions; and
a processor coupled to the memory and configured to execute the instructions to cause the terminal to:
associate a first direction of a first user operation performed on an application icon of a first application with a second application using a preset rule, wherein the first user operation comprises a first sliding operation, wherein the first direction comprises a first sliding direction, wherein the first sliding operation comprises a first starting location and a first ending location, wherein the first starting location comprises the application icon of the first application, and wherein the first ending location comprises a first area without any application icons on a home page of the terminal;
associate a second direction of a second user operation performed on the application icon of the first application with a third application using the preset rule, wherein the second user operation comprises a second sliding operation, wherein the second direction comprises a second sliding direction, wherein the second sliding operation comprises a second starting location and a second ending location, wherein the second starting location comprises the application icon of the first application, wherein the second ending location comprises a second area without any application icons on the home page of the terminal, wherein the first sliding direction and the second sliding direction comprise different sliding directions, wherein the first application, the second application, and the third application comprise different types of applications that are associated with different content types, and wherein the first area without any application icons on the home page of the terminal and the second area without any application icons on the home page of the terminal comprise different areas of the home page;
detect that either the first user operation having the first direction is performed on the application icon of the first application or the second user operation having the second direction is performed on the application icon of the first application, wherein the first application corresponding to the application icon has at least one associated function; and
start, in response to detecting the first user operation, a first associated function corresponding to the first user operation, wherein the first associated function comprises switching a currently displayed interface to a second interface associated with the second application, and wherein the second interface is either a third interface last displayed when a user exits the second application last time or a first default interface of the second application; and
start, in response to detecting the second user operation, a second associated function corresponding to the second user operation, wherein the second associated function comprises switching the currently displayed interface to a fourth interface associated with the third application, and wherein the fourth interface is either a fifth interface last displayed when the user exits the third application last time or a second default interface of the third application.

15. The terminal of claim 14, wherein the first application comprises a social application, wherein the social application is associated with message content, wherein the second application comprises an image application, wherein the image application is associated with image content, wherein the third application comprises an audio application, wherein the audio application is associated with audio content, wherein the instructions further cause the terminal to display an operation prompt, and wherein the operation prompt indicates the first user operation and the second user operation.

16. The terminal of claim 15, wherein the instructions further cause the terminal to:
detect that an object performing the first user operation or the second user operation approaches the application icon; and
display the operation prompt when detecting that the object approaches the application icon.

17. The terminal of claim 15, wherein the instructions further cause the terminal to:
display a ring prompt area around the application icon using the application icon as a center, wherein identification information of the at least one associated function is displayed in the ring prompt area; or
display at least one prompt area of a preset shape in a floating manner around the application icon, wherein the identification information is displayed in the at least one prompt area.

18. The terminal of claim 17, wherein the instructions further cause the terminal to:
detect a third sliding operation of sliding from the application icon to the identification information; and
start, in response to the third sliding operation, a third associated function that the third sliding operation points to, wherein the third associated function corresponds to second identification information that the third sliding operation points to.

19. The terminal of claim 15, wherein the instructions further cause the terminal to display at least one prompt area of a preset shape in a floating manner either on the application icon or around the application icon, and wherein identification information of the at least one associated function is displayed in the at least one prompt area.

20. The terminal of claim 19, wherein the instructions further cause the terminal to:
detect a third user operation that is performed on the at least one prompt area; and
start, in response to the third user operation, a sixth user interface of a third associated function on which the third user operation acts, wherein the third associated function corresponds to second identification information displayed in the at least one prompt area on which the second user operation is performed.

* * * * *